US010768932B2

(12) United States Patent
Kasagi

(10) Patent No.: US 10,768,932 B2
(45) Date of Patent: Sep. 8, 2020

(54) INFORMATION PROCESSING SYSTEM, ARITHMETIC PROCESSING CIRCUIT, AND CONTROL METHOD FOR INFORMATION PROCESSING SYSTEM

(71) Applicant: FUJITSU LIMITED, Kawasaki-shi, Kanagawa (JP)

(72) Inventor: Akihiko Kasagi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 100 days.

(21) Appl. No.: 16/174,348

(22) Filed: Oct. 30, 2018

(65) Prior Publication Data

US 2019/0138302 A1 May 9, 2019

(30) Foreign Application Priority Data

Nov. 6, 2017 (JP) ................................ 2017-214029

(51) Int. Cl.
*G06F 9/30* (2018.01)
*G06F 13/40* (2006.01)
*G06F 13/42* (2006.01)

(52) U.S. Cl.
CPC ........ *G06F 9/3001* (2013.01); *G06F 13/4022* (2013.01); *G06F 13/4221* (2013.01); *G06F 2213/0024* (2013.01)

(58) Field of Classification Search
CPC .................................................... G06F 9/3001
See application file for complete search history.

(56) References Cited

U.S. PATENT DOCUMENTS 5,333,268 A * 7/1994 Douglas .................. G06F 11/08 370/408
2003/0161309 A1* 8/2003 Karuppiah .............. H04L 45/02 370/392
2006/0179429 A1* 8/2006 Eggers .................... G06F 8/458 717/151
2013/0080750 A1* 3/2013 Ito ......................... G06F 9/3806 712/240

FOREIGN PATENT DOCUMENTS

EP 1835414 A2 * 9/2007 ....... G06F 15/17381
JP 2001-325239 11/2001

* cited by examiner

*Primary Examiner* — Farley Abad
(74) *Attorney, Agent, or Firm* — Fujitsu Patent Center

(57) ABSTRACT

An arithmetic processing circuit includes, a dividing circuit that divides a plurality of data blocks into groups of a number equal to the number of arithmetic processing circuits included in an information processing apparatus, a data selecting circuit that selects respective first data blocks from the plurality of data blocks included in the respective groups, a transmission destination selecting circuit that selects arithmetic processing circuits different from each other as respective transmission destinations from the plurality of arithmetic processing circuits for the respective first data blocks selected by the data selecting circuit based on destination number information obtained by exclusive disjunction operation on identification number information assigned to each arithmetic processing circuit and cyclic number information assigned to each group, and a transmitting circuit that transmits the respective first data blocks selected by the data selecting circuit to the respective arithmetic processing circuits selected by the transmission destination selecting circuit.

19 Claims, 35 Drawing Sheets

INFORMATION PROCESSING APPARATUS
1
A
CPU
2
PCI SWITCH
3
PCI SWITCH
3
ARITHMETIC PROCESSING CIRCUIT
20
ARITHMETIC PROCESSING CIRCUIT
20
ARITHMETIC PROCESSING CIRCUIT
20
ARITHMETIC PROCESSING CIRCUIT
20
HCA
4
HCA
4
HCA
4
HCA
4
NETWORK SWITCH
5

INFORMATION PROCESSING APPARATUS
1
CPU
2
PCI SWITCH
3
ARITHMETIC PROCESSING CIRCUIT
20
HCA
4
NETWORK SWITCH
5
SUB-NET MANAGER
6
A

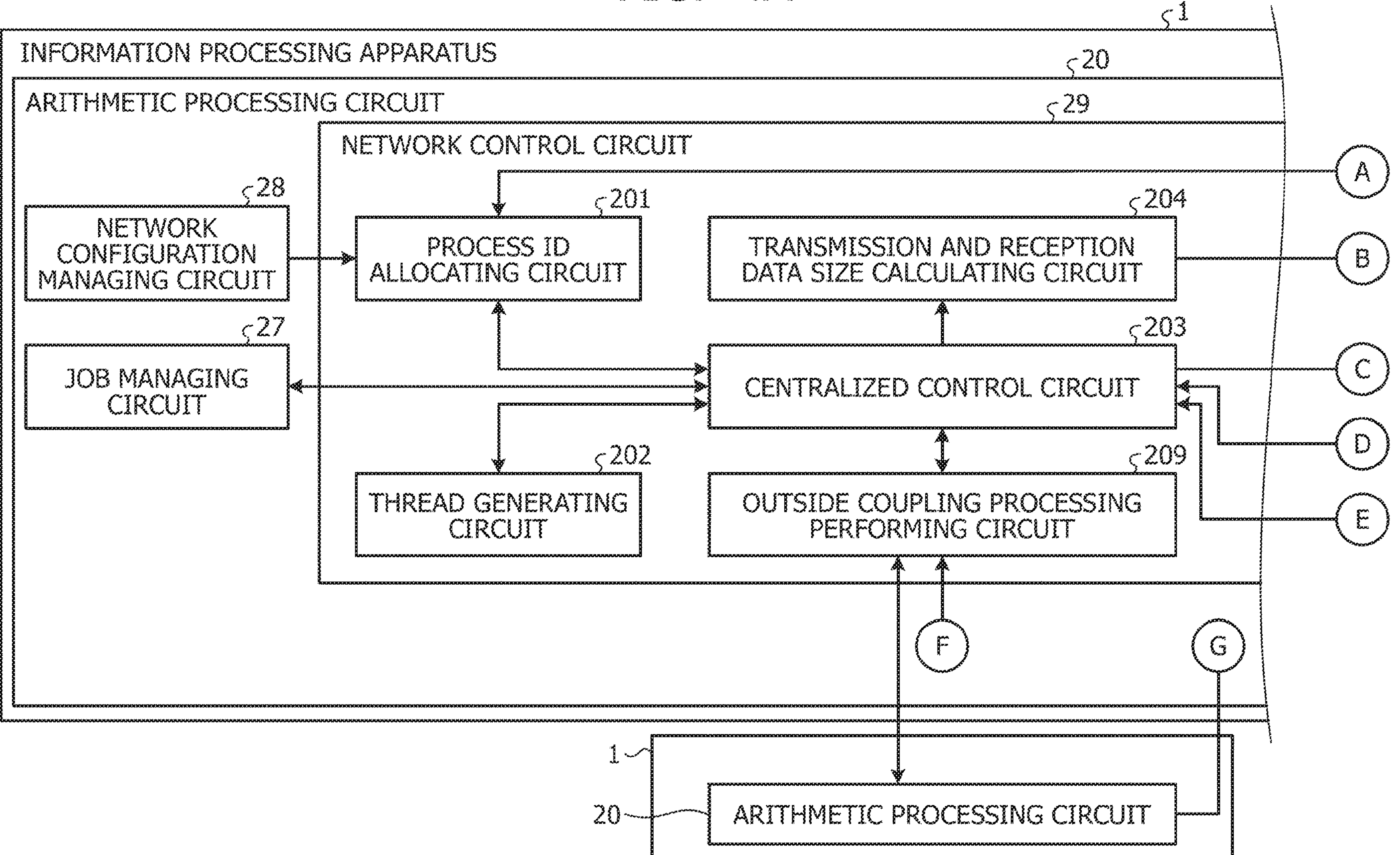
FIG. 4A
1
INFORMATION PROCESSING APPARATUS
20
ARITHMETIC PROCESSING CIRCUIT
29
NETWORK CONTROL CIRCUIT
28
NETWORK CONFIGURATION MANAGING CIRCUIT
201
PROCESS ID ALLOCATING CIRCUIT
204
TRANSMISSION AND RECEPTION DATA SIZE CALCULATING CIRCUIT
27
JOB MANAGING CIRCUIT
203
CENTRALIZED CONTROL CIRCUIT
202
THREAD GENERATING CIRCUIT
209
OUTSIDE COUPLING PROCESSING PERFORMING CIRCUIT
A
B
C
D
E
F
G
1
20
ARITHMETIC PROCESSING CIRCUIT

250

| | | | | | | | |
|---|---|---|---|---|---|---|---|
| 0123456 | 1 | 23 | 3 | 0123456 | 5 | 67 | 7 |
| 01 | 1 | 0123456 | 3 | 45 | 5 | 0123456 | 7 |
| 0 | 0123456 | 2 | 23 | 4 | 0123456 | 6 | 67 |
| 0 | 01 | 2 | 0123456 | 4 | 45 | 6 | 0123456 |
| 0123456 | 13 | 2 | 3 | 0123456 | 57 | 6 | 7 |
| 02 | 0123456 | 2 | 3 | 46 | 0123456 | 6 | 7 |
| 0 | 1 | 0123456 | 13 | 4 | 5 | 0123456 | 57 |
| 0 | 1 | 02 | 0123456 | 4 | 5 | 46 | 0123456 |

FIRST COMMUNICATION
SECOND COMMUNICATION
PROCESS ID = 00
PROCESS ID = 01
TRANSMISSION AND RECEPTION TARGET INDEX
Th1
Th2
301
302
303
304
305
306
307
308
311
312
313
314
315
316
317
318

PROCESS ID = 00
PROCESS ID = 01
PROCESS ID = 10
PROCESS ID = 11
Th1
Th2
FIRST COMMUNICATION
SECOND COMMUNICATION

Th1
Th2
FIRST COMMUNICATION
SECOND COMMUNICATION

FIRST COMMUNICATION
SECOND COMMUNICATION
PROCESS ID = 00
PROCESS ID = 00
0 0 0 0 0 0 0 0
01 01 0 0 02 02 0 0
CYCLIC ID = 01
CYCLIC ID = 10
CYCLIC ID = 10
CYCLIC ID = 01
XOR OF PROCESS ID AND CYCLIC ID
01
10
XOR OF PROCESS ID AND CYCLIC ID
10
01
Th1
Th2

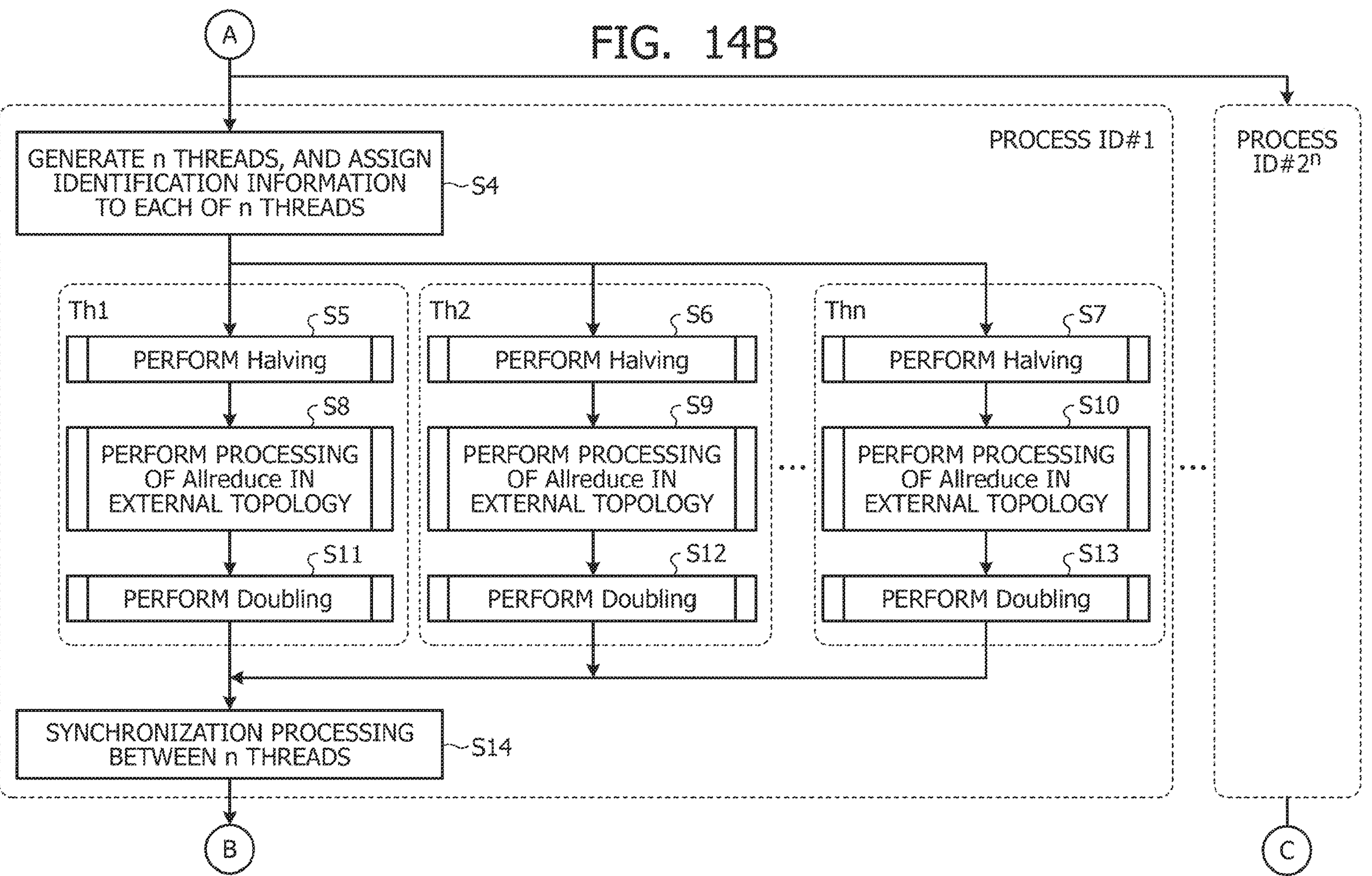

FIG. 14B
A
GENERATE n THREADS, AND ASSIGN IDENTIFICATION INFORMATION TO EACH OF n THREADS
S4
PROCESS ID#1
Th1
S5
PERFORM Halving
S8
PERFORM PROCESSING OF Allreduce IN EXTERNAL TOPOLOGY
S11
PERFORM Doubling
Th2
S6
PERFORM Halving
S9
PERFORM PROCESSING OF Allreduce IN EXTERNAL TOPOLOGY
S12
PERFORM Doubling
Thn
S7
PERFORM Halving
S10
PERFORM PROCESSING OF Allreduce IN EXTERNAL TOPOLOGY
S13
PERFORM Doubling
SYNCHRONIZATION PROCESSING BETWEEN n THREADS
S14
B
PROCESS ID#2n
C

FIG. 17

```
# n  : Dimension size of hyper cube
# D : Size of total data
offset=D/n*threadID + MemAddr;
CyclicID = 1 << threadID;
StepHist = 0;
# Reduce_scatter
For(i=0;i<n;i++)
  StepHist = (StepHist << 1) ^ ((cyclicID & processID)>0);
  BufferSize = D/n/(2 << i);
  RecvAdd=offset + StepHist*BufferSize;
  SendAdd=offset + (StepHist^1)*BufferSize;
  Peer = CyclicID ^ processID;
  SendRecv_Add(RecvAdd,SendAdd,BufferSize,Peer)
  CyclicLeftShift(CyclicID);

# Allgather
For(i=0;i<n;i++)
  CyclicRightShift(CyclicID);
  RecvAdd=offset + (StepHist^1)*BufferSize;
  SendAdd=offset + StepHist*BufferSize;
  Peer = CyclicID ^ processID;
  SendRecv(RecvAdd,SendAdd,CyclicID,BufferSize,Peer)
  BufferSize = BufferSize * 2;
  StepHist = StepHist >> 1;
```

INFORMATION PROCESSING APPARATUS
1
CPU
2
PCI SWITCH
3
PCI SWITCH
3
ARITHMETIC PROCESSING CIRCUIT
20
ARITHMETIC PROCESSING CIRCUIT
20
ARITHMETIC PROCESSING CIRCUIT
20
ARITHMETIC PROCESSING CIRCUIT
20
HCA
4
HCA
4
HCA
4
HCA
4
A
B
C
D
E

INFORMATION PROCESSING APPARATUS
1
CPU
2
PCI SWITCH
3
PCI SWITCH
3
ARITHMETIC PROCESSING CIRCUIT
20
ARITHMETIC PROCESSING CIRCUIT
20
ARITHMETIC PROCESSING CIRCUIT
20
ARITHMETIC PROCESSING CIRCUIT
20
HCA
4
HCA
4
HCA
4
HCA
4
A
B
C
D
E

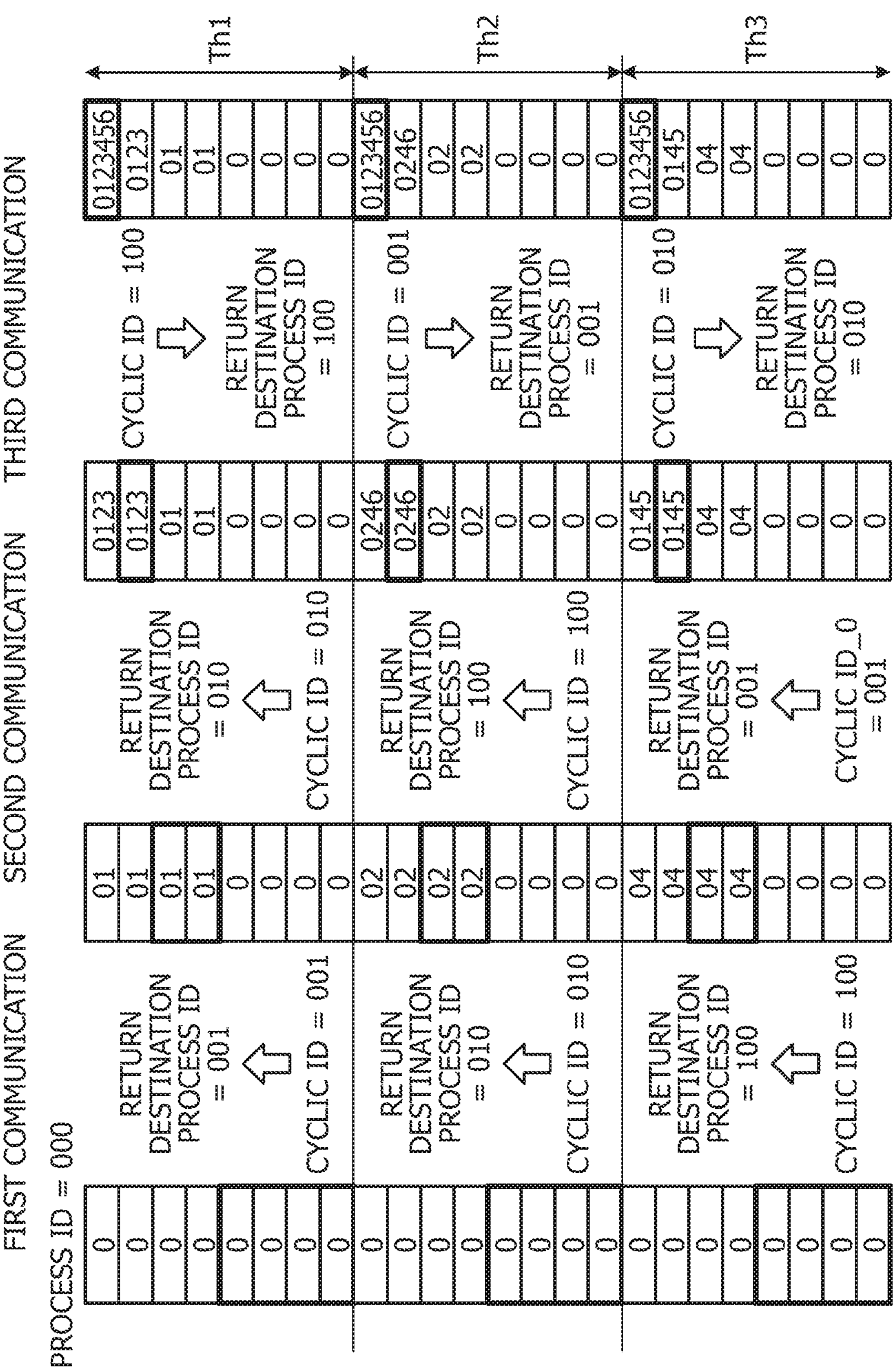
FIG. 22
PROCESS ID = 000
FIRST COMMUNICATION
SECOND COMMUNICATION
THIRD COMMUNICATION
RETURN DESTINATION PROCESS ID = 001
CYCLIC ID = 001
RETURN DESTINATION PROCESS ID = 010
CYCLIC ID = 010
CYCLIC ID = 100
RETURN DESTINATION PROCESS ID = 100
RETURN DESTINATION PROCESS ID = 010
CYCLIC ID = 010
RETURN DESTINATION PROCESS ID = 100
CYCLIC ID = 100
RETURN DESTINATION PROCESS ID = 001
CYCLIC ID_0 = 001
CYCLIC ID = 100
RETURN DESTINATION PROCESS ID = 100
CYCLIC ID = 001
RETURN DESTINATION PROCESS ID = 001
CYCLIC ID = 010
RETURN DESTINATION PROCESS ID = 010
Th1
Th2
Th3

FIG. 24

EACH COMMUNICATION AMOUNT
NUMBER OF COMMUNICATIONS

| EACH COMMUNICATION AMOUNT | NUMBER OF COMMUNICATIONS | COMBINATION OF COMMUNICATIONS | | | | | | | | | | | |
|---|---|---|---|---|---|---|---|---|---|---|---|---|---|
| 4m | 1 | #00⇔#01 | #00⇔#02 | #00⇔#04 | #02⇔#03 | #02⇔#06 | #01⇔#03 | #01⇔#05 | #03⇔#07 | #04⇔#05 | #04⇔#06 | #05⇔#07 | #06⇔#07 |
| 2m | 2 | #00⇔#01 | #00⇔#02 | #00⇔#04 | #02⇔#03 | #02⇔#06 | #01⇔#03 | #01⇔#05 | #03⇔#07 | #04⇔#05 | #04⇔#06 | #05⇔#07 | #06⇔#07 |
| 1m | 3 | #00⇔#01 | #00⇔#02 | #00⇔#04 | #02⇔#03 | #02⇔#06 | #01⇔#03 | #01⇔#05 | #03⇔#07 | #04⇔#05 | #04⇔#06 | #05⇔#07 | #06⇔#07 |
| 2m | 4 | #00⇔#01 | #00⇔#02 | #00⇔#04 | #02⇔#03 | #02⇔#06 | #01⇔#03 | #01⇔#05 | #03⇔#07 | #04⇔#05 | #04⇔#06 | #05⇔#07 | #06⇔#07 |
| 4m | 5 | #00⇔#01 | #00⇔#02 | #00⇔#04 | #02⇔#03 | #02⇔#06 | #01⇔#03 | #01⇔#05 | #03⇔#07 | #04⇔#05 | #04⇔#06 | #05⇔#07 | #06⇔#07 |

FIG. 26

| EACH COMMUNICATION AMOUNT | NUMBER OF COMMUNICATIONS | COMBINATION OF COMMUNICATIONS | | | |
|---|---|---|---|---|---|
| 12 | 1 | #0⇔#1 | #2⇔#3 | #4⇔#5 | #6⇔#7 |
| 12 | 2 | #0⇔#2⇔#4⇔#6 | | #1⇔#3⇔#5⇔#7 | |
| 12 | 3 | #0⇔#1 | #2⇔#3 | #4⇔#5 | #6⇔#7 |

INFORMATION PROCESSING SYSTEM, ARITHMETIC PROCESSING CIRCUIT, AND CONTROL METHOD FOR INFORMATION PROCESSING SYSTEM

CROSS-REFERENCE TO RELATED APPLICATION

This application is based upon and claims the benefit of priority of the prior Japanese Patent Application No. 2017-214029, filed on Nov. 6, 2017, the entire contents of which are incorporated herein by reference.

FIELD

The embodiments discussed herein are related to an information processing system, an arithmetic processing circuit, and a control method for an information processing system.

BACKGROUND

A parallel computation system formed by coupling a large number of computers referred to as nodes is often used in a field of high performance computing (HPC). A node may be, for example, one chip set or the like. In recent years, parallel computer systems have been used also for deep learning or the like.

There are a mesh connection and a torus connection as forms of coupling of nodes in parallel computation systems. The mesh connection is a form of coupling in which nodes are arranged in the form of a mesh in a plurality of axial directions, and nodes adjacent to each other in each of the axial directions are coupled to each other by a high-speed network referred to as an interconnect. The torus connection is a form of coupling in which the mesh connection is made, and then nodes at both ends on each of the axes are coupled to each other. There are also networks where all of the axes have the mesh connection or the torus connection and forms of coupling such that a part of the axes have the mesh connection and the other axes have the torus connection. For example, parallel computation systems include devices having a topology as a six-dimensional torus structure.

Further, a parallel computation system may adopt a configuration that includes a plurality of system boards each having a plurality of nodes mounted thereon. A coupling between nodes arranged on a same system board is established by a high-speed dedicated interconnect. On the other hand, a coupling between nodes arranged on different system boards is established via a network switch using peripheral component interconnect (PCI) and InfiniBand (registered trademark). Here, the coupling between the nodes within the same system board will be referred to as an "inside coupling," and the coupling between the nodes via the network switch between the different system boards will be referred to as an "outside coupling." The inside coupling, which is established by the dedicated interconnect, has a wide bandwidth as compared with the outside coupling using PCI and InfiniBand, and thus enables communication at high speed.

Then, each of the nodes of the parallel computer system processes a program used in solving a complex problem at high speed. For example, the parallel computer system divides a job as an executable unit of the program into a plurality of processes, and allocates the divided processes to the respective nodes. Here, the processes are a program in which each node actually performs arithmetic processing. When each node obtains a process, the node performs arithmetic processing of the obtained process. When each node completes the arithmetic processing of the process, the node transmits an arithmetic result to a management server, and ends the arithmetic processing. In addition, the parallel computer system transmits a new process to the node ending the arithmetic processing, and makes the node perform arithmetic processing. Then, the parallel computer system integrates the results of the arithmetic processing performed by the respective nodes on the management server, and obtains an arithmetic result of the whole of the job.

The parallel computation system may perform the processing of Allreduce in such arithmetic processing. Allreduce is processing of integrating values calculated by respective processes, and sharing, in all of the processes, a result obtained by performing an operation using the integrated values. In this case, each node performs group communication. When the group communication is performed, the process performed by each node retains the arithmetic result of the values possessed by all of the processes. Thus, when the processing of Allreduce is performed, each node obtains the values possessed by all of the other nodes. However, a network load is increased when the value possessed by each of the nodes is transmitted to all of the other nodes, for example, in the processing of Allreduce.

It is therefore desirable to reduce communication data amounts between the nodes when the processing of Allreduce is performed. Accordingly, a Halving+Doubling method is proposed as a technology of reducing the communication data amounts in Allreduce. Halving+Doubling may be referred to also as Reduce_scatter+Allgather.

When a Halving operation in the Halving+Doubling method is performed, a communication data amount is halved in each communication step. When a Doubling operation is performed, on the other hand, the communication data amount is doubled in each communication step. For example, in the Halving+Doubling method, performing Halving after a start of processing reduces the communication data amount as the step advances, and subsequently performing Doubling increases the communication data amount as the step advances. Therefore, in the Halving+Doubling method, mutual communication of a large amount of data is performed during a small number of steps, mutual communication of a small amount of data is performed in the middle of steps, and thereafter mutual communication of a large amount of data is performed as steps are increased.

Here, as described above, in the parallel computation system having the inside coupling and the outside coupling, the outside coupling has a narrow bandwidth, and therefore the data amount of data transmitted and received in the outside coupling is desirably small. Accordingly, when the processing of Allreduce is performed in the parallel computation system having the inside coupling and the outside coupling, it is desirable to perform communication in the outside coupling after reducing the size of the data as much as possible in the inside coupling. For example, the processing of Allreduce may be performed by the following method. First, the amount of data transmitted and received is reduced by performing Halving in the inside coupling, and thereafter Allreduce processing of data in the outside coupling is performed. Thereafter, the amount of data handled is increased by performing Doubling in the inside coupling, and the processing of Allreduce is completed.

When such Allreduce processing is performed, the form of coupling of the nodes desirably has a connection forming a hypercube. An n-dimensional hypercube has the following features. The n-dimensional hypercube is constituted of $2^n$ nodes. Then, each node has n links. Further, when a binary index is assigned to each node, each node is adjacent to and coupled to nodes different from the node in the value of one bit in the bit strings of the assigned indexes. For example, in the case where the nodes have a form of coupling constituting a hypercube, it is easy to identify data transmission destinations, and a processing load is reduced because data transmission and reception in the case of performing the processing of Allreduce becomes easy.

Further, as a technology of group communication in a parallel computer system, there is a technology that calculates an entire processing time, switches between an entire data communication and a partial data communication so as to select a shorter processing time, and performs the communication.

A related technology is disclosed in Japanese Laid-open Patent Publication No. 2001-325239.

SUMMARY

According to an aspect of the embodiments, an arithmetic processing circuit includes, a dividing circuit that divides a plurality of data blocks into groups of a number equal to the number of arithmetic processing circuits included in an information processing apparatus, a data selecting circuit that selects respective first data blocks from the plurality of data blocks included in the respective groups, a transmission destination selecting circuit that selects arithmetic processing circuits different from each other as respective transmission destinations from the plurality of arithmetic processing circuits for the respective first data blocks selected by the data selecting circuit based on destination number information obtained by exclusive disjunction operation on identification number information assigned to each arithmetic processing circuit and cyclic number information assigned to each group, and a transmitting circuit that transmits the respective first data blocks selected by the data selecting circuit to the respective arithmetic processing circuits selected by the transmission destination selecting circuit.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 4A and 4B illustrate block diagrams of a network control circuit;

FIGS. 14A to 14C illustrate flowchart of a whole of processing of Allreduce;

FIG. 17 is a diagram illustrating an example of pseudo-code of a program for performing Halving and Doubling;

FIG. 22 is a diagram of assistance in explaining destination determination processing according to the second embodiment;

FIG. 24 is a diagram illustrating arithmetic processing circuits performing communication in each communication in an information processing system according to the second embodiment;

FIG. 26 is a diagram illustrating arithmetic processing circuits performing communication in each communication in an information processing system according to the third embodiment.

DESCRIPTION OF EMBODIMENTS

However, when Halving+Doubling is simply used for a topology having a hypercube, there may be a path not used in communication in each step. Therefore, with a method of simply using Halving+Doubling, a band is not fully used, and thus it is difficult to improve the speed of Allreduce.

In addition, even when the technology is used which switches between entire data communication and partial data communication, and performs the communication, a path not used in communication in each step occurs, so that it is difficult to improve the speed of Allreduce.

Embodiments of an information processing system, an arithmetic processing circuit, and a control method of the information processing system disclosed in the present application will hereinafter be described in detail with reference to the drawings. It is to be noted that the following embodiments do not limit the information processing system, the arithmetic processing circuit, and the control method of the information processing system disclosed in the present application.

First Embodiment

Figure 1A:
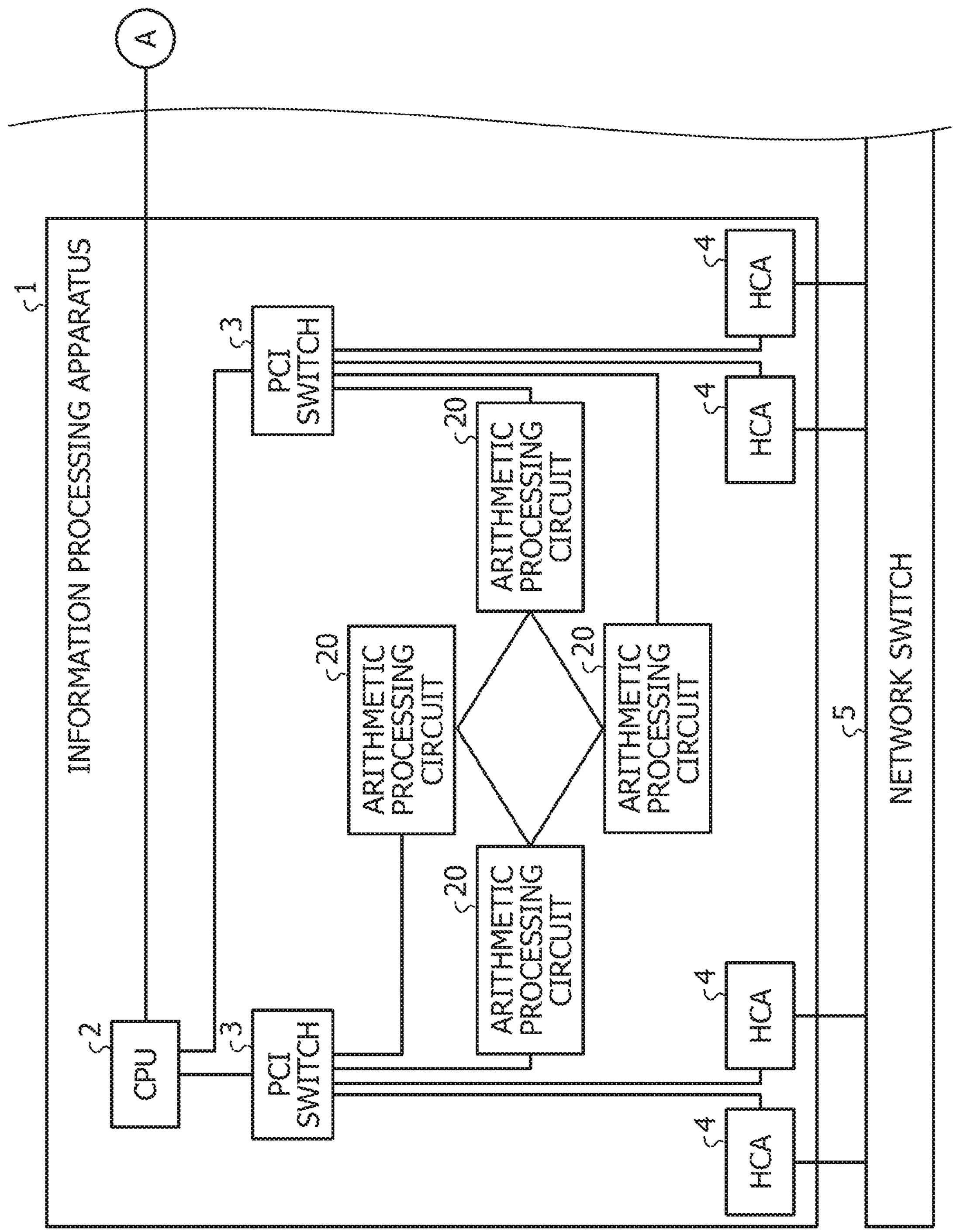
FIGS. 1A and 1B illustrate diagrams of a hardware configuration of an information processing system according to a first embodiment.
Figure 1B:
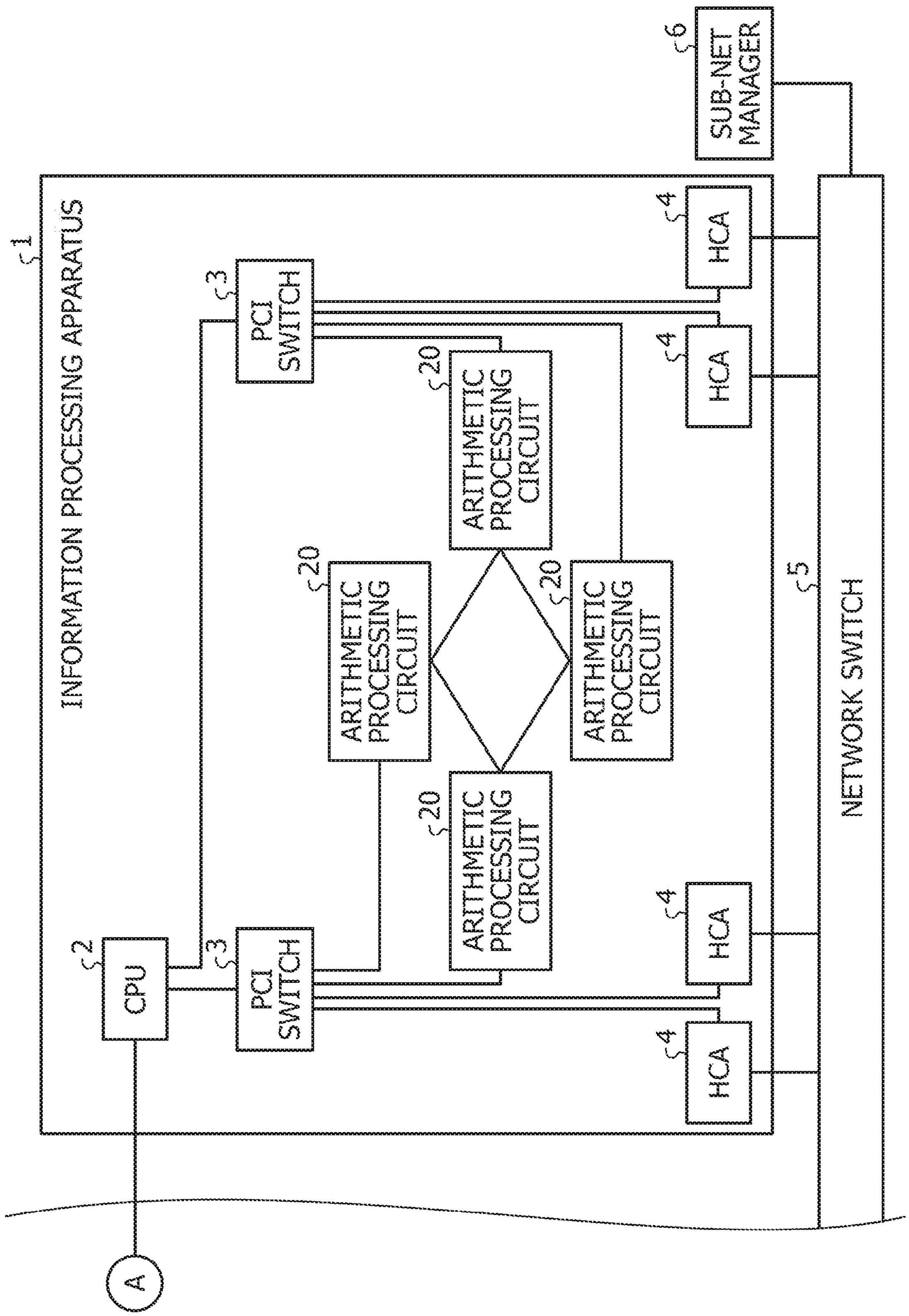

FIGS. 1A and 1B illustrate diagrams of a hardware configuration of an information processing system according to a first embodiment. The information processing system according to the present embodiment includes two system boards 1. Each of the system boards 1 includes a central processing unit (CPU) 2, two PCI switches 3, and four host channel adaptors (HCAs) 4.

The CPUs 2 on the respective system boards 1 are directly coupled to each other. In addition, each of the CPUs 2 on the system boards 1 is coupled to two PCI switches 3. The CPU 2 receives an instruction of a job input from an operator, and transmits the job to each arithmetic processing circuit 20 to be described later.

Each PCI switch 3 is coupled to the CPU 2 and two arithmetic processing circuits 20. In addition, each PCI switch 3 is coupled to two HCAs 4. The PCI switch 3 performs path selection at a time of communication using PCI by the CPU 2 and the arithmetic processing circuits 20.

The HCAs 4 are communication interfaces in communication using InfiniBand by the CPU 2 and the arithmetic processing circuits 20. The HCAs 4 are coupled to the PCI switches 3. In addition, the HCAs 4 are coupled to a network switch 5.

The network switch 5 is coupled with the HCAs 4 on each of the system boards 1. The network switch 5 performs path selection in communication using InfiniBand by the CPU 2 and the arithmetic processing circuits 20.

A sub-net manager 6 manages communication paths of communication performed via the network switch 5. As an example, the sub-net manager 6 operates on one server on a network, and periodically performs a path update.

Each of the arithmetic processing circuits 20 includes an arithmetic circuit for performing parallel computation. The arithmetic processing circuit 20 is, for example, a graphic processing unit (GPU). The arithmetic processing circuit 20 performs arithmetic processing in deep learning or the like. The arithmetic processing circuit 20 may hereinafter be referred to as a "node." The arithmetic processing circuit 20 corresponds to an example of an "arithmetic processing circuit."

Four arithmetic processing circuits 20 are arranged on one system board 1. Then, an arithmetic processing circuit 20 is coupled to two adjacent arithmetic processing circuits 20 by an interconnect. A path represented by a thick solid line in FIGS. 1A and 1B represents the interconnect.

Figure 2:
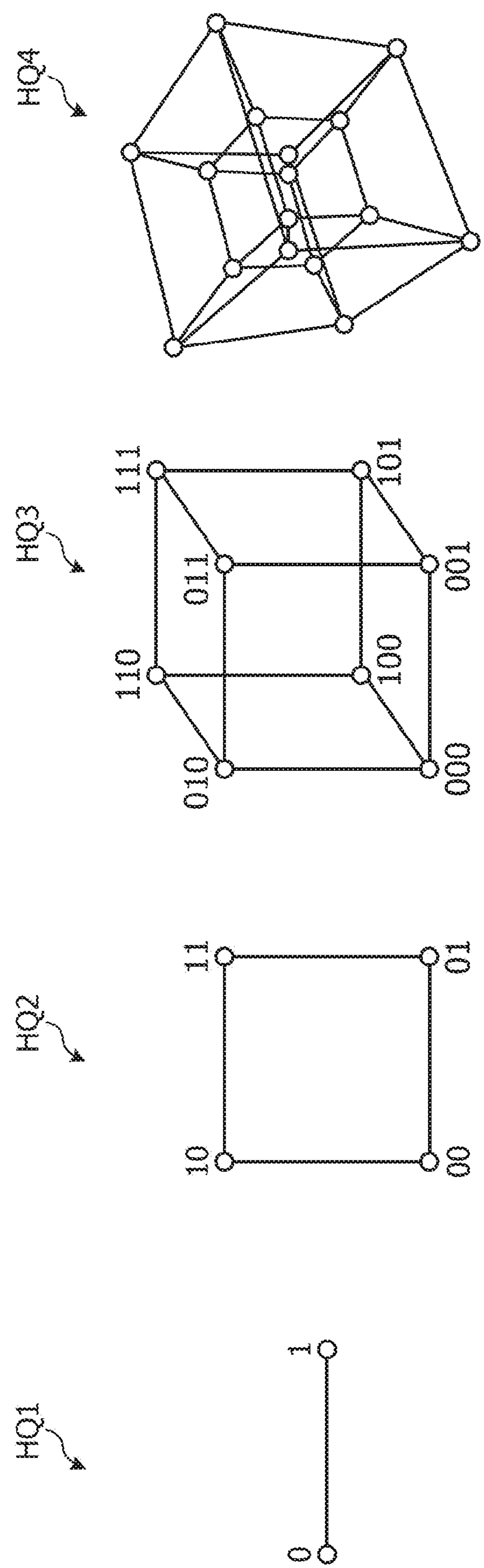
FIG. 2 is a diagram illustrating various kinds of hypercubes.

The four arithmetic processing circuits 20 each coupled to two adjacent arithmetic processing circuits 20 are coupled so as to form a two-dimensional hypercube. The hypercube will be described in the following. FIG. 2 is a diagram illustrating various kinds of hypercubes. A configuration HQ1 is a one-dimensional hypercube. A configuration HQ2 is a two-dimensional hypercube. A configuration HQ3 is a three-dimensional hypercube. A configuration HQ4 is a four-dimensional hypercube.

In a case where a binary index having n bits is assigned to each node, an n-dimensional hypercube is formed by coupling nodes different from each other in the value of one bit in bit strings representing the indexes to each other. For example, a number added to each node in the configurations HQ1 to HQ3 in FIG. 2 is a binary index assigned to each node such that each node is coupled to nodes different from the node in the value of one bit in the bit strings. For example, as illustrated in the configurations HQ1 to HQ3 in FIG. 2, in the n-dimensional hypercube, intercommunication is performed between nodes different from each other in the value of one bit in the bit strings representing the assigned indexes.

As an example, arithmetic processing circuits 20 according to the present embodiment are coupled so as to form a two-dimensional hypercube. Accordingly, when indexes of 00, 01, 10, and 11 are assigned to four arithmetic processing circuits 20, communication is performed as follows. The arithmetic processing circuit 20 having the index of 00 communicates with the nodes having the indexes of 10 and 01. In addition, the arithmetic processing circuit 20 having the index of 01 communicates with the arithmetic processing circuits 20 having the indexes of 00 and 11. The arithmetic processing circuit 20 having the index of 10 communicates with the nodes having the indexes of 00 and 11. In addition, the arithmetic processing circuit 20 having the index of 11 communicates with the arithmetic processing circuits 20 having the indexes of 10 and 01.

In addition, while in the present embodiment, description is made of a case where arithmetic processing circuits 20 are coupled so as to form a two-dimensional hypercube, hypercubes of three dimensions or more may also have functions similar to functions to be described in the following. Arithmetic processing circuits 20 directly coupled to a particular arithmetic processing circuit 20 without the intervention of another arithmetic processing circuit 20 among arithmetic processing circuits 20 coupled so as to form a hypercube correspond to an example of arithmetic processing circuits 20 "adjacent" to the particular arithmetic processing circuit 20. The number of the arithmetic processing circuits 20 directly coupled to the particular arithmetic processing circuit 20 without the intervention of another arithmetic processing circuit 20 corresponds to the dimensions of the hypercube.

Figure 3A:
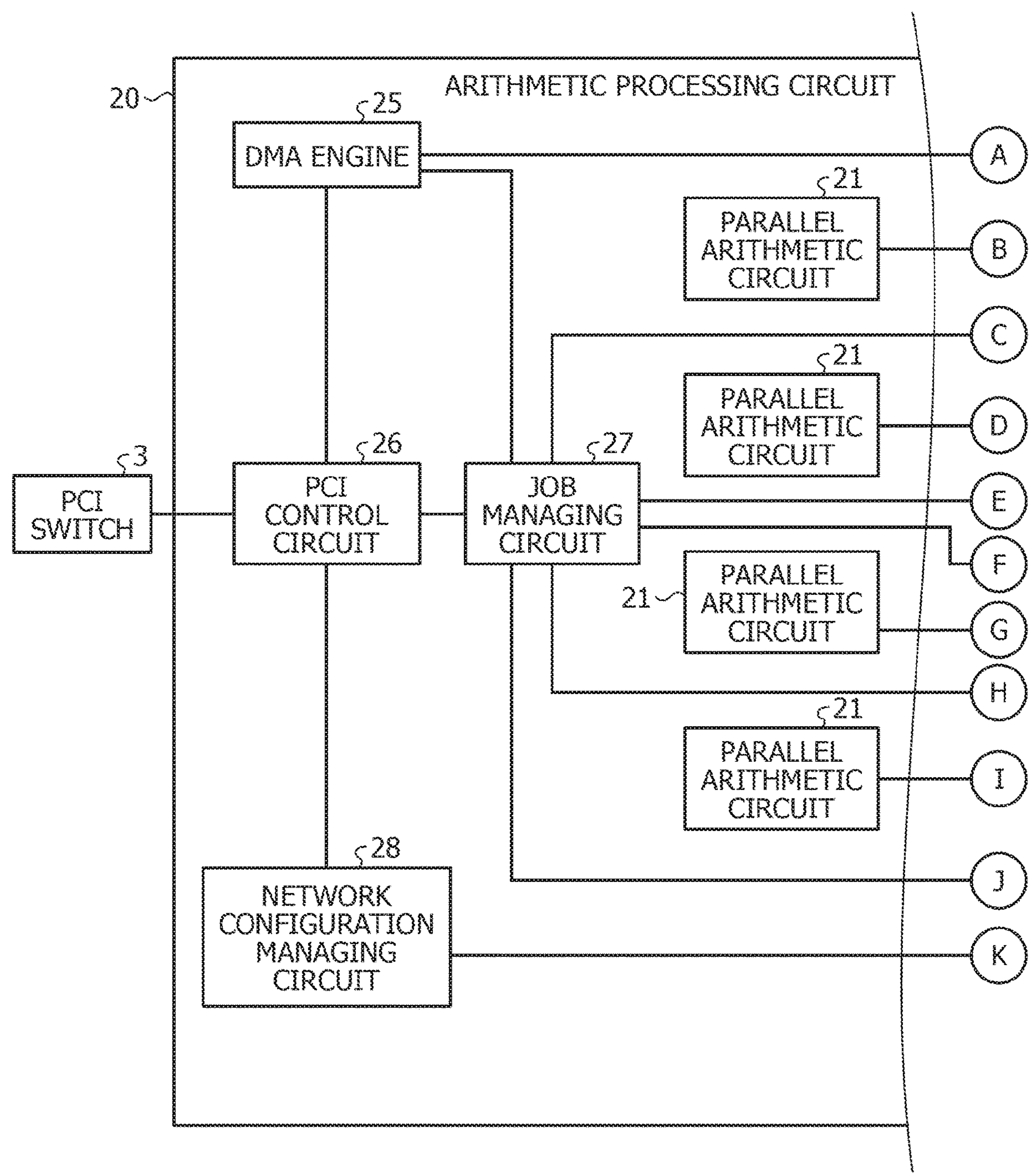
FIGS. 3A and 3B illustrate diagrams of a hardware configuration of an arithmetic processing circuit.
Figure 3B:
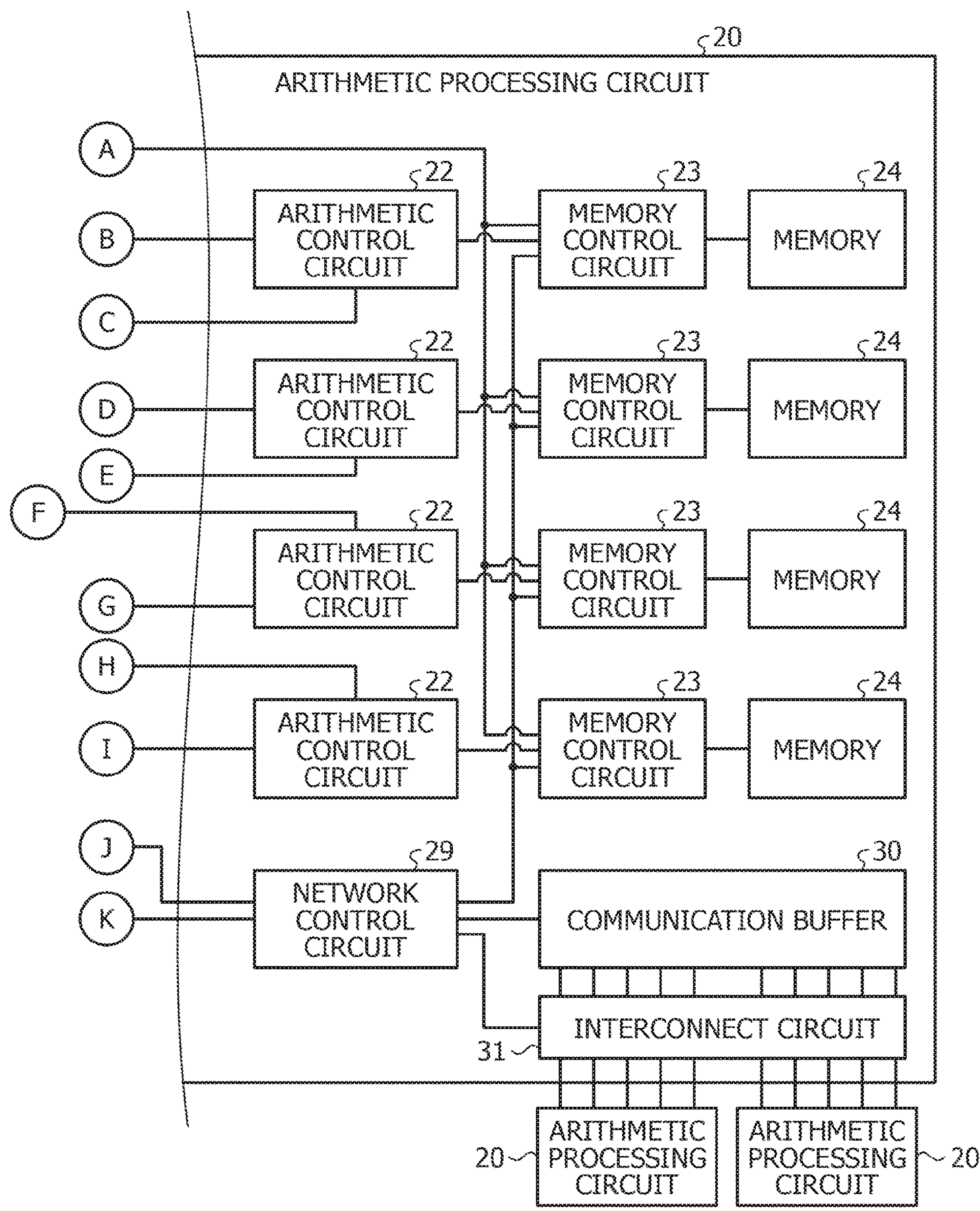

FIGS. 3A and 3B illustrate diagrams of a hardware configuration of an arithmetic processing circuit. The arithmetic processing circuit 20 includes parallel arithmetic circuits 21, arithmetic control circuits 22, memory control circuits 23, and memories 24. The arithmetic processing circuit 20 further includes a direct memory access (DMA) engine 25, a PCI control circuit 26, a job managing circuit 27, a network configuration managing circuit 28, a network control circuit 29, a communication buffer 30, and an interconnect circuit 31. Here, while FIGS. 3A and 3B includes four parallel arithmetic circuits 21, four arithmetic control circuits 22, four memory control circuits 23, and four memories 24, the numbers thereof are not particularly limited.

The PCI control circuit 26 controls communication using PCI between the DMA engine 25, the job managing circuit 27, and the network configuration managing circuit 28 and the PCI switch 3.

The job managing circuit 27 receives input of an operation instruction for performing a job transmitted from the CPU 2 via the PCI switch 3 and the PCI control circuit 26. The job managing circuit 27 handles the obtained operation instruction as a queue. The job managing circuit 27 outputs the operation instruction to the arithmetic control circuits 22. Thereafter, the job managing circuit 27 receives input of operation results from the arithmetic control circuits 22. Then, the job managing circuit 27 integrates the operation results obtained from each arithmetic control circuit 22, and thereby obtains a result of the job. The job managing circuit 27 thereafter outputs the result of the job to the CPU 2 via the PCI control circuit 26 and the PCI switch 3 or the like.

The arithmetic control circuits 22 obtain data from the memories 24 via the memory control circuits 23 according to the operation instruction. Then, the arithmetic control circuits 22 output the obtained data and the operation instruction to the parallel arithmetic circuits 21. Thereafter, the arithmetic control circuits 22 obtain operation results from the parallel arithmetic circuits 21. Next, the arithmetic control circuits 22 output the operation results to the job managing circuit 27.

The parallel arithmetic circuits 21 receive input of the data and the operation instruction from the arithmetic control circuits 22. Then, the parallel arithmetic circuits 21 perform specified operation using the obtained data. Thereafter, the parallel arithmetic circuits 21 output operation results to the arithmetic control circuits 22.

The network configuration managing circuit 28 obtains a connection table within the system board 1 from a device driver executed by the CPU 2. The connection table includes a state of interconnect coupling between the arithmetic processing circuits 20. The network configuration managing circuit 28 outputs the obtained connection table to the network control circuit 29.

The network control circuit 29 is coupled to the communication buffer 30 and the interconnect circuit 31. The network control circuit 29 controls communication with another arithmetic processing circuit 20 via the interconnect by using the communication buffer 30 and the interconnect circuit 31. For example, the network control circuit 29 writes data to be transmitted to the communication buffer 30. Then, the network control circuit 29 transmits the data to the other arithmetic processing circuit 20 by instructing the interconnect circuit 31 to transmit the data stored in the communication buffer 30.

The network control circuit 29 obtains the connection table of the system board 1 from the network configuration managing circuit 28. Further, the network control circuit 29 obtains, from the job managing circuit 27, information related to communication between the arithmetic processing circuits 20, the communication being performed in the job being performed. Then, the network control circuit 29 determines a communication destination and data to be transmitted by using the connection table according to the obtained information related to the communication. Next, the network control circuit 29 outputs a request to obtain the data determined for transmission to the memory control circuits 23. Thereafter, the network control circuit 29 receives input of the data in response to the obtainment request from the memory control circuits 23. Then, the network control circuit 29 transmits the obtained data to the determined communication destination.

In addition, the network control circuit 29 receives a notification of reception of data from the interconnect circuit 31. Then, the network control circuit 29 obtains the data received from another arithmetic processing circuit 20 and stored in the communication buffer 30. Then, the network control circuit 29 outputs a writing instruction to the memory control circuits 23 together with the obtained data.

The communication between the arithmetic processing circuits 20, the communication being performed by the network control circuit 29, includes the processing of Allreduce. The processing of Allreduce via the interconnect by the network control circuit 29 will be described later in detail.

The communication buffer 30 is a temporary storage area in communication via the interconnect between the arithmetic processing circuits 20. The communication buffer 30 stores data to be transmitted to other arithmetic processing circuits 20. In addition, the communication buffer 30 stores data received from the other arithmetic processing circuits 20.

The interconnect circuit 31 couples to the interconnect circuits 31 of the other arithmetic processing circuits 20 by the interconnect. The interconnect circuit 31 performs communication via the interconnect with the other arithmetic processing circuits 20. The interconnect circuit 31 receives a data transmission instruction from the network control circuit 29, and reads data from the communication buffer 30. Then, the interconnect circuit 31 transmits the read data to an arithmetic processing circuit 20 as a communication destination specified from the network control circuit 29. In addition, when the interconnect circuit 31 receives data from another arithmetic processing circuit 20, the interconnect circuit 31 stores the received data in the communication buffer 30. Further, the interconnect circuit 31 notifies the reception of the data to the network control circuit 29.

The DMA engine 25 controls access to the memories 24 of another arithmetic processing circuit 20 coupled by a PCI bus without the intervention of the CPU 2 or the like. The DMA engine 25 receives input of information related to communication using PCI in the job from the job managing circuit 27. Then, according to the information related to the communication using PCI in the job, the DMA engine 25 instructs the memory control circuits 23 to read data. Thereafter, the DMA engine 25 receives, from the memory control circuits 23, input of the read data from the memories 24. Then, the DMA engine 25 transmits the obtained data to the memories 24 of the arithmetic processing circuit 20 as a transmission destination via the PCI control circuit 26 and the PCI switch 3.

In addition, the DMA engine 25 receives, from the PCI control circuit 26, data transmitted from the DMA engine 25 of another arithmetic processing circuit 20 by DMA. Then, the DMA engine 25 instructs the memory control circuits 23 to write the received data.

The memory control circuits 23 control reading and writing of data from and to the memories 24 coupled thereto. The memory control circuits 23 read data from the memories 24 according to a reading instruction from the DMA engine 25, and output the read data to the DMA engine 25. In addition, the memory control circuits 23 write data to the memories 24 according to a writing instruction from the DMA engine 25.

In addition, the memory control circuits 23 read data from the memories 24 according to a reading instruction from the network control circuit 29, and output the read data to the DMA engine 25. In addition, the memory control circuits 23 write data to the memories 24 according to a writing instruction from the network control circuit 29.

Description will next be made of details of the processing of Allreduce by the network control circuit 29. The arithmetic processing system according to the present embodiment performs the processing of Allreduce by performing a Halving operation and a Doubling operation. In the following, the Halving operation will be referred to simply as "Halving," and the Doubling operation will be referred to simply as "Doubling." Further, the processing of Allreduce will be referred to simply as "Allreduce."

Figure 4B:
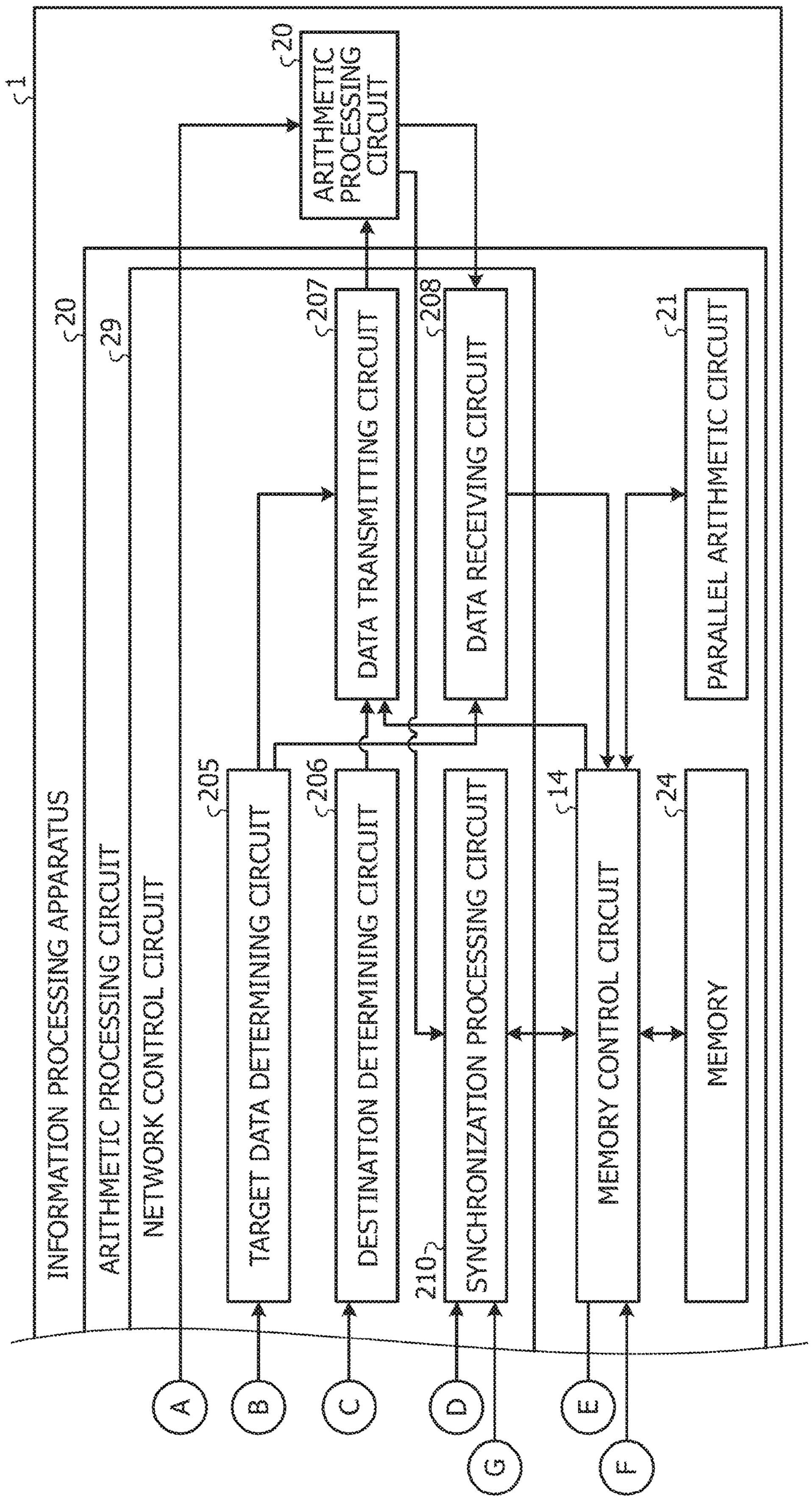

FIGS. 4A and 4B illustrate block diagrams of a network control circuit. As illustrated in FIGS. 4A and 4B, the network control circuit 29 includes a process identification (ID) allocating circuit 201, a thread generating circuit 202, a centralized control circuit 203, a transmission and reception data size calculating circuit 204, a target data determining circuit 205, a destination determining circuit 206, and a data transmitting circuit 207. The network control circuit 29 further includes a data receiving circuit 208 and a synchronization processing circuit 210.

Here, an arithmetic circuit possessed by the network control circuit 29 implements functions of the process ID allocating circuit 201, the thread generating circuit 202, the centralized control circuit 203, the transmission and reception data size calculating circuit 204, and the target data determining circuit 205 illustrated in FIGS. 4A and 4B. In addition, the arithmetic circuit implements functions of the destination determining circuit 206, the data transmitting circuit 207, the data receiving circuit 208, and the synchronization processing circuit 210.

In addition, as illustrated in FIG. 3B, the network control circuit 29 actually communicates with the other arithmetic processing circuits 20 via the communication buffer 30 and the interconnect circuit 31. However, for the convenience of description, the description will be made with the communication buffer 30 and the interconnect circuit 31 omitted. In the following description, an arithmetic processing circuit 20 to be described will be referred to as an own arithmetic processing circuit to be distinguished from the other arithmetic processing circuits 20.

The process ID allocating circuit 201 obtains the connection table from the network configuration managing circuit 28. Then, using the connection table, the process ID allocating circuit 201 allocates process IDs whose number is up to $2^n-1$ counting from zero to the own arithmetic processing circuit and the other arithmetic processing circuits 20, the other arithmetic processing circuits 20 being coupled so as to form a hypercube together with the own arithmetic processing circuit. "n" in this case is the dimensions of the hypercube. The process IDs correspond to an example of "identification number information" of the arithmetic processing circuits.

Figure 5:
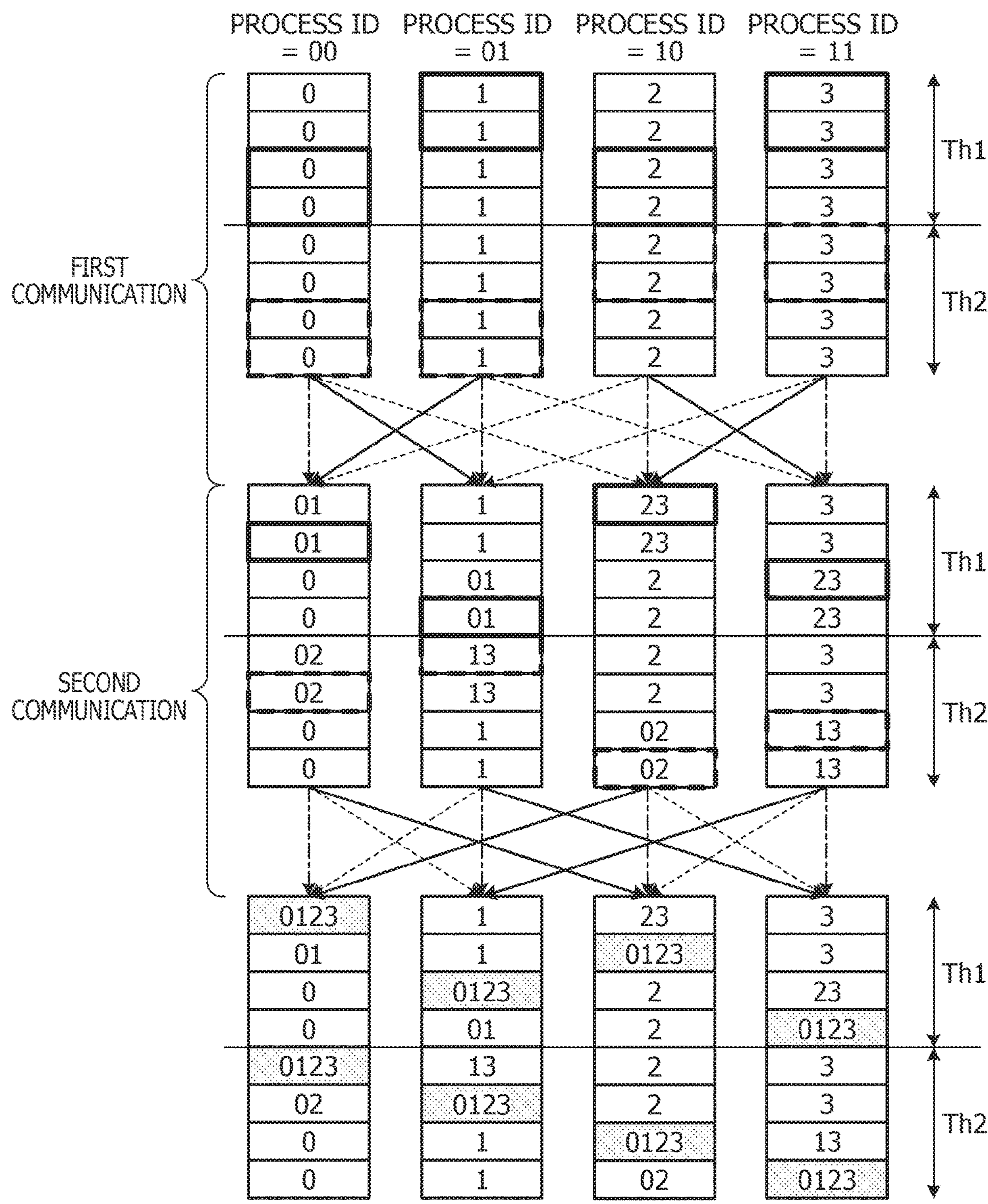
FIG. 5 is a diagram illustrating an outline of a flow of processing in Halving.

Here, the process ID allocating circuit 201 allocates the process IDs by a rule similar to that of the indexes allocated to the respective nodes illustrated in FIG. 2. For example, the arithmetic processing circuits 20 according to the present embodiment are coupled so as to form a two-dimensional hypercube, and the process ID allocating circuit 201 allocates 00, 01, 10, and 11 as process IDs to the respective arithmetic processing circuits 20. In this case, the process ID allocating circuit 201 allocates process IDs different from each other in the value of one bit to the adjacent arithmetic processing circuits 20 coupled by the interconnect. FIG. 5 is a diagram illustrating an outline of a flow of processing in Halving. The process ID allocating circuit 201 allocates the process IDs illustrated in FIG. 5 to the respective arithmetic processing circuits 20. Here, eight boxes arranged in a vertical direction facing a paper plane in FIG. 5 represent blocks, and a set of eight blocks corresponds to a data string possessed by one process. Then, numbers within respective blocks in FIG. 5 represent data strings calculated by the respective processes. Here, in FIG. 5, data strings corresponding to respective blocks included in one process are represented by a same number. This indicates that the process performing operation is the same. In actuality, data strings corresponding to respective blocks have respective different values.

The process ID allocating circuit 201 thereafter outputs information related to the process IDs allocated to the respective arithmetic processing circuits 20 to the centralized control circuit 203. In addition, the process ID allocating circuit 201 notifies the information related to the process IDs allocated to the respective arithmetic processing circuits 20 to the arithmetic processing circuits 20 as process ID allocation targets. Here, in a case of an arithmetic processing circuit 20 receiving the notification of the process IDs from another arithmetic processing circuit 20, the process ID allocating circuit 201 receives the notification of the process IDs allocated to the respective arithmetic processing circuits 20 from the other arithmetic processing circuit 20. Then, the process ID allocating circuit 201 outputs the obtained information related to the process IDs allocated to the respective arithmetic processing circuits 20 to the thread generating circuit 202.

The thread generating circuit 202 obtains, from the centralized control circuit 203, the process IDs allocated to the respective arithmetic processing circuits 20 by the process ID allocating circuit 201. Further, the thread generating circuit 202 receives input of a process to be processed by the arithmetic processing circuit 20 in which the thread generating circuit 202 itself is included from the centralized control circuit 203. Then, when an instruction to perform the processing of Allreduce is given in the obtained process, the thread generating circuit 202 performs the following processing.

The thread generating circuit 202 obtains the dimensions of the hypercube including the own arithmetic processing circuit. In the present embodiment, the thread generating circuit 202 obtains two as the dimensions of the hypercube in which the own arithmetic processing circuit is included. Then, the thread generating circuit 202 divides a data string calculated by the obtained process into $n\times2^n$ blocks. "n" in this case is the dimensions of the hypercube. For example, in the present embodiment, the thread generating circuit 202 divides the data string of the process into eight blocks, as illustrated in FIG. 5.

Further, supposing that the hypercube has n dimensions, the thread generating circuit 202 generates n threads by separating the generated blocks into sets of $2^n$ blocks each. For example, in the present embodiment, the thread generating circuit 202 generates two threads, for example, threads Th1 and Th2 illustrated in FIG. 5. In addition, the thread generating circuit 202 assigns a cyclic ID of n bits to each thread. For example, the thread generating circuit 202 generates n cyclic IDs of n bits in which the value of an sth ($1\leq s\leq n$) bit of the n bits is one, and the value of the other bits is zero, and assigns the cyclic IDs to the respective threads. In the present embodiment, the thread generating circuit 202 assigns "01" as a cyclic ID to the thread Th1, and assigns "10" as a cyclic ID to the thread Th2. Thereafter, the thread generating circuit 202 outputs information related to the generated threads Th1 and Th2 to the centralized control circuit 203 together with the cyclic IDs assigned to the respective threads Th1 and Th2. The thread generating circuit 202 corresponds to an example of a "dividing circuit." A thread corresponds to an example of a "group."

The centralized control circuit 203 receives, from the thread generating circuit 202, input of the process IDs assigned to the respective arithmetic processing circuits 20 including the own arithmetic processing circuit and the data string included in each block. Then, the centralized control circuit 203 outputs the process IDs assigned to the respective arithmetic processing circuits 20 including the own arithmetic processing circuit to the thread generating circuit 202. Thereafter, the centralized control circuit 203 receives input of information related to the threads Th1 and Th2 and the cyclic IDs assigned to the threads Th1 and Th2 from the thread generating circuit 202.

Then, the centralized control circuit 203 decides to perform Halving when the processing of Allreduce is started. Then, the centralized control circuit 203 outputs, to the transmission and reception data size calculating circuit 204, the process ID of the own arithmetic processing circuit, the information related to the threads Th1 and Th2, the cyclic IDs assigned to the threads Th1 and Th2, and the data string of each block. The centralized control circuit 203 outputs, to the destination determining circuit 206, the information related to the threads Th1 and Th2, the cyclic IDs assigned to the threads Th1 and Th2, and the process ID of the own arithmetic processing circuit. Then, the centralized control circuit 203 instructs the transmission and reception data size calculating circuit 204 and the destination determining circuit 206 to perform Halving.

The centralized control circuit 203 thereafter receives a notification of completion of a communication from the memory control circuits 23. Then, in a case where the centralized control circuit 203 gave an instruction to perform Halving in the previous communication, the centralized control circuit 203 determines whether or not Halving has been performed the number of times equal to the number of dimensions of the hypercube including the arithmetic processing circuits 20. In the present embodiment, the configuration of a two-dimensional hypercube is adopted. The centralized control circuit 203 therefore determines whether or not Halving has been performed twice.

In the case of the configuration of a two-dimensional hypercube, for example, data strings are transmitted from the respective arithmetic processing circuits 20 in a first communication for the thread Th1, as indicated by solid line arrows in the first communication in FIG. 5. For example, the arithmetic processing circuit 20 having the process ID of 00 and the arithmetic processing circuit 20 having the process ID of 01 exchange data, and the arithmetic processing circuit 20 having the process ID of 10 and the arithmetic processing circuit 20 having the process ID of 11 exchange data. In addition, in the first communication for the thread Th2, data strings are transmitted as indicated by broken line arrows in the first communication in FIG. 5. For example, the arithmetic processing circuit 20 having the process ID of 00 and the arithmetic processing circuit 20 having the process ID of 10 exchange data, and the arithmetic processing circuit 20 having the process ID of 01 and the arithmetic processing circuit 20 having the process ID of 11 exchange data. In addition, arrows of alternate long and short dashed lines in FIG. 5 indicate changes in the data strings possessed by the respective arithmetic processing circuits 20. The transmission data and the determination of transmission destinations in this Halving will be described later in detail.

When Halving has not been performed the number of times equal to the number of dimensions of the hypercube including the arithmetic processing circuits 20, the centralized control circuit 203 instructs the transmission and reception data size calculating circuit 204 and the destination determining circuit 206 to perform a next Halving.

In the case of the configuration of a two-dimensional hypercube, for example, data strings are transmitted from the respective arithmetic processing circuits 20 in a second communication for the thread Th1, as indicated by solid line arrows in the second communication in FIG. 5. For example, the arithmetic processing circuit 20 having the process ID of 00 and the arithmetic processing circuit 20 having the process ID of 10 exchange data, and the arithmetic processing circuit 20 having the process ID of 01 and the arithmetic processing circuit 20 having the process ID of 11 exchange data. In addition, in the second communication for the thread Th2, data strings are transmitted as indicated by broken line arrows in the second communication in FIG. 5. For example, the arithmetic processing circuit 20 having the process ID of 00 and the arithmetic processing circuit 20 having the process ID of 01 exchange data, and the arithmetic processing circuit 20 having the process ID of 10 and the arithmetic processing circuit 20 having the process ID of 11 exchange data. Each of the arithmetic processing circuits 20 thereby retains a data string obtained by integrating the data strings of different blocks in the thread Th1. In addition, each of the arithmetic processing circuits 20 retains a data string obtained by integrating the data strings of different blocks in the thread Th2.

When Halving has been performed the number of times equal to the number of dimensions of the hypercube, on the other hand, the centralized control circuit 203 determines whether or not to perform the processing of Allreduce with arithmetic processing circuits 20 not included in the hypercube. In the present embodiment, as illustrated in FIGS. 1A and 1B, the processing of Allreduce is performed also with the arithmetic processing circuits 20 included in the different hypercube. Accordingly, the centralized control circuit 203 decides to perform the processing of Allreduce in an external topology. The centralized control circuit 203 then requests an outside coupling processing performing circuit 209 to perform the processing of Allreduce in the external topology. Thereafter, the centralized control circuit 203 receives a notification of completion of the processing of Allreduce in the external topology from the outside coupling processing performing circuit 209.

Figure 6:
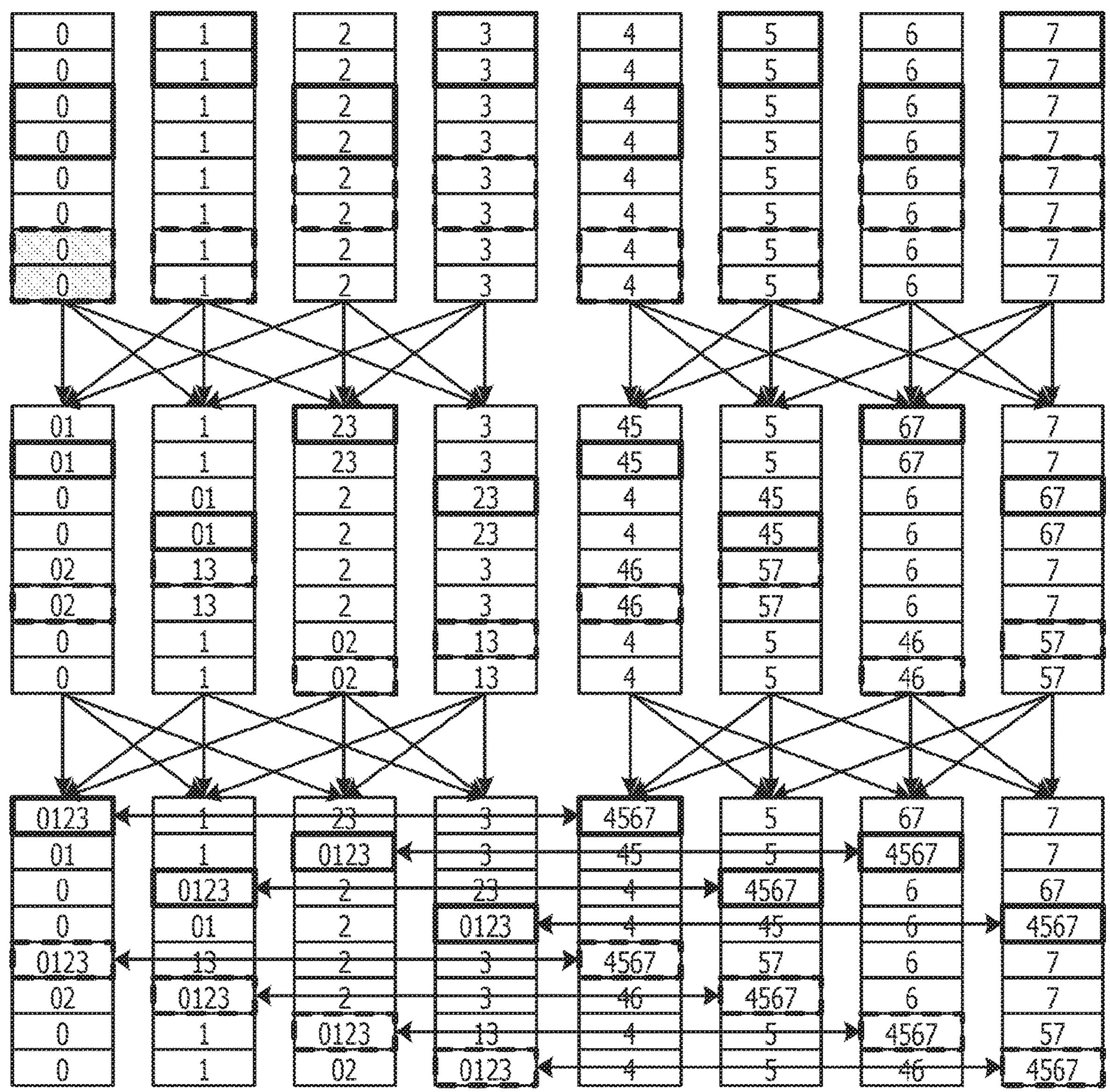
FIG. 6 is a diagram illustrating an outline of a flow of processing up to Allreduces with an external topology.

FIG. 6 is a diagram illustrating an outline of a flow of processing up to Allreduces with an external topology. As an example, the processing of Allreduce in the external topology is performed by a method indicated by thick line arrows in FIG. 6. As an example, arithmetic processing circuits 20 assigned a same process ID between the system boards 1 communicate with each other, and transfer data strings to each other. Each of the arithmetic processing circuits 20 may thereby obtain a data string combined with a result of Halving in the external topology, as indicated by a processing result 250.

When the centralized control circuit 203 receives a notification of completion of the processing of Allreduce in the external topology from the outside coupling processing performing circuit 209, the centralized control circuit 203 instructs the transmission and reception data size calculating circuit 204 and the destination determining circuit 206 to perform Doubling. The centralized control circuit 203 thereafter receives a notification of completion of a communication from the memory control circuits 23. Then, in a case where the centralized control circuit 203 gave an instruction to perform Doubling in the previous communication, the centralized control circuit 203 determines whether or not Doubling has been performed the number of times equal to the number of dimensions of the hypercube including the arithmetic processing circuits 20. In the present embodiment, the configuration of a two-dimensional hypercube is adopted. The centralized control circuit 203 therefore determines whether or not Doubling has been performed twice.

Figure 7:
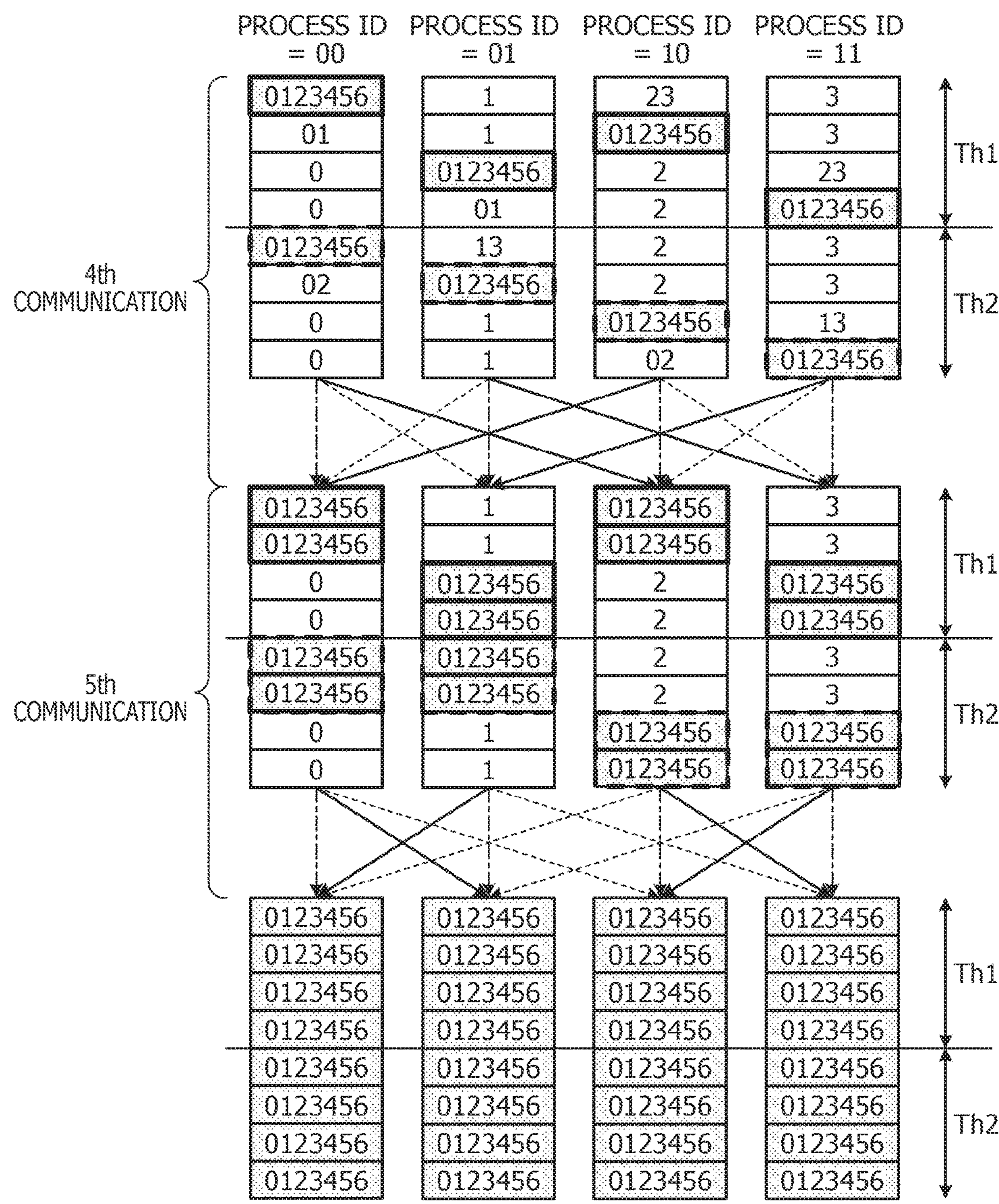
FIG. 7 is a diagram illustrating an outline of a flow of processing in Doubling.

FIG. 7 is a diagram illustrating an outline of a flow of processing in Doubling. In the case of the configuration of a two-dimensional hypercube, for example, data strings are transmitted from the respective arithmetic processing circuits 20 in a first communication of Doubling for the thread Th1, as indicated by solid line arrows in a fourth communication in FIG. 7. For example, the arithmetic processing circuit 20 having the process ID of 00 and the arithmetic processing circuit 20 having the process ID of 10 exchange data, and the arithmetic processing circuit 20 having the process ID of 01 and the arithmetic processing circuit 20 having the process ID of 11 exchange data. In addition, in the first communication of Doubling for the thread Th2, data strings are transmitted as indicated by broken line arrows in the fourth communication in FIG. 7. For example, the arithmetic processing circuit 20 having the process ID of 00 and the arithmetic processing circuit 20 having the process ID of 01 exchange data, and the arithmetic processing circuit 20 having the process ID of 10 and the arithmetic processing circuit 20 having the process ID of 11 exchange data.

Further, in the case of the configuration of a two-dimensional hypercube, data strings are transmitted from the respective arithmetic processing circuits 20 in a second communication of Doubling for the thread Th1, as indicated by solid line arrows in a fifth communication in FIG. 7. For example, the arithmetic processing circuit 20 having the process ID of 00 and the arithmetic processing circuit 20 having the process ID of 01 exchange data, and the arithmetic processing circuit 20 having the process ID of 10 and the arithmetic processing circuit 20 having the process ID of 11 exchange data. In addition, in the second communication of Doubling for the thread Th2, data strings are transmitted as indicated by broken line arrows in the fifth communication in FIG. 7. For example, the arithmetic processing circuit 20 having the process ID of 00 and the arithmetic processing circuit 20 having the process ID of 10 exchange data, and the arithmetic processing circuit 20 having the process ID of 01 and the arithmetic processing circuit 20 having the process ID of 11 exchange data. Consequently, as illustrated in FIG. 7, after the fifth communication, all of the arithmetic processing circuits 20 included in the two-dimensional hypercube have data strings of a same value in each block. The transmission data and the determination of transmission destinations in this Doubling will be described later in detail.

Here, unlike the present embodiment, there is a case where the processing of Allreduce is completed between the arithmetic processing circuits 20 included in the hypercube including the own arithmetic processing circuit. In that case, the centralized control circuit 203 immediately proceeds to Doubling after completion of Halving.

When Doubling has not been performed the number of times equal to the number of dimensions of the hypercube including the arithmetic processing circuits 20, the centralized control circuit 203 instructs the transmission and reception data size calculating circuit 204 and the destination determining circuit 206 to perform a next Doubling.

When Doubling has been performed the number of times equal to the number of dimensions of the hypercube including the arithmetic processing circuits 20, on the other hand, the centralized control circuit 203 notifies performance of synchronization processing in an internal topology to the synchronization processing circuit 210. When the centralized control circuit 203 thereafter receives a notification of completion of synchronization in the internal topology from the synchronization processing circuit 210, the centralized control circuit 203 notifies performance of synchronization processing in the external topology to the synchronization processing circuit 210. When the centralized control circuit 203 thereafter receives a notification of completion of synchronization in the external topology from the synchronization processing circuit 210, the centralized control circuit 203 determines that the processing of Allreduce is completed. Then, the centralized control circuit 203 notifies the job managing circuit 27 of completion of the processing of Allreduce.

The transmission and reception data size calculating circuit 204 receives, from the centralized control circuit 203, input of the information related to the threads Th1 and Th2, the cyclic IDs assigned to the threads Th1 and Th2, and the data string of each block. Then, the transmission and reception data size calculating circuit 204 calculates a data size for performing transmission and reception.

In a case where the arithmetic processing circuits 20 are coupled so as to form an n-dimensional hypercube, when the transmission and reception data size calculating circuit 204 is instructed to perform Halving, the transmission and reception data size calculating circuit 204 sets the blocks of $2^n-1$ data strings as a data size for transmission and reception in a first communication. Thereafter, as the number of communications increases, the transmission and reception data size calculating circuit 204 sets ½ of the blocks for transmission and reception as a data size. For example, in the second communication, the transmission and reception data size calculating circuit 204 sets $(2^n-1)\times½$ blocks as a data size for transmission and reception. In the present embodiment, the transmission and reception data size calculating circuit 204 sets two blocks as a data size for transmission and reception in the first communication. Further, the transmission and reception data size calculating circuit 204 sets one block as a data size for transmission and reception in the second communication. Thereafter, the transmission and reception data size calculating circuit 204 outputs the determined data sizes for transmission and reception to the target data determining circuit 205. In addition, the transmission and reception data size calculating circuit 204 outputs, to the target data determining circuit 205, the information related to the threads Th1 and Th2, the cyclic IDs assigned to the threads Th1 and Th2, and the data string of each block.

When the transmission and reception data size calculating circuit 204 is instructed to perform Doubling, on the other hand, the transmission and reception data size calculating circuit 204 sets the block of one data string as a data size for transmission and reception in the first communication. Thereafter, as the number of communications increases, the transmission and reception data size calculating circuit 204 sets double the block for transmission and reception as a data size. For example, in the second communication, the transmission and reception data size calculating circuit 204 sets two blocks as a data size for transmission and reception. In the present embodiment, the transmission and reception data size calculating circuit 204 sets one block as a data size for transmission and reception in the first communication. Further, the transmission and reception data size calculating circuit 204 sets two blocks as a data size for transmission and reception in the second communication. Thereafter, the transmission and reception data size calculating circuit 204 outputs the determined data sizes for transmission and reception to the target data determining circuit 205. In addition, the transmission and reception data size calculating circuit 204 outputs the information related to the threads Th1 and Th2, the cyclic IDs assigned to the threads Th1 and Th2, and the data string of each block to the target data determining circuit 205.

The target data determining circuit 205 receives, from the transmission and reception data size calculating circuit 204, input of the data sizes for transmission and reception, the information related to the threads Th1 and Th2, the cyclic IDs assigned to the threads Th1 and Th2, and the data string of each block. The target data determining circuit 205 fixes the arrangement order of each block. The target data determining circuit 205 maintains the arrangement order of the blocks until the processing of Allreduce is completed.

Figure 8:
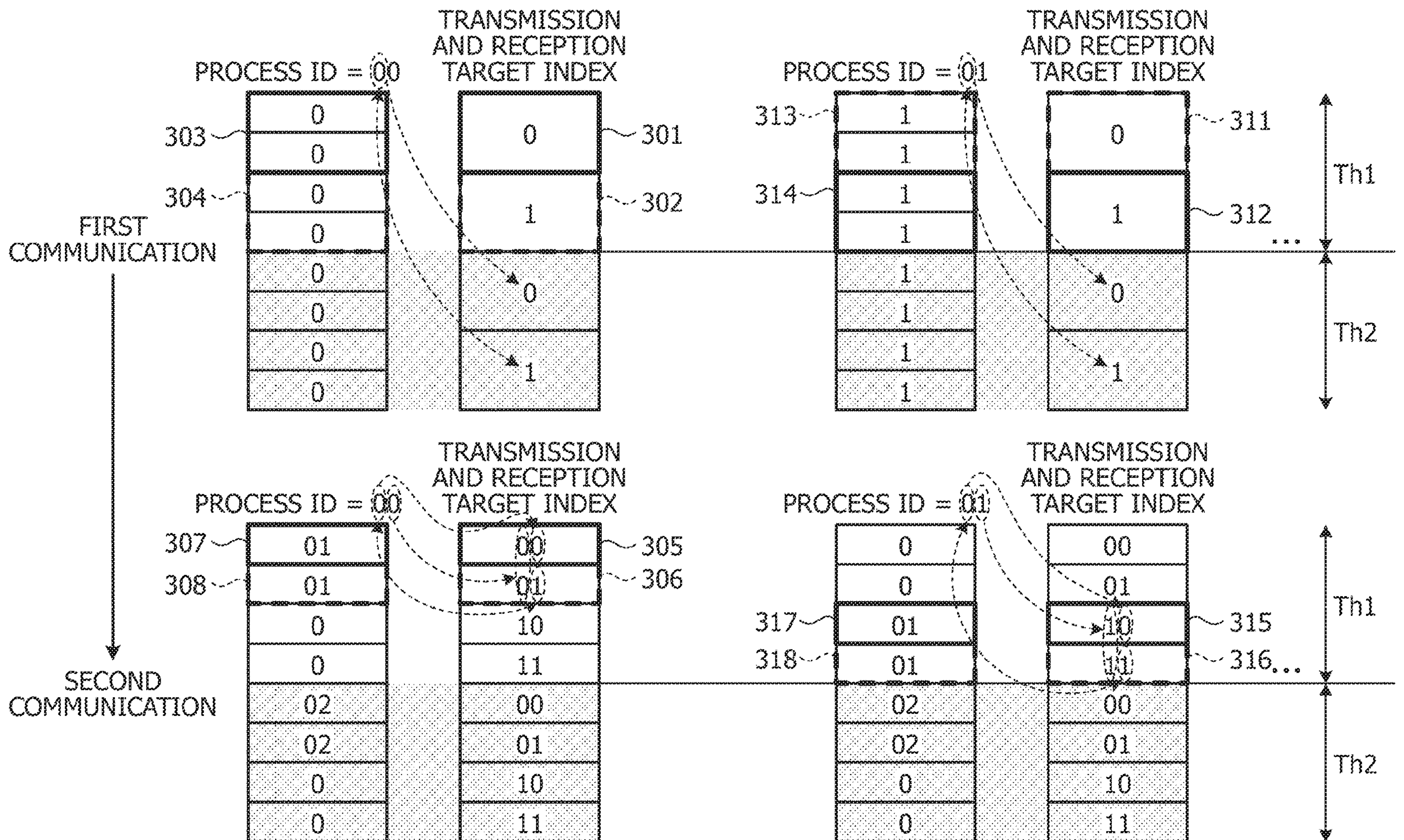
FIG. 8 is a diagram of assistance in explaining a method of determining data blocks for transmission and reception on a thread Th1 side.

FIG. 8 is a diagram of assistance in explaining a method of determining data blocks for transmission and reception on a thread Th1 side. As an example, the target data determining circuit 205 fixes the arrangement order of blocks in order illustrated in FIG. 8. In the following, relation of the blocks whose arrangement order is fixed as in FIG. 8 will be described using a vertical direction facing a paper plane. The target data determining circuit 205 determines data strings for transmission and reception for the respective threads Th1 and Th2. The following description will be made of details of a method of determining data for transmission and reception by the target data determining circuit 205.

When the target data determining circuit 205 is instructed to perform Halving, the target data determining circuit 205 generates target determination groups by dividing the threads Th1 and Th2 by the data size for transmission and reception. The target data determining circuit 205 divides the threads Th1 and Th2 into two in the first communication. In the second or subsequent communications, the target data determining circuit 205 divides the threads Th1 and Th2 by a number twice that of a previous communication as the number of communications increases. For example, in the case of the second communication, the target data determining circuit 205 divides the threads Th1 and Th2 into four.

In the present embodiment, when the process ID of the arithmetic processing circuit 20 is 00, the target data determining circuit 205 divides the thread Th1 into target determination groups 301 and 302 in FIG. 8 in the first communication. In addition, in the second communication, the target data determining circuit 205 divides the thread Th1 into four target determination groups including target determination groups 305 and 306.

Similarly, when the process ID of the arithmetic processing circuit 20 is 01, the target data determining circuit 205 divides the thread Th1 into target determination groups 311 and 312 in FIG. 8 in the first communication. In addition, in the second communication, the target data determining circuit 205 divides the thread Th1 into four target determination groups including target determination groups 315 and 316. In the following, the arrangement of the target determination groups will also be described in the vertical direction facing the paper plane so as to correspond to the arrangement of blocks.

Next, the target data determining circuit 205 assigns transmission and reception target indexes to the generated target determination groups. Here, the target data determining circuit 205 assigns the target determination groups the number of k bits (k digits) represented by a binary number as a kth transmission and reception target index such that the number of k bits sequentially increases from a top to a bottom. In the case of the first communication, the target data determining circuit 205 assigns the target determination groups a binary number represented by one bit as a transmission and reception target index such that the binary number sequentially increases. In addition, in the case of the second communication, the target data determining circuit 205 assigns the target determination groups a binary number represented by 2 bits as a transmission and reception target index such that the binary number sequentially increases.

In the present embodiment, in the first communication, when the process ID of the arithmetic processing circuit 20 is 00, the target data determining circuit 205 assigns "0" as a transmission and reception target index to the target determination group 301, as illustrated in FIG. 8. In addition, the target data determining circuit 205 assigns "1" as a transmission and reception target index to the target determination group 302.

Similarly, when the process ID of the arithmetic processing circuit 20 is 01, the target data determining circuit 205 assigns "0" as a transmission and reception target index to the target determination group 311 in the first communication. In addition, the target data determining circuit 205 assigns "1" as a transmission and reception target index to the target determination group 312.

In addition, in the second communication, when the process ID of the arithmetic processing circuit 20 is 00, the target data determining circuit 205 assigns "00" as a transmission and reception target index to the target determination group 305. In addition, the target data determining circuit 205 assigns "01" as a transmission and reception target index to the target determination group 306. In addition, the target data determining circuit 205 assigns "10" and "11" as respective transmission and reception target indexes to the two other target determination groups following below.

Similarly, when the process ID of the arithmetic processing circuit 20 is 01, the target data determining circuit 205 assigns "00" as a transmission and reception target index to the topmost target determination group in the second communication. In addition, the target data determining circuit 205 assigns "01" as a transmission and reception target index to the target determination group below the topmost target determination group. Further, the target data determining circuit 205 assigns "10" as a transmission and reception target index to the target determination group 315, and assigns "11" as a transmission and reception target index to the target determination group 316.

Next, the target data determining circuit 205 determines an area to be set as a transmission target and an area to be set as a reception target from among transmission and reception target groups. Here, an area to be set as a reception target is an area of data to be set as a target of operation using received data.

For example, in the first communication, the target data determining circuit 205 sets, as a reception target area, a target determination group in which a first bit of the process ID and the transmission and reception target index are a same value. In addition, the target data determining circuit 205 sets, as a transmission target area, a target determination group in which a value obtained by inverting the first bit of the process ID and the transmission and reception target index are a same value.

For example, when the process ID is 00, the first bit is "0," and therefore the target data determining circuit 205 sets the target determination group 301 having a transmission and reception target index of "0" as the reception target area. In addition, the target data determining circuit 205 sets the target determination group 302 having a transmission and reception target index of "1" as the transmission target area. In addition, when the process ID is 01, the first bit is "1," and therefore the target data determining circuit 205 sets the target determination group 312 having a transmission and reception target index of "1" as the reception target area. In addition, the target data determining circuit 205 sets the target determination group 311 having a transmission and reception target index of "0" as the transmission target area.

Then, the target data determining circuit 205 sets, as reception target data, the data strings of blocks corresponding to the target determination group set as the reception target area. In addition, the target data determining circuit 205 sets, as transmission target data, the data strings of blocks corresponding to the target determination group set as the transmission target area.

For example, in the first communication, the target data determining circuit 205 of the arithmetic processing circuit 20 having the process ID of 00 sets, as the reception target data, the data strings of blocks included in an area 303 corresponding to the target determination group 301. In addition, the target data determining circuit 205 sets, as the transmission target data, the data strings of blocks included in an area 304 corresponding to the target determination group 302.

In addition, in the first communication, the target data determining circuit 205 of the arithmetic processing circuit 20 having the process ID of 01 sets, as the reception target data, the data strings of blocks included in an area 314 corresponding to the target determination group 312. In addition, the target data determining circuit 205 sets, as the transmission target data, the data strings of blocks included in an area 313 corresponding to the target determination group 311.

Next, in the second communication, the target data determining circuit 205 sets target determination groups in which the value of the first bit of the process ID and the value of a second bit of the transmission and reception target index are a same value as target determination groups for transmission and reception targets. For example, the target determination group included in the reception target area in the previous communication becomes the target determination groups for transmission and reception targets in the present communication. Further, the target data determining circuit 205 selects a target determination group in which the value of a second bit of the process ID and the value of a first bit of the transmission and reception target index are a same value as the reception target area from the target determination groups for transmission and reception targets. In addition, the target data determining circuit 205 sets, as the transmission target area, a target determination group in which a value obtained by inverting the second bit of the process ID and the value of the first bit of the transmission and reception target index are a same value.

For example, when the process ID is 00, the first bit is "0," and therefore the target data determining circuit 205 sets the target determination groups 305 and 306 in which the second bit of the transmission and reception target index is "0" as the target determination groups for transmission and reception targets. Then, when the process ID is 00, the second bit is "0," and therefore the target data determining circuit 205 sets the target determination group 305 in which the first bit of the transmission and reception target index is "0" as the reception target area. In addition, the target data determining circuit 205 sets the target determination group 306 in which the transmission and reception target index is "1" as the transmission target area.

In addition, when the process ID is 01, the first bit is "1," and therefore the target data determining circuit 205 sets the target determination groups 315 and 316 in which the second bit of the transmission and reception target index is "1" as the target determination groups for transmission and reception targets. Then, when the process ID is 01, the second bit is "0," and therefore the target data determining circuit 205 sets the target determination group 315 in which the first bit of the transmission and reception target index is "0" as the reception target area. In addition, the target data determining circuit 205 sets the target determination group 316 in which the transmission and reception target index is "1" as the transmission target area.

Then, the target data determining circuit 205 sets, as the reception target data, the data string of a block corresponding to the target determination group set as the reception target area. In addition, the target data determining circuit 205 sets, as the transmission target data, the data string of a block corresponding to the target determination group set as the transmission target area.

For example, in the second communication, the target data determining circuit 205 of the arithmetic processing circuit 20 having the process ID of 00 sets, as the reception target data, the data string of a block included in an area 307 corresponding to the target determination group 305. In addition, the target data determining circuit 205 sets, as the transmission target data, the data string of a block included in an area 308 corresponding to the target determination group 306. In addition, in the second communication, the target data determining circuit 205 of the arithmetic processing circuit 20 having the process ID of 01 sets, as the reception target data, the data string of a block included in an area 317 corresponding to the target determination group 315. In addition, the target data determining circuit 205 sets, as the transmission target data, the data string of a block included in an area 318 corresponding to the target determination group 316.

In the present embodiment, which represents the case of a two-dimensional hypercube, Halving is completed in the second communication. However, in a case where a coupling is made so as to form a hypercube of three dimensions or more, communication of Halving further continues. In a pth communication, for the thread Th1, the target data determining circuit 205 determines the transmission target area and the reception target area as follows. The target data determining circuit 205 sets, as the target determination groups for transmission and reception targets, target determination groups in which a sequence obtained by reversing the arrangement order of a value from the first bit to a (p−1)th bit of the process ID and a sequence obtained by arranging a value from the second bit to a pth bit of the transmission and reception target index coincide with each other. Then, the target data determining circuit 205 selects a target determination group in which the value of a pth bit of the process ID and the value of the first bit of the transmission and reception target index are a same value as the reception target area from the target determination groups for transmission and reception targets. In addition, the target data determining circuit 205 sets, as the reception target area, a target determination group in which a value obtained by inverting the pth bit of the process ID and the value of the first bit of the transmission and reception target index are a same value.

For example, set as the reception target area is a target determination group in which a sequence obtained by reversing the arrangement order of a value from the first bit to the pth bit of the process ID and a sequence obtained by arranging a value from the first bit to the pth bit of the transmission and reception target index coincide with each other. In addition, set as the transmission target area is a target determination group in which a sequence obtained by inverting a least significant bit in the sequence obtained by reversing the arrangement order of the value from the first bit to the pth bit of the process ID and a sequence obtained by arranging a value from the pth bit to the first bit of the transmission and reception target index coincide with each other.

Figure 9:
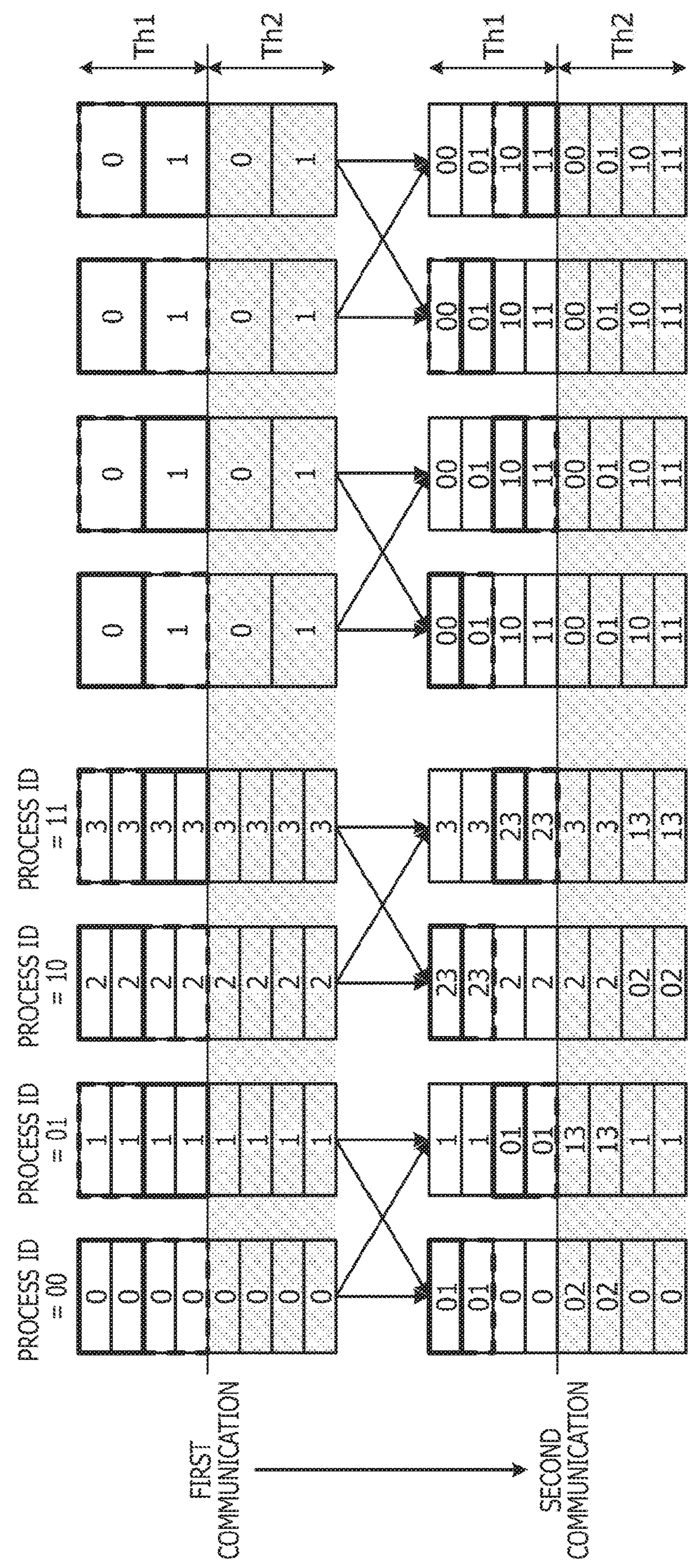
FIG. 9 is a diagram illustrating a whole of Halving for a thread Th1 by four arithmetic processing circuits included in a two-dimensional hypercube.

FIG. 9 is a diagram illustrating a whole of Halving for a thread Th1 by four arithmetic processing circuits included in a two-dimensional hypercube. In FIG. 9, blocks enclosed by solid lines are reception target data. In addition, blocks enclosed by broken lines are transmission target data. A right side facing a paper plane of FIG. 9 represents blocks corresponding to data transmitted and received in the respective arithmetic processing circuits 20, and a left side represents transmission target and reception target areas.

The target data determining circuits 205 of the respective arithmetic processing circuits 20 included in the hypercube select transmission target data and reception target data for the thread Th1 in each communication as illustrated in FIG. 9. Then, for the thread Th1, the target data determining circuits 205 of the respective arithmetic processing circuits 20 repeat transmitting the transmission target data illustrated in FIG. 9, and performing operation using received data and the reception target data illustrated in FIG. 9.

Figure 10:
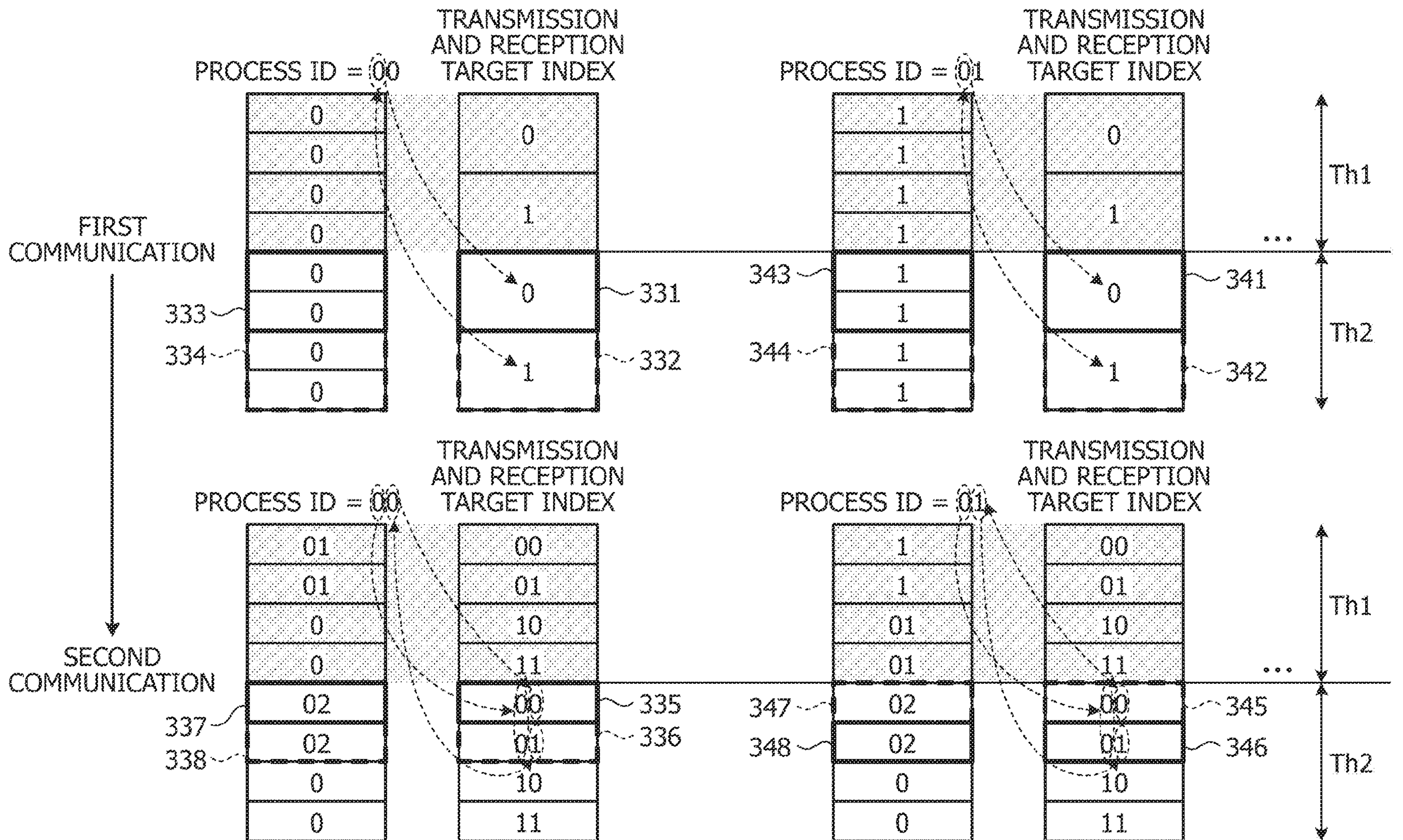
FIG. 10 is a diagram of assistance in explaining a method of determining data blocks for transmission and reception on a thread Th2 side in Halving.

In addition, for the thread Th2, the target data determining circuit 205 generates target determination groups by dividing the thread Th2 by the data size for transmission and reception. The target data determining circuit 205 divides the thread Th2 into two in the first communication. In the second or subsequent communications, the target data determining circuit 205 divides the thread Th2 by a number twice that of a previous communication as the number of communications increases. For example, in the case of the second communication, the target data determining circuit 205 divides the thread Th2 into four. FIG. 10 is a diagram of assistance in explaining a method of determining data blocks for transmission and reception on a thread Th2 side in Halving.

For example, in the present embodiment, when the process ID of the arithmetic processing circuit 20 is 00, the target data determining circuit 205 divides the thread Th2 into target determination groups 331 and 332 in FIG. 10 in the first communication. In addition, in the second communication, the target data determining circuit 205 divides the thread Th2 into four target determination groups including target determination groups 335 and 336. Similarly, when the process ID of the arithmetic processing circuit 20 is 01, the target data determining circuit 205 divides the thread Th2 into target determination groups 341 and 342 in FIG. 10 in the first communication. In addition, in the second communication, the target data determining circuit 205 divides the thread Th2 into four target determination groups including target determination groups 345 and 346.

Next, as in the case of the thread Th1, the target data determining circuit 205 assigns transmission and reception target indexes to the generated target determination groups. In the present embodiment, in the first communication, when the process ID of the arithmetic processing circuit 20 is 00, the target data determining circuit 205 assigns "0" as a transmission and reception target index to the target determination group 331, as illustrated in FIG. 10. In addition, the target data determining circuit 205 assigns "1" as a transmission and reception target index to the target determination group 332.

Similarly, in the first communication, when the process ID of the arithmetic processing circuit 20 is 01, the target data determining circuit 205 assigns "0" as a transmission and reception target index to the target determination group 341, and assigns "1" as a transmission and reception target index to the target determination group 342.

In addition, in the second communication, when the process ID of the arithmetic processing circuit 20 is 00, the target data determining circuit 205 assigns "00" as a transmission and reception target index to the target determination group 335. In addition, the target data determining circuit 205 assigns "01" as a transmission and reception target index to the target determination group 336. In addition, the target data determining circuit 205 assigns "10" and "11" as respective transmission and reception target indexes to the two other target determination groups following below.

Similarly, when the process ID of the arithmetic processing circuit 20 is 01, the target data determining circuit 205 assigns "00" as a transmission and reception target index to the topmost target determination group in the second communication. In addition, the target data determining circuit 205 assigns "01" as a transmission and reception target index to the target determination group below the topmost target determination group. Further, the target data determining circuit 205 assigns "10" and "11" as respective transmission and reception target indexes to the two other target determination groups following below.

Next, the target data determining circuit 205 determines an area to be set as a transmission target and an area to be set as a reception target from among transmission and reception target groups. For example, the target data determining circuit 205 checks the position of a bit having a value of one in the cyclic ID of the thread Th2, and sets the number of the bit having the value of one as a reference for rearrangement. In the present embodiment, the target data determining circuit 205 checks that the value of the second bit is one, and the target data determining circuit 205 sets two as the reference for rearrangement.

In the first communication, the target data determining circuit 205 sets, as the reception target area, a target determination group in which the second bit of the process ID, the second bit being the reference for rearrangement, and the transmission and reception target index are a same value. In addition, the target data determining circuit 205 sets, as the transmission target area, a target determination group in which a value obtained by inverting the second bit of the process ID and the transmission and reception target index are a same value.

For example, when the process ID is 00, the second bit is "0," and therefore the target data determining circuit 205 sets the target determination group 331 having a transmission and reception target index of "0" as the reception target area. In addition, the target data determining circuit 205 sets the target determination group 332 having a transmission and reception target index of "1" as the transmission target area. In addition, when the process ID is 01, the second bit is "0," and therefore the target data determining circuit 205 sets the target determination group 341 having a transmission and reception target index of "0" as the reception target area. In addition, the target data determining circuit 205 sets the target determination group 342 having a transmission and reception target index of "1" as the transmission target area.

Then, the target data determining circuit 205 sets, as reception target data, the data strings of blocks corresponding to the target determination group set as the reception target area. In addition, the target data determining circuit 205 sets, as transmission target data, the data strings of blocks corresponding to the target determination group set as the transmission target area.

For example, in the first communication, the target data determining circuit 205 of the arithmetic processing circuit 20 having the process ID of 00 sets, as the reception target data, the data strings of blocks included in an area 333 corresponding to the target determination group 331. In addition, the target data determining circuit 205 sets, as the transmission target data, the data strings of blocks included in an area 334 corresponding to the target determination group 332.

In addition, in the first communication, the target data determining circuit 205 of the arithmetic processing circuit 20 having the process ID of 01 sets, as the reception target data, the data strings of blocks included in an area 343 corresponding to the target determination group 341. In addition, the target data determining circuit 205 sets, as the transmission target data, the data strings of blocks included in an area 344 corresponding to the target determination group 342. The data strings included in the blocks determined as the transmission target data by the target data determining circuits 205 in the first communication correspond to an example of "first data blocks."

Next, in the second communication, the target data determining circuit 205 sets target determination groups in which the value of the second bit of the process ID, the second bit being the reference for rearrangement, and the value of the second bit of the transmission and reception target index are a same value as target determination groups for transmission and reception targets. For example, the target determination group included in the reception target area in the previous communication becomes the target determination groups for transmission and reception targets in the present communication. Further, the target data determining circuit 205 selects a target determination group in which the value of the first bit of the process ID and the value of the first bit of the transmission and reception target index are a same value as the reception target area from the target determination groups for transmission and reception targets. In addition, the target data determining circuit 205 sets, as the transmission target area, a target determination group in which a value obtained by inverting the first bit of the process ID and the value of the first bit of the transmission and reception target index are a same value.

For example, when the process ID is 00, the second bit is "0," and therefore the target data determining circuit 205 sets the target determination groups 335 and 336 in which the second bit of the transmission and reception target index is "0" as the target determination groups for transmission and reception targets. Then, when the process ID is 00, the first bit is "0," and therefore the target data determining circuit 205 sets the target determination group 335 in which the first bit of the transmission and reception target index is "0" as the reception target area. In addition, the target data determining circuit 205 sets the target determination group 336 in which the first bit of the transmission and reception target index is "1" as the transmission target area.

In addition, when the process ID is 01, the second bit is "0," and therefore the target data determining circuit 205 sets the target determination groups 345 and 346 in which the second bit of the transmission and reception target index is "0" as the target determination groups for transmission and reception targets. Then, when the process ID is 01, the first bit is "1," and therefore the target data determining circuit 205 sets the target determination group 346 in which the first bit of the transmission and reception target index is "1" as the reception target area. In addition, the target data determining circuit 205 sets the target determination group 345 in which the first bit of the transmission and reception target index is "0" as the transmission target area.

Then, the target data determining circuit 205 sets, as reception target data, the data string of a block corresponding to the target determination group set as the reception target area. In addition, the target data determining circuit 205 sets, as transmission target data, the data string of a block corresponding to the target determination group set as the transmission target area.

For example, in the second communication, the target data determining circuit 205 of the arithmetic processing circuit 20 having the process ID of 00 sets, as the reception target data, the data string of a block included in an area 337 corresponding to the target determination group 335. In addition, the target data determining circuit 205 sets, as the transmission target data, the data string of a block included in an area 338 corresponding to the target determination group 336. In addition, in the second communication, the target data determining circuit 205 of the arithmetic processing circuit 20 having the process ID of 01 sets, as the reception target data, the data string of a block included in an area 348 corresponding to the target determination group 346. In addition, the target data determining circuit 205 sets, as the transmission target data, the data string of a block included in an area 347 corresponding to the target determination group 345. The data strings included in the blocks determined as the transmission target data by the target data determining circuits 205 in the second communication correspond to an example of "second data blocks."

In the present embodiment, which represents the case where the arithmetic processing circuits 20 are coupled so as to form a two-dimensional hypercube, Halving is completed in the second communication as in the case of the thread Th1. However, in a case of a hypercube of three dimensions or more, communication of Halving further continues. In a pth communication, for the thread Th2, the target data determining circuit 205 generates a sequence obtained by reversing the arrangement order of a value from the second bit to the pth bit of the process ID, the second bit being the reference for rearrangement. The target data determining circuit 205 sets, as the target determination groups for transmission and reception targets, target determination groups in which the generated sequence and a sequence obtained by arranging a value from the pth bit to the second bit of the transmission and reception target index coincide with each other. Then, the target data determining circuit 205 selects a target determination group in which the value of the first bit of the process ID and the value of the first bit of the transmission and reception target index are a same value as the reception target area from the target determination groups for transmission and reception targets. In addition, the target data determining circuit 205 sets, as the reception target area, a target determination group in which a value obtained by inverting the pth bit of the process ID and the value of the first bit of the transmission and reception target index are a same value.

The transmission target area and the reception target area in the pth communication may be expressed by using a rearrangement sequence of p bits in a state in which the value of the first bit immediately below the reference for rearrangement of the process ID is moved to a bit next to a pth bit, and the numbers of the bits are renumbered 1 to p. For example, set as the reception target area is a target determination group in which a sequence obtained by reversing the arrangement order of a value from the first bit to the pth bit of the rearrangement sequence and a sequence obtained by arranging a value from the first bit to the pth bit of the transmission and reception target index coincide with each other. In addition, set as the transmission target area is a target determination group in which a sequence obtained by inverting a least significant bit in the sequence obtained by reversing the arrangement order of the value from the first bit to the pth bit of the rearrangement sequence and the sequence obtained by arranging the value from the first bit to the pth bit of the transmission and reception target index coincide with each other.

Further, in a case of the configuration of an n-dimensional hypercube, the number of threads is n. The target data determining circuit 205 determines transmission target data and reception target data for each of the n threads. Accordingly, consideration will be given to a case of a thread Thq ($1 \le q \le n$). The target data determining circuit 205 checks the position of a bit having a value of one in the cyclic ID of the thread Thq, and sets the number of the bit having the value of one as a reference for rearrangement. In this case, the target data determining circuit 205 checks that the value of a qth bit is one, and the target data determining circuit 205 sets q as the reference for rearrangement.

In this case, the rearrangement sequence is a sequence of p bits in a state in which the sequence of a value from the first bit of the process ID to a (q−1)th bit thereof immediately below the reference for rearrangement is moved next to a pth bit, for example, moved to an opposite side from a (p−1)th bit, and the numbers of the bits are renumbered 1 to p. Then, set as the reception target area is a target determination group in which the sequence obtained by reversing the arrangement order of the value from the first bit to the pth bit of the rearrangement sequence and the sequence obtained by arranging the value from the first bit to the pth bit of the transmission and reception target index coincide with each other. In addition, set as the transmission target area is a target determination group in which the sequence obtained by inverting the least significant bit in the sequence obtained by reversing the arrangement order of the value from the first bit to the pth bit of the rearrangement sequence and the sequence obtained by arranging the value from the first bit to the pth bit of the transmission and reception target index coincide with each other.

Figure 11:
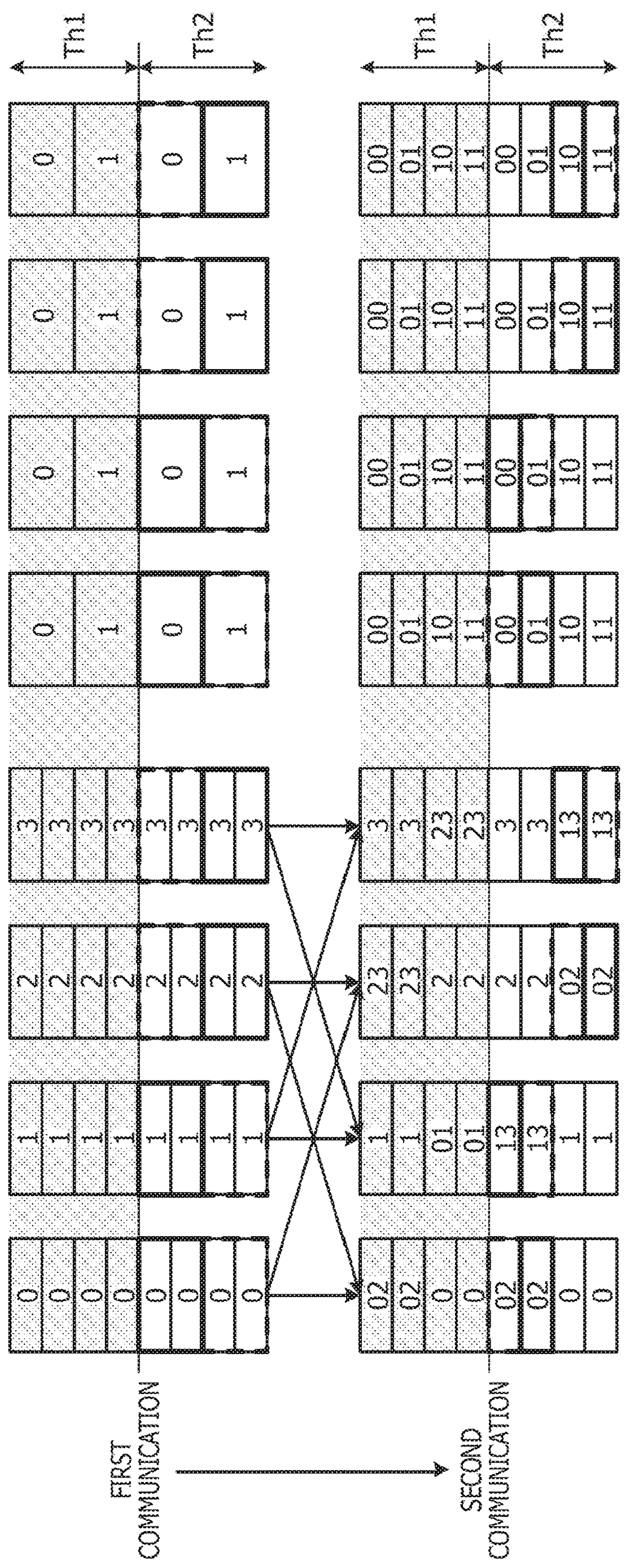
FIG. 11 is a diagram illustrating Halving for a thread Th2 by four arithmetic processing circuits included in a two-dimensional hypercube.

FIG. 11 is a diagram illustrating Halving for a thread Th2 by four arithmetic processing circuits included in a two-dimensional hypercube. In FIG. 11, blocks enclosed by solid lines are reception target data. In addition, blocks enclosed by broken lines are transmission target data. A right side facing a paper plane of FIG. 11 represents blocks corresponding to data transmitted and received in the respective arithmetic processing circuits 20, and a left side represents transmission target areas and reception target areas.

The target data determining circuits 205 of the respective arithmetic processing circuits 20 select transmission target data and reception target data for the thread Th2 in each communication as illustrated in FIG. 11. Then, for the thread Th2, the target data determining circuits 205 of the respective arithmetic processing circuits 20 repeat transmitting the transmission target data illustrated in FIG. 11, and performing operation using received data and the reception target data illustrated in FIG. 11.

When the target data determining circuit 205 is instructed to perform Doubling, on the other hand, the target data determining circuit 205 determines transmission and reception target data so as to trace an opposite procedure from that of Halving. For example, the target data determining circuit 205 determines transmission and reception target data by the following method.

Target determination groups are generated by dividing the threads Th1 and Th2 by the data size for transmission and reception. For example, in the case of the configuration of an n-dimensional hypercube, the target data determining circuit 205 divides the threads into $2^n$ in the first communication in Doubling. In the second or subsequent communications, the target data determining circuit 205 divides the threads Th1 and Th2 by a number ½ times that of a previous communication as the number of communications increases. For example, in the case of the second communication, the target data determining circuit 205 divides the threads into $2^{n-1}$.

Next, as in the case of Halving, the target data determining circuit 205 assigns transmission and reception target indexes to the generated target determination groups.

In an (n+1−p)th communication, for the thread Th1, the target data determining circuit 205 determines a transmission target area and a reception target area as follows. The target data determining circuit 205 sets, as target determination groups for transmission and reception targets, target determination groups in which the sequence obtained by reversing the arrangement order of the value from the first bit to the (p−1)th bit of the process ID and the sequence obtained by arranging the value from the second bit to the pth bit of the transmission and reception target index coincide with each other. Then, the target data determining circuit 205 selects a target determination group in which the value obtained by inverting the pth bit of the process ID and the value of the first bit of the transmission and reception target index are a same value as the reception target area from the target determination groups for transmission and reception targets. In addition, the target data determining circuit 205 sets, as the transmission target area, a target determination group in which the value of the pth bit of the process ID and the value of the first bit of the transmission and reception target index are a same value.

For example, set as the transmission target area is a target determination group in which the sequence obtained by reversing the arrangement order of the value from the first bit to the pth bit of the process ID and the sequence obtained by arranging the value from the first bit to the pth bit of the transmission and reception target index coincide with each other. In addition, set as the reception target area is a target determination group in which the sequence obtained by inverting the least significant bit in the sequence obtained by reversing the arrangement order of the value from the first bit to the pth bit of the process ID and the sequence obtained by arranging the value from the pth bit to the first bit of the transmission and reception target index coincide with each other.

Further, in the case of the configuration of an n-dimensional hypercube, the number of threads is n. The target data determining circuit 205 determines transmission target data and reception target data for each of the n threads. Accordingly, consideration will be given to an (n+1−p)th communication in a case of a thread Thq ($1 \le q \le n$). The target data determining circuit 205 checks the position of a bit having a value of one in the cyclic ID of the thread Thq, and sets the number of the bit having the value of one as a reference for rearrangement. In this case, the target data determining circuit 205 checks that the value of a qth bit is one, and the target data determining circuit 205 sets q as the reference for rearrangement.

In this case, the rearrangement sequence is a sequence of p bits in a state in which the sequence of a value from the first bit of a process ID to a (q−1)th bit thereof immediately below the reference for rearrangement is moved next to a pth bit, for example, moved to an opposite side from a (p−1)th bit, and the numbers of the bits are renumbered 1 to p. Then, set as the reception target area is a target determination group in which the sequence obtained by reversing the arrangement order of the value from the first bit to the pth bit of the rearrangement sequence and the sequence obtained by arranging the value from the first bit to the pth bit of the transmission and reception target index coincide with each other. In addition, set as the transmission target area is a target determination group in which the sequence obtained by inverting the least significant bit in the sequence obtained by reversing the arrangement order of the value from the first bit to the pth bit of the rearrangement sequence and the sequence obtained by arranging the value from the first bit to the pth bit of the transmission and reception target index coincide with each other.

Returning to FIG. 4B, description will be continued. The target data determining circuit 205 outputs information related to the transmission target data in the threads Th1 and Th2 to the data transmitting circuit 207. In addition, the target data determining circuit 205 outputs information related to the reception target data in the threads Th1 and Th2 to the data receiving circuit 208. The target data determining circuit 205 corresponds to an example of a "data selecting circuit."

Figure 12:
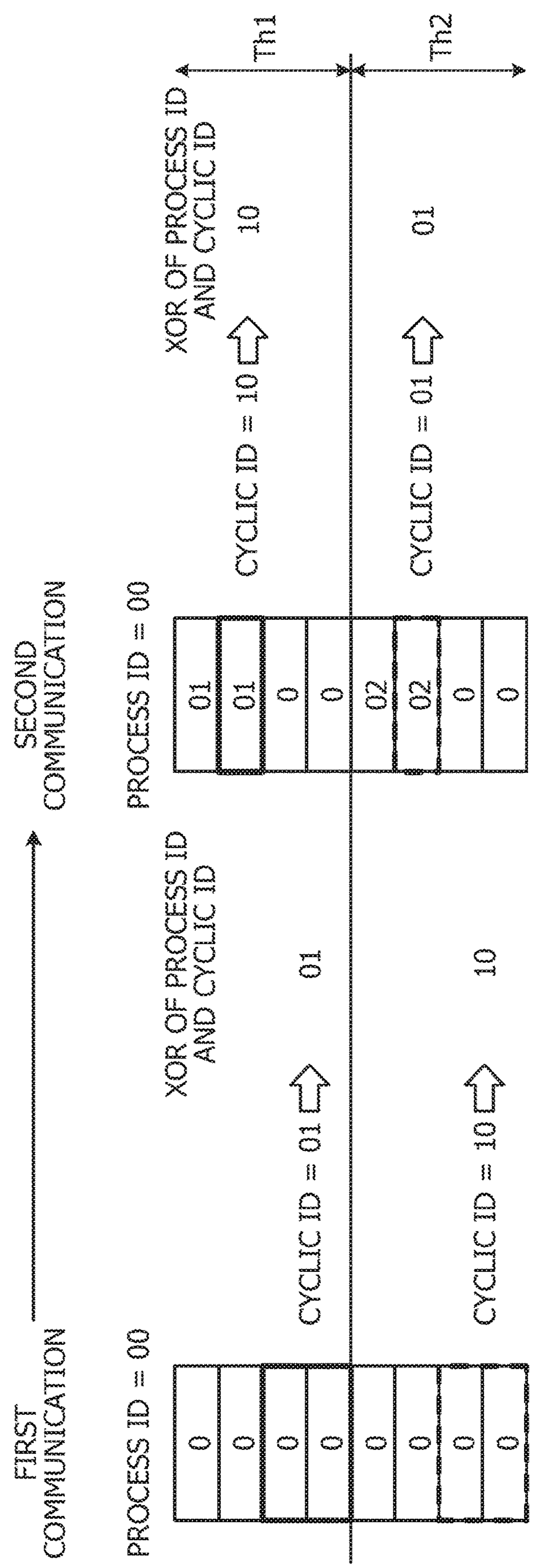
FIG. 12 is a diagram of assistance in explaining destination determination processing according to the first embodiment.

The destination determining circuit 206 receives, from the centralized control circuit 203, input of the information related to the threads Th1 and Th2, the cyclic IDs assigned to the threads Th1 and Th2, and the process ID of the own arithmetic processing circuit. Then, the destination determining circuit 206 determines an arithmetic processing circuit 20 as a transmission destination by performing the following processing for each of the threads. The following description will be made of the processing performed by the destination determining circuit 206 for each thread. FIG. 12 is a diagram of assistance in explaining destination determination processing by a destination determining circuit.

In the case of the first communication after the performance of Halving is specified, the destination determining circuit 206 obtains an exclusive disjunction of the process ID and the cyclic ID (CyclicID) assigned to the thread. Then, the destination determining circuit 206 sets, as a transmission destination of data in the thread, an arithmetic processing circuit 20 having the obtained exclusive disjunction as a transmission destination process ID.

For example, in the case of the first communication, when the process ID is 00 as illustrated in FIG. 12, the destination determining circuit 206 obtains an exclusive disjunction of "00," which is the process ID, and "01," which is the cyclic ID assigned to the thread Th1, and the destination determining circuit 206 thereby obtains "01" as a value. Then, the destination determining circuit 206 determines the arithmetic processing circuit 20 having the process ID of 01 as a transmission destination of data of the thread Th1. In addition, the destination determining circuit 206 obtains an exclusive disjunction of "00," which is the process ID, and "10," which is the cyclic ID assigned to the thread Th2, and the destination determining circuit 206 thereby obtains "10" as a value. Then, the destination determining circuit 206 determines the arithmetic processing circuit 20 having the process ID of 10 as a transmission destination of data of the thread Th2.

In the case of the second communication, the destination determining circuit 206 shifts the position of 1 of the cyclic ID assigned to each thread to the left by one. The processing of shifting the position of 1 of the cyclic ID to the left by one corresponds to an example of processing of "shifting by one." For example, the destination determining circuit 206 shifts the position of 1 of the cyclic ID assigned to each thread to a higher position by one bit. At this time, in a case of a cyclic ID whose highest-order bit has a value of one, the destination determining circuit 206 sets the value of a first bit of the cyclic ID to one. For example, the destination determining circuit 206 changes the cyclic ID of the thread Th1 from "01" to "10." In addition, the destination determining circuit 206 changes the cyclic ID of the thread Th2 from "10" to "01."

Next, the destination determining circuit 206 obtains an exclusive disjunction of the process ID and the cyclic ID of the thread after the change. Then, the destination determining circuit 206 sets, as a transmission destination of data in the thread, an arithmetic processing circuit 20 having the obtained exclusive disjunction as a transmission destination process ID.

For example, in the case of the second communication, when the process ID is 00, the destination determining circuit 206 obtains an exclusive disjunction of "00," which is the process ID, and "10," which is the cyclic ID of the thread Th1 after the change, and the destination determining circuit 206 thereby obtains "10" as a value. Then, the destination determining circuit 206 determines the arithmetic processing circuit 20 having the process ID of 10 as a transmission destination of data of the thread Th1. In addition, the destination determining circuit 206 obtains an exclusive disjunction of "00," which is the process ID, and "01," which is the cyclic ID of the thread Th2 after the change, and the destination determining circuit 206 thereby obtains "01" as a value. Then, the destination determining circuit 206 determines the arithmetic processing circuit 20 having the process ID of 01 as a transmission destination of data of the thread Th2.

Figure 13:
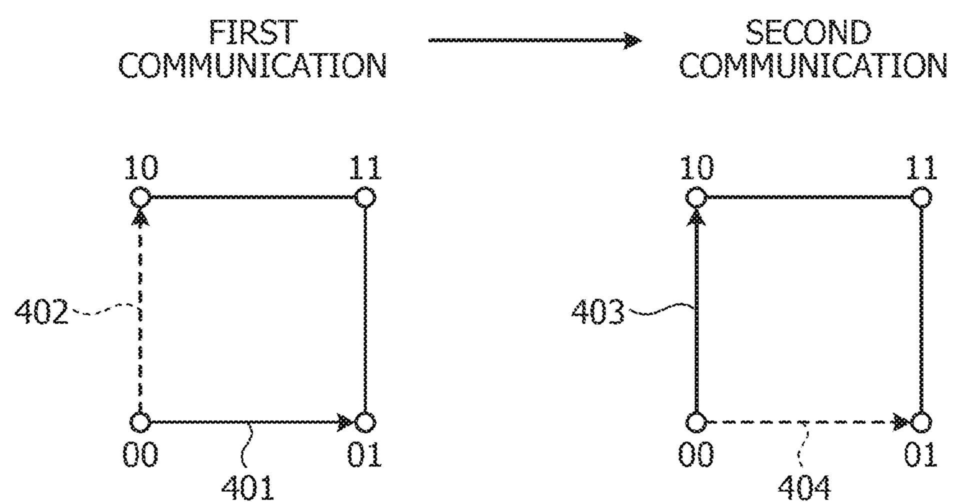
FIG. 13 is a diagram of assistance in explaining destination transitions in a two-dimensional hypercube.

FIG. 13 is a diagram of assistance in explaining destination transitions in a two-dimensional hypercube. Respective circles in FIG. 13 represent the arithmetic processing circuits 20, and numbers provided to the respective circles represent the process IDs of the respective arithmetic processing circuits 20. In the first communication, as indicated by a solid line arrow 401, the arithmetic processing circuit 20 having the process ID of 00 sets the arithmetic processing circuit 20 having the process ID of 01 as a transmission destination of data of the thread Th1. In addition, as indicated by a broken line arrow 402, the arithmetic processing circuit 20 having the process ID of 00 sets the arithmetic processing circuit 20 having the process ID of 10 as a transmission destination of data of the thread Th2. Next, in the second communication, as indicated by a solid line arrow 403, the arithmetic processing circuit 20 having the process ID of 00 sets the arithmetic processing circuit 20 having the process ID of 10 as a transmission destination of data of the thread Th1. In addition, as indicated by a broken line arrow 404, the arithmetic processing circuit 20 having the process ID of 00 sets the arithmetic processing circuit 20 having the process ID of 01 as a transmission destination of data of the thread Th2.

Thus, the arithmetic processing circuit 20 sets different arithmetic processing circuits 20 as transmission destinations of data for the respective threads in one communication. The arithmetic processing circuit 20 may therefore transmit the data to all of adjacent arithmetic processing circuits 20 in one communication. It is thus possible to suppress occurrence of an unused path, and make full use of a band.

In the case of the first communication after the performance of Doubling is specified, on the other hand, the destination determining circuit 206 obtains the cyclic ID used in the final communication of Halving. Next, the destination determining circuit 206 obtains an exclusive disjunction of the process ID and the cyclic ID assigned to the thread. Then, the destination determining circuit 206 sets an arithmetic processing circuit 20 having the obtained exclusive disjunction as a transmission destination process ID as a transmission destination of data in the thread.

Thereafter, the destination determining circuit 206 shifts the position of 1 of the cyclic ID used in each thread at a previous communication to the right by one. For example, the destination determining circuit 206 shifts the position of 1 of the process ID used in each thread in the previous communication to a lower position by one bit. Then, the destination determining circuit 206 obtains an exclusive disjunction of the process ID and the cyclic ID of the thread after the change. Then, the destination determining circuit 206 sets, as a transmission destination of data in the thread, an arithmetic processing circuit 20 having the obtained exclusive disjunction as a transmission destination process ID.

This cyclic ID corresponds to an example of "cyclic number information." The processing of shifting the position of 1 of the cyclic ID to the right by one corresponds to an example of processing of "shifting the cyclic number information by one." In addition, the process ID as a transmission destination obtained by an exclusive disjunction by the destination determining circuit 206 corresponds to an example of destination number information obtained by exclusive disjunction operation on identification number information assigned to each arithmetic processing circuit and cyclic number information assigned to each group. For example, as illustrated in FIG. 12, the destination determining circuit 206 performs exclusive disjunction operation on the cyclic IDs as cyclic number information and the process ID as identification number information, and calculates the process IDs as destination number information by the exclusive disjunction operation. Then, the destination determining circuit 206 sets the calculated process IDs as the process IDs of the arithmetic processing circuits 20 as transmission destinations in each communication illustrated in FIG. 13.

Next, the destination determining circuit 206 shifts the cyclic ID to the left and selects an arithmetic processing circuit 20 as a transmission destination of data, and may thereby set, as a transmission destination of data for each thread, an arithmetic processing circuit 20 having data not coinciding with the data retained by each thread. The arithmetic processing circuit 20 having data not coinciding with the data retained by each thread corresponds to an example of an "arithmetic processing circuit as a complementing counterpart."

Further, the destination determination processing by the destination determining circuit 206 described here corresponds to an example of processing of "selecting different arithmetic processing circuits as transmission destinations from among adjacent arithmetic processing circuits based on the destination number information obtained by the exclusive disjunction operation on the identification number information and the cyclic number information."

Returning to FIG. 4B, description will be continued. The destination determining circuit 206 outputs information related to the data transmission destinations of the threads Th1 and Th2 to the data transmitting circuit 207. The destination determining circuit 206 corresponds to an example of a "transmission destination selecting circuit."

The data transmitting circuit 207 receives input of information related to the transmission target data in the threads Th1 and Th2 from the target data determining circuit 205. In addition, the data transmitting circuit 207 receives information related to the data transmission destinations of the threads Th1 and Th2 from the destination determining circuit 206.

The data transmitting circuit 207 requests the memory control circuits 23 to obtain data strings stored in blocks specified by the obtained information related to the transmission target data in the threads Th1 and Th2. Thereafter, the data transmitting circuit 207 receives, from the memory control circuits 23, input of the data strings stored in the blocks specified by the obtained information related to the transmission target data in the threads Th1 and Th2. The obtained data is transmission data in the threads Th1 and Th2. Then, the data transmitting circuit 207 transmits the transmission data in the thread Th1 to the data transmission destination of the thread Th1. In addition, the data transmitting circuit 207 transmits the transmission data in the thread Th2 to the data transmission destination of the thread Th2.

For example, in the first communication during the performance of Halving, when the process ID of the own arithmetic processing circuit is 00, the data transmitting circuit 207 transmits the data strings of the blocks included in the area 304 in FIG. 8 to the arithmetic processing circuit 20 having the process ID of 01. In addition, the data transmitting circuit 207 transmits the data strings of the blocks included in the area 334 in FIG. 10 to the arithmetic processing circuit 20 having the process ID of 10. In addition, in the second communication, when the process ID of the own arithmetic processing circuit is 00, the data transmitting circuit 207 transmits the data string of the block included in the area 308 in FIG. 8 to the arithmetic processing circuit 20 having the process ID of 10. In addition, the data transmitting circuit 207 transmits the data string of the block included in the area 338 in FIG. 10 to the arithmetic processing circuit 20 having the process ID of 01. The data transmitting circuit 207 corresponds to an example of a "transmitting circuit."

The data receiving circuit 208 receives input of the information related to the reception target data from the target data determining circuit 205. Then, the data receiving circuit 208 receives input of data strings transmitted from other arithmetic processing circuits 20. Here, the input data strings are arranged in respective blocks. The data receiving circuit 208 may determine to which block of the reception target data each data string corresponds. Thereafter, the data receiving circuit 208 requests the memory control circuits 23 to add the reception target data corresponding to each of the obtained data strings to the respective data strings. The data receiving circuit 208 corresponds to an example of a "receiving circuit."

The outside coupling processing performing circuit 209 receives a request for the processing of Allreduce in the external topology from the centralized control circuit 203. Then, the outside coupling processing performing circuit 209 performs Allreduce processing with the arithmetic processing circuits 20 forming a hypercube other than the hypercube including the own arithmetic processing circuit. A method of the processing of Allreduce in the external topology is not particularly limited. The outside coupling processing performing circuit 209 may perform the processing using an existing procedure for the processing of Allreduce or the like. In addition, the outside coupling processing performing circuit 209 may request the sub-net manager 6 to make coupling in the external topology, and perform path management for the processing of Allreduce in the external topology. When the outside coupling processing performing circuit 209 then completes the Allreduce processing with the external topology, the outside coupling processing performing circuit 209 notifies the centralized control circuit 203 of completion of the processing of Allreduce in the external topology.

The synchronization processing circuit 210 receives a notification of performance of synchronization processing in the internal topology from the centralized control circuit 203 after completion of performance of Doubling. Then, the synchronization processing circuit 210 checks whether or not same data is shared between the arithmetic processing circuits 20 included in the hypercube. For example, the synchronization processing circuit 210 obtains the data strings stored in the memories 24 of the other arithmetic processing circuits 20. Further, the synchronization processing circuit 210 requests the memory control circuits 23 to obtain data strings as a result of operation of the Allreduce processing, the data strings being possessed by the own arithmetic processing circuit, and obtains the data strings from the memory control circuits 23. Then, the synchronization processing circuit 210 checks whether or not the data strings stored in the memories 24 of the respective arithmetic processing circuits 20 are the same. When the same data is supplied, the memory control circuits 23 notify the centralized control circuit 203 of completion of synchronization in the internal topology.

The synchronization processing circuit 210 thereafter receives a notification of performance of synchronization processing in the external topology from the centralized control circuit 203. The synchronization processing circuit 210 checks whether or not same data is shared between the arithmetic processing circuits 20 other than the arithmetic processing circuits 20 included in the hypercube performing the processing of Allreduce. For example, the synchronization processing circuit 210 obtains a data string stored in the memory 24 of one of the arithmetic processing circuits 20 set as targets of the processing of Allreduce on the other system board 1. Then, the synchronization processing circuit 210 checks whether or not the obtained data string and the data string stored in the memories 24 of the own arithmetic processing circuit are the same. When the same data is shared, the memory control circuits 23 notify the centralized control circuit 203 of completion of synchronization in the external topology.

The memory control circuits 23 receive a request to obtain data strings determined as transmission target data from the data transmitting circuit 207. Then, the memory control circuits 23 obtain the specified data strings from the memories 24. Thereafter, the memory control circuits 23 output the obtained data strings to the data transmitting circuit 207.

In addition, the memory control circuits 23 receive input of data strings as received data from the data receiving circuit 208. In addition, the memory control circuits 23 receive, from the data receiving circuit 208, a request to add reception target data corresponding to the respective data strings to the respective data strings. Then, the memory control circuits 23 obtain the reception target data corresponding to the respective data strings from the memories 24. Then, the memory control circuits 23 output the obtained reception target data and the data strings as received data to the parallel arithmetic circuits 21, and request the addition. Thereafter, the memory control circuits 23 obtain results of the addition of the respective data strings as received data to the corresponding reception target data from the parallel arithmetic circuits 21. Then, the memory control circuits 23 store the results of the addition in the memories 24 such that the results of the addition are stored in blocks storing the respective reception target data. Then, when the operation on the data obtained in one communication is ended, and the storing of the operation results into the memories 24 is completed, the memory control circuits 23 notify completion of the communication to the centralized control circuit 203.

Further, the memory control circuits 23 receive, from the synchronization processing circuit 210, a request to obtain data strings as operation results of the Allreduce processing, the data strings being possessed by the own arithmetic processing circuit. Then, the memory control circuits 23 obtain data strings whose Doubling processing is completed from the memories 24. Then, the memory control circuits 23 output the obtained data strings to the synchronization processing circuit 210.

Figure 14A:
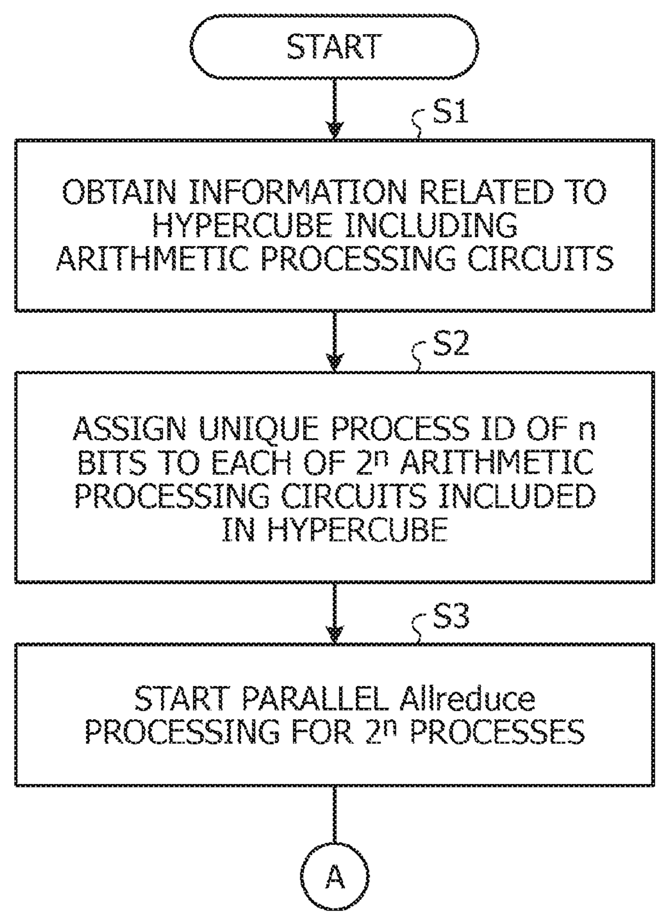
Figure 14C:
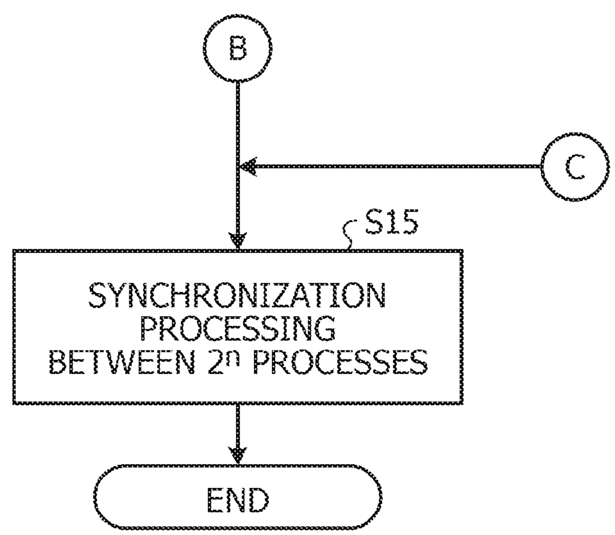

An entire flow of the processing of Allreduce will next be described with reference to FIGS. 14A to 14C. FIGS. 14A to 14C illustrate flowchart of a whole of processing of Allreduce. The following description will be made in a case where arithmetic processing circuits 20 are included in an n-dimensional hypercube.

The process ID allocating circuit 201 obtains a connection table from the network configuration managing circuit 28. Then, the process ID allocating circuit 201 obtains information related to the hypercube including the arithmetic processing circuits 20 from the connection table (step S1).

Next, the process ID allocating circuit 201 assigns a unique process ID of n bits to each of the $2^n$ arithmetic processing circuits 20 included in the hypercube (step S2). Then, the process ID allocating circuit 201 outputs the process IDs assigned to the respective arithmetic processing circuits 20 to the centralized control circuit 203.

The centralized control circuit 203 of each of the arithmetic processing circuits 20 obtains the process IDs assigned to the respective arithmetic processing circuits 20 from the process ID allocating circuit 201. Then, the centralized control circuit 203 starts parallel Allreduce processing for $2^n$ processes (step S3). The centralized control circuit 203 outputs the process IDs assigned to the respective arithmetic processing circuits 20 to the thread generating circuit 202.

The thread generating circuit 202 receives input of the process IDs assigned to the respective arithmetic processing circuits 20 from the centralized control circuit 203. Then, the thread generating circuit 202 obtains the dimensions of the hypercube including the own arithmetic processing circuit. The following description will be made in a case of an n-dimensional hypercube. The thread generating circuit 202 obtains information related to the process assigned to the own arithmetic processing circuit from the job managing circuit 27. Then, the thread generating circuit 202 generates n threads Th1 to Thn by separating a data string as a result of operation by the process assigned to the own arithmetic processing circuit into n groups, and assigns identification number information to each of the generated threads (step S4). Thereafter, the thread generating circuit 202 outputs, to the centralized control circuit 203, information related to the threads which information includes the identification number information and information related to the data strings included in the respective threads Th1 to Thn.

The centralized control circuit 203 obtains the information related to the threads from the thread generating circuit 202. Then, the centralized control circuit 203 performs Halving for each of the n threads Th1 to Thn (steps S5 to S7). Details of Halving will be described later.

After completion of Halving, the centralized control circuit 203 performs the processing of Allreduce in the external topology for each of the n threads Th1 to Thn (steps S8 to S10).

After completion of the processing of Allreduce in the external topology, the centralized control circuit 203 makes the outside coupling processing performing circuit 209 perform Doubling for each of the n threads Th1 to Thn (steps S11 to S13). Details of Doubling will be described later.

After completion of the processing of Doubling, the centralized control circuit 203 makes the synchronization processing circuit 210 perform synchronization processing between the n threads Th1 to Thn (step S14).

Thereafter, the centralized control circuit 203 makes the synchronization processing circuit 210 perform synchronization processing between the $2^n$ processes including the process executed by the own arithmetic processing circuit (step S15). The centralized control circuit 203 thereby completes the parallel Allreduce processing.

Figure 15:
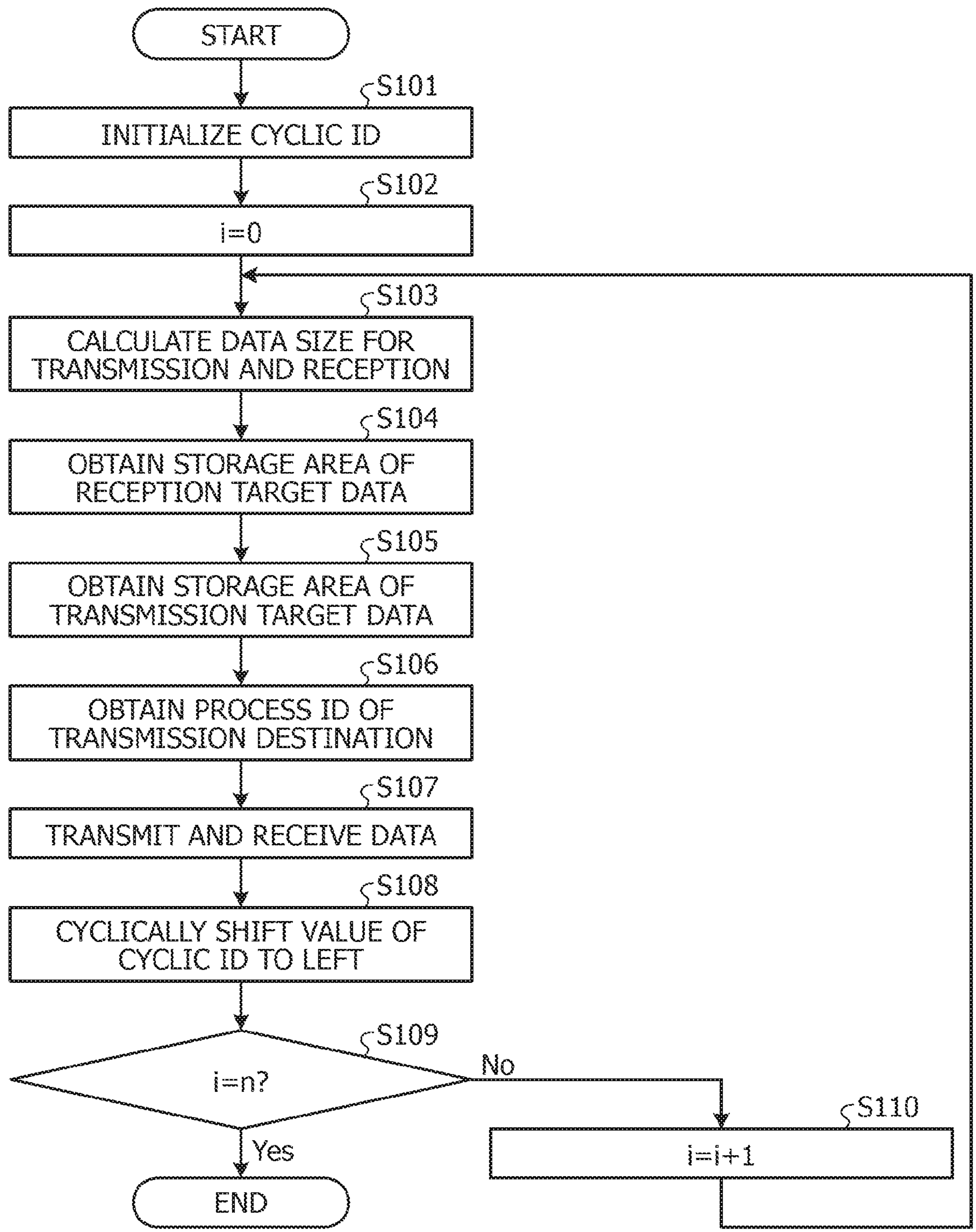
FIG. 15 is a flowchart of Halving.

A flow of processing of Halving will next be described with reference to FIG. 15. FIG. 15 is a flowchart of Halving. The flowchart of FIG. 15 corresponds to an example of the processing performed in steps S5 to S7 in FIG. 14B.

The thread generating circuit 202 assigns a cyclic ID of n bits to each thread, and thereby initializes the cyclic IDs (step S101). The centralized control circuit 203 obtains the cyclic IDs of the respective threads from the thread generating circuit 202.

Next, the centralized control circuit 203 sets i=0 (step S102).

Next, the centralized control circuit 203 outputs, to the transmission and reception data size calculating circuit 204, the process ID of the own arithmetic processing circuit, the information related to the threads, the cyclic IDs assigned to the respective threads, and the data string of each block. The transmission and reception data size calculating circuit 204 sets the blocks of $2^{n-1}$ data strings as a data size for transmission and reception in a first communication. Thereafter, the transmission and reception data size calculating circuit 204 calculates ½ of the data size in the previous communication as a data size for transmission and reception in a present communication (step S103). Then, the transmission and reception data size calculating circuit 204 outputs the data size for transmission and reception to the target data determining circuit 205. In addition, the transmission and reception data size calculating circuit 204 outputs the information related to each thread, the cyclic ID assigned to each thread, and the data string of each block to the target data determining circuit 205.

The target data determining circuit 205 receives, from the transmission and reception data size calculating circuit 204, input of the data size for transmission and reception, the information related to the threads Th1 and Th2, the cyclic IDs assigned to the threads Th1 and Th2, and the data string of each block. Next, the target data determining circuit 205 generates target determination groups by dividing each thread by the data size for performing transmission and reception. Then, the target data determining circuit 205 assigns transmission and reception target indexes to the target determination groups, and determines storage areas of reception target data using the process ID and the transmission and reception target indexes (step S104).

Next, the target data determining circuit 205 determines storage areas of transmission target data using the process ID and the transmission and reception target indexes (step S105). Thereafter, the target data determining circuit 205 outputs information related to the storage areas of the transmission target data to the data transmitting circuit 207. In addition, the target data determining circuit 205 outputs information related to the storage areas of the reception target data to the data receiving circuit 208.

In addition, the destination determining circuit 206 receives, from the centralized control circuit 203, input of the information related to each of the threads, the cyclic IDs assigned to the threads, and the process ID of the own arithmetic processing circuit. Then, the destination determining circuit 206 obtains, for each thread, an exclusive disjunction of the process ID and the cyclic ID, and obtains the process ID of an arithmetic processing circuit 20 as a transmission destination for each thread (step S106). Thereafter, the destination determining circuit 206 outputs the process ID of the transmission destination arithmetic processing circuit 20 for each thread to the data transmitting circuit 207.

The data transmitting circuit 207 receives input of the information related to the storage areas of the transmission target data from the target data determining circuit 205. In addition, the data transmitting circuit 207 receives input of the process ID of the transmission destination arithmetic processing circuit 20 for each thread from the destination determining circuit 206. In addition, the data receiving circuit 208 receives input of the information related to the storage areas of the reception target data from the target data determining circuit 205. Then, the data transmitting circuit 207 and the data receiving circuit 208 perform data transmission and reception (step S107). At this time, the data receiving circuit 208 outputs received data from other arithmetic processing circuits 20 to the memory control circuits 23 together with the information related to the corresponding reception target data. The memory control circuits 23 make the parallel arithmetic circuits 21 perform operation on the received data and the reception target data, and store results of the operation in locations as the storage areas of the reception target data in the memories 24. Thereafter, the memory control circuits 23 notify the centralized control circuit 203 of completion of the data reception.

The centralized control circuit 203 receives the notification of the completion of the data reception from the memory control circuits 23. Then, the centralized control circuit 203 cyclically shifts the value of the cyclic ID assigned to each thread to the left (step S108).

Thereafter, the centralized control circuit 203 determines whether or not i=n (step S109). When i=n does not hold (step S109: negative), the centralized control circuit 203 increments i by one (step S110). Thereafter, the centralized control circuit 203 returns to step S103.

When i=n (step S109: affirmative), on the other hand, the centralized control circuit 203 ends the processing of Halving.

Figure 16:
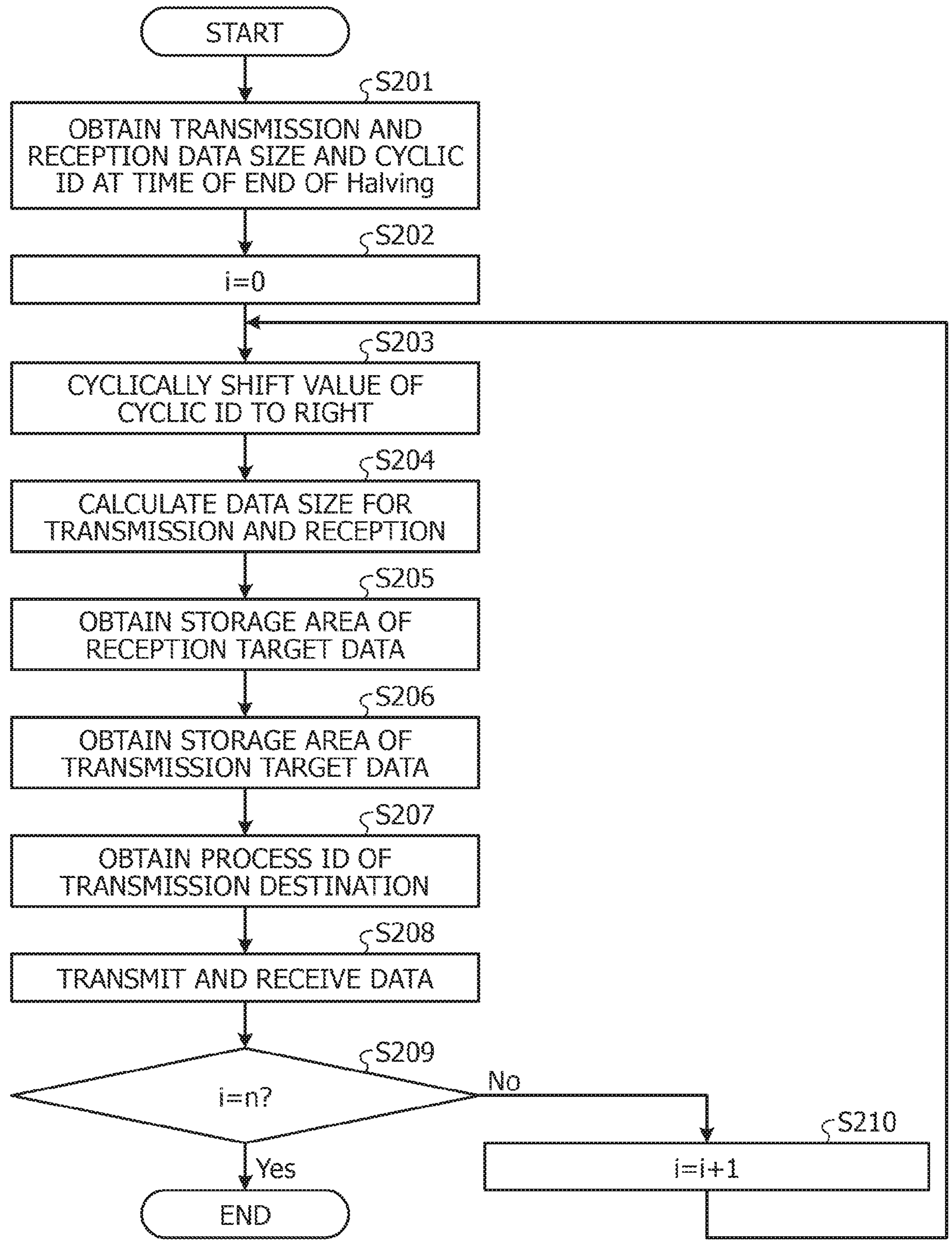
FIG. 16 is a flowchart of Doubling.

A flow of processing of Doubling will next be described with reference to FIG. 16. FIG. 16 is a flowchart of Doubling. The flowchart of FIG. 16 corresponds to an example of the processing performed in steps S11 to S13 in FIG. 14B.

The centralized control circuit 203 obtains the transmission and reception data size at a time of an end of Halving and the cyclic ID of each thread (step S201).

Next, the centralized control circuit 203 sets i=0 (step S202).

Next, the centralized control circuit 203 cyclically shifts the value of the cyclic ID of each thread to the right (step S203).

Thereafter, the centralized control circuit 203 outputs, to the transmission and reception data size calculating circuit 204, the process ID of the own arithmetic processing circuit, the information related to the threads, the cyclic IDs assigned to the respective threads, and the data string of each block. The transmission and reception data size calculating circuit 204 sets the block of one data string as a data size for transmission and reception in a first communication. Thereafter, the transmission and reception data size calculating circuit 204 calculates the data size for transmission and reception in a present communication by doubling the data size in the previous communication (step S204). Then, the transmission and reception data size calculating circuit 204 outputs the data size for transmission and reception to the target data determining circuit 205. In addition, the transmission and reception data size calculating circuit 204 outputs, to the target data determining circuit 205, the information related to each thread, the cyclic ID assigned to each thread, and the data string of each block.

The target data determining circuit 205 receives, from the transmission and reception data size calculating circuit 204, input of the data size for transmission and reception, the information related to the threads Th1 and Th2, the cyclic IDs assigned to the threads Th1 and Th2, and the data string of each block. Next, the target data determining circuit 205 generates target determination groups by dividing each thread by the data size for performing transmission and reception. Then, the target data determining circuit 205 assigns transmission and reception target indexes to the target determination groups, and determines storage areas of reception target data using the process ID and the transmission and reception target indexes (step S205).

Next, the target data determining circuit 205 determines storage areas of transmission target data using the process ID and the transmission and reception target indexes (step S206). Thereafter, the target data determining circuit 205 outputs information related to the storage areas of the transmission target data to the data transmitting circuit 207. In addition, the target data determining circuit 205 outputs information related to the storage areas of the reception target data to the data receiving circuit 208.

In addition, the destination determining circuit 206 receives, from the centralized control circuit 203, input of the information related to the threads, the cyclic IDs assigned to the threads, and the process ID of the own arithmetic processing circuit. Then, the destination determining circuit 206 obtains, for each thread, an exclusive disjunction of the process ID and the cyclic ID, and obtains the process ID of an arithmetic processing circuit 20 as a transmission destination for each thread (step S207). Thereafter, the destination determining circuit 206 outputs the process ID of the transmission destination arithmetic processing circuit 20 for each thread to the data transmitting circuit 207.

The data transmitting circuit 207 receives input of the information related to the storage areas of the transmission target data from the target data determining circuit 205. In addition, the data transmitting circuit 207 receives input of the process ID of the transmission destination arithmetic processing circuit 20 for each thread from the destination determining circuit 206. In addition, the data receiving circuit 208 receives input of the information related to the storage areas of the reception target data from the target data determining circuit 205. Then, the data transmitting circuit 207 and the data receiving circuit 208 perform data transmission and reception (step S208). At this time, the data receiving circuit 208 outputs received data from other arithmetic processing circuits 20 to the memory control circuits 23 together with the information related to the corresponding reception target data. The memory control circuits 23 make the parallel arithmetic circuits 21 perform operation on the received data and the reception target data, and store results of the operation in locations as the storage areas of the reception target data in the memories 24. Thereafter, the memory control circuits 23 notify the centralized control circuit 203 of completion of the data reception.

The centralized control circuit 203 receives the notification of the completion of the data reception from the memory control circuits 23. Then, the centralized control circuit 203 determines whether or not i=n (step S209). When i=n does not hold (step S209: negative), the centralized control circuit 203 increments i by one (step S210). Thereafter, the centralized control circuit 203 returns to step S203.

When i=n (step S209: affirmative), on the other hand, the centralized control circuit 203 ends the processing of Doubling.

A program for performing Halving and Doubling will further be described. FIG. 17 is a diagram illustrating an example of pseudocode of a program for performing Halving and Doubling.

CyclicLeftShift (val) in FIG. 17 is a function that cyclically shifts the value of val to the left. In addition, CyclicRightShift (val) is a function that cyclically shifts the value of val to the right. Further, SendRecv (dst, scr, size, peer) is a function that sends a size amount to a peer from the address of scr, and overwrites dst with an amount of data sent from the peer. In addition, SendRecv_Add (dst, scr, size, peer) is a function that sends a size amount to a peer from the address of scr, and adds an amount of data sent from the peer to dst. In addition, StepHist is a value indicating a progress state of the processing of Halving or Doubling being performed.

Figure 18A:
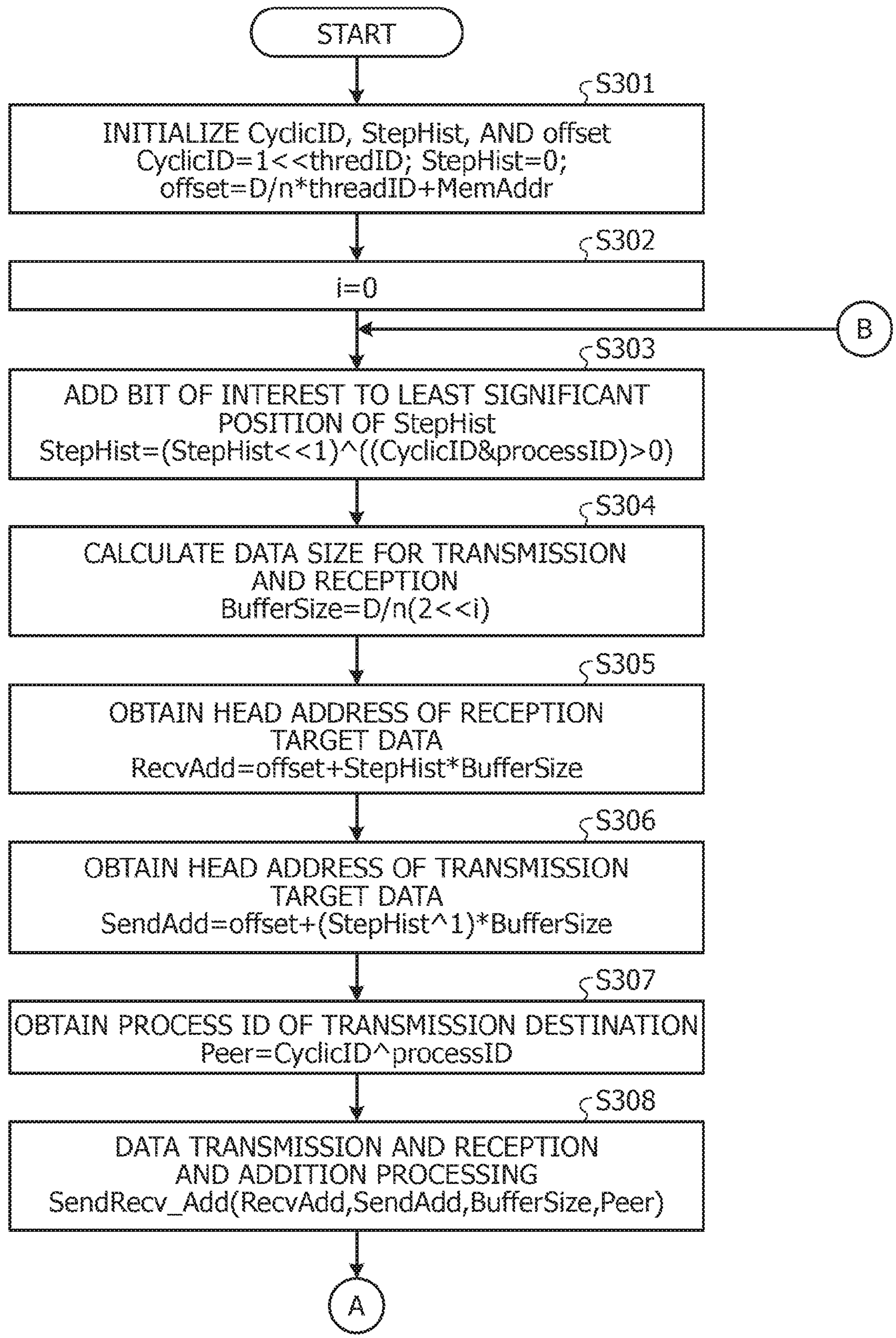
FIGS. 18A and 18B illustrate flowchart of processing performed in a program implementing Halving.
Figure 18B:
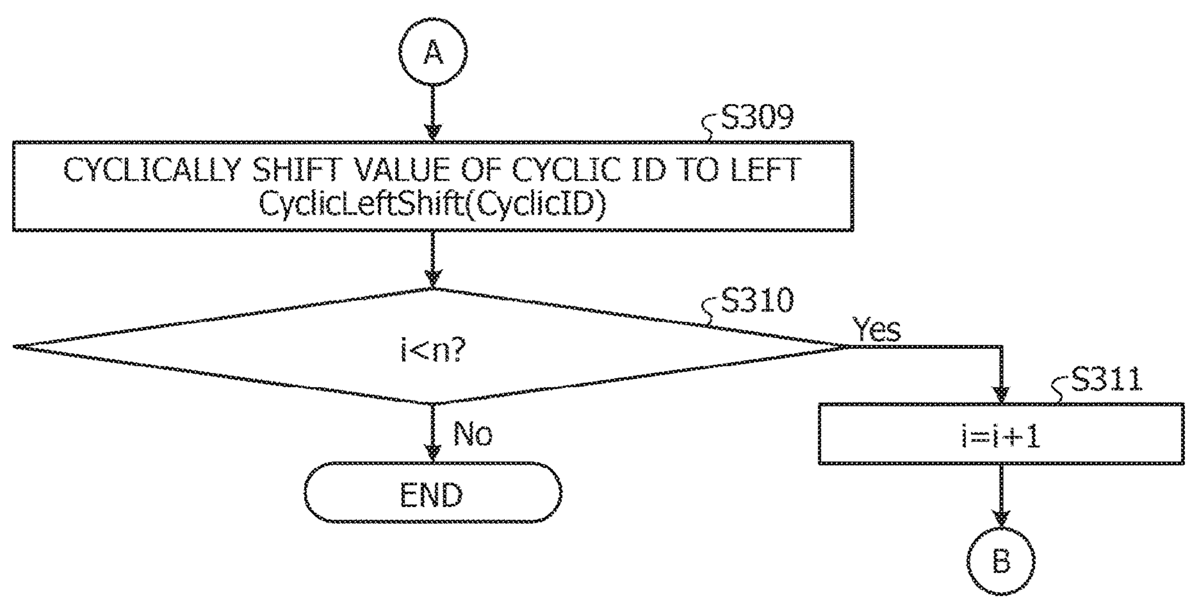

A flow of processing with regard to Halving of the program illustrated in FIG. 17 will next be described with reference to FIGS. 18A and 18B. FIGS. 18A and 18B illustrate flowchart of processing performed in a program implementing Halving. FIGS. 18A and 18B correspond to an example of a case where the processing of the flowchart of FIG. 15 is implemented by a program. In the following, description will be made of each piece of processing supposing that the arithmetic circuit possessed by the network control circuit 29 is an operating entity. In addition, in the following, threadID represented by a value of 0 to n−1 is used as a thread identifier.

The arithmetic circuit generates the cyclic ID (CyclicID) to be assigned to each thread by shifting the position of a value of one in the cyclic ID of n bits having a single value of one to the left at a time, and thereby initializes CyclicID. In addition, the arithmetic circuit sets StepHist=0. Further, the arithmetic circuit multiplies threadID by a value obtained by dividing the data size (D) of an entire result of process operation by n. Next, the arithmetic circuit adds the head address (MemAddr) of a memory 24 to the multiplication result, thereby calculates an offset of each thread, and thus initializes the offset (step S301).

Next, the arithmetic circuit sets i=0 (step S302).

Next, the arithmetic circuit adds a bit of interest to the least significant position of StepHist (step S303). For example, the arithmetic circuit shifts the bit string of StepHist to the left by one. In this case, the arithmetic circuit sets a least significant bit to zero. Then, the arithmetic circuit determines whether a same bit as a bit set to one in CyclicID is also one in the process ID (processID). For example, the arithmetic circuit obtains a logic product of the cyclic ID and the process ID. The arithmetic circuit determines whether or not the obtained value is larger than zero. When the obtained value is larger than zero, the arithmetic circuit determines that the bit is also one in the process ID. When the obtained value is zero or smaller, the arithmetic circuit determines that the bit is zero in the process ID. Then, when the bit is also one in the process ID, the arithmetic circuit sets the least significant bit of StepHist to one by obtaining an exclusive disjunction of StepHist and a bit string that has a same number of bits and whose least significant bit is one. When the bit is zero in the process ID, on the other hand, the arithmetic circuit sets the least significant bit of StepHist to zero by obtaining an exclusive disjunction of StepHist and a bit string that has a same number of bits and whose bits are all zero.

Next, the arithmetic circuit calculates a data size for performing transmission and reception (step S304). For example, the arithmetic circuit obtains BufferSize by dividing, by two raised to the power of i, a value obtained by dividing the data size of the entire result of process operation by n. This BufferSize is the data size for performing transmission and reception.

Next, the arithmetic circuit determines the head address of data as a reception target (step S305). For example, the arithmetic circuit calculates RecvAdd as the head address of data as a reception target by adding the offset to a value obtained by multiplying StepHist by BufferSize.

For example, the blocks of each thread are divided into $2\times2^i$. Then, the arithmetic circuit assigns a transmission and reception target index of 1+i bits to each divided area of the thread. In addition, at this point in time, StepHist also has a value similarly represented by 1+i bits. Accordingly, the arithmetic circuit sets an area in which the transmission and reception target index coincides with the value of StepHist as the area of data as a reception target. Then, the arithmetic circuit obtains the head address of data as a reception target by obtaining BufferSize multiplied by the index.

Next, the arithmetic circuit determines the head address of data as a transmission target (step S306). For example, an area having a transmission and reception target index whose least significant bit is different with respect to the head address of the reception destination is the area of data as a transmission target. Accordingly, the arithmetic circuit obtains an exclusive disjunction of StepHist and a value that has a same number of bits as StepHist and whose least significant bit is one. Then, the arithmetic circuit multiplies the value of the obtained exclusive disjunction by BufferSize, and adds the offset to a result of the multiplication. The arithmetic circuit thereby calculates SendAdd as the head address of data as a transmission target.

Next, the arithmetic circuit determines the process ID of an arithmetic processing circuit 20 as a transmission destination (step S307). For example, the arithmetic circuit calculates an exclusive disjunction of the cyclic ID and the process ID, and sets a result of the calculation as Peer, which is the process ID of an arithmetic processing circuit 20 as a transmission and reception destination.

Thereafter, the arithmetic circuit performs data transmission and reception and processing of addition of received data (step S308). For example, the arithmetic circuit obtains SendRecv_Add (RecvAdd, SendAdd, BufferSize, Peer).

Next, the arithmetic circuit cyclically shifts the value of the cyclic ID to the left by executing CyclicLeftShift (CycicID) (step S309).

Then, the arithmetic circuit determines whether or not i is smaller than n (step S310). When i is smaller than n (step S310: affirmative), the arithmetic processing circuit increments the value of i by one (step S311), and returns to step S303.

When i=n (step S310: negative), on the other hand, the arithmetic processing circuit ends Halving.

Figure 19A:
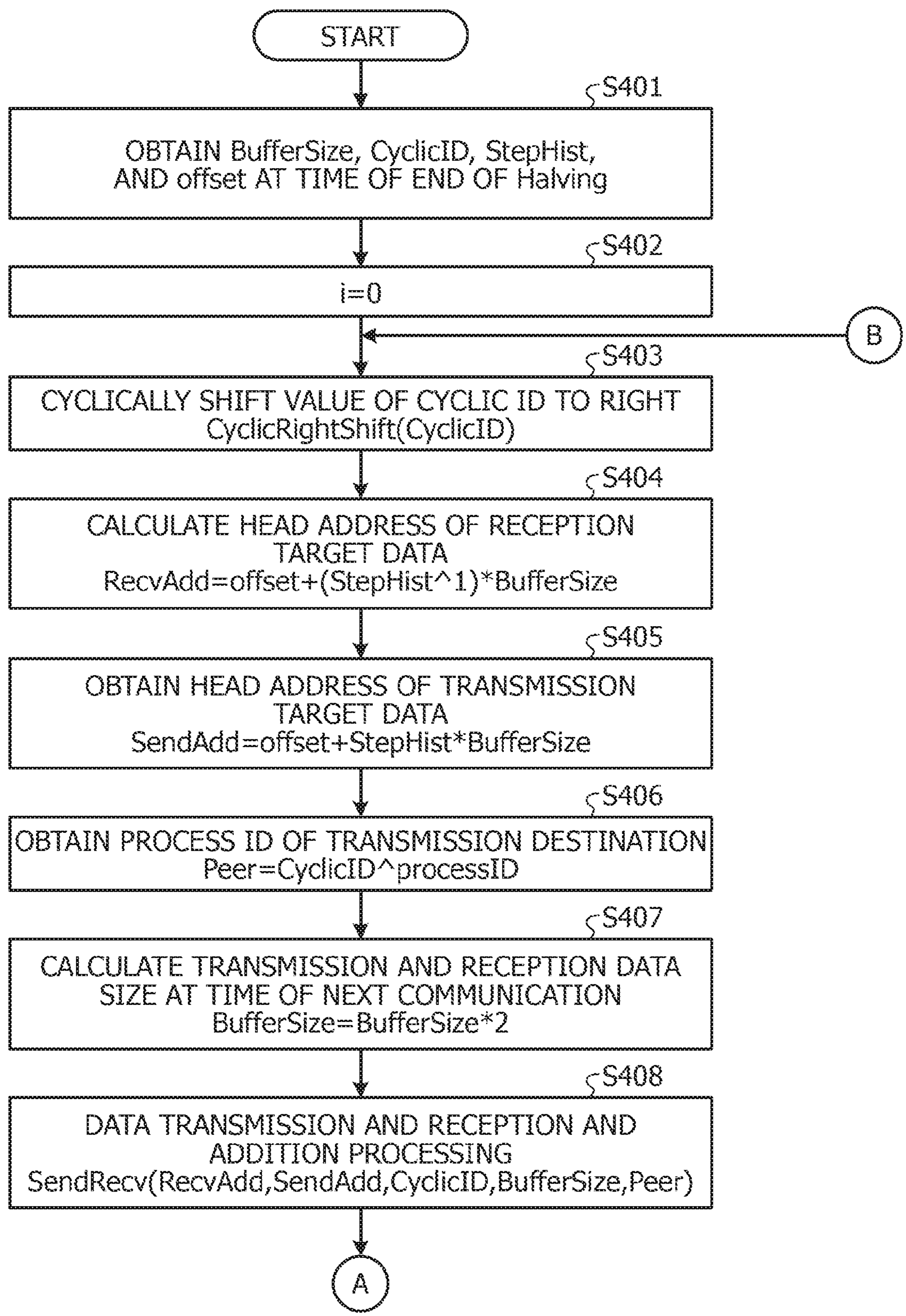
FIGS. 19A and 19B illustrate flowchart of processing performed in a program implementing Doubling.
Figure 19B:
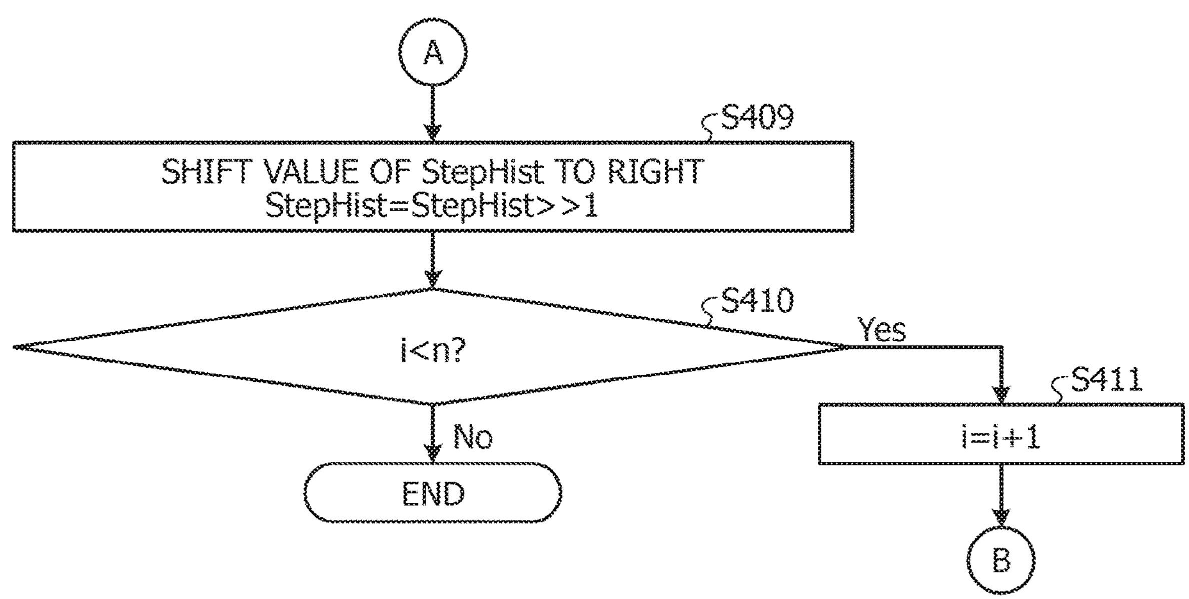

A flow of processing with regard to Doubling of the program illustrated in FIG. 17 will next be described with reference to FIGS. 19A and 19B. FIGS. 19A and 19B illustrate flowchart of processing performed in a program implementing Doubling. FIGS. 18A and 18B correspond to an example of a case where the processing of the flowchart of FIG. 16 is implemented by a program. Also in the following, description will be made of each piece of processing supposing that the arithmetic circuit possessed by the network control circuit 29 is an operating entity.

The arithmetic circuit obtains BufferSize, the cyclic ID, StepHist, and the offset at a time of an end of Halving (step S401).

Next, the arithmetic circuit sets i=0 (step S402).

Next, the arithmetic circuit cyclically shifts the value of the cyclic ID to the right by performing CyclicRightShift (CyclicID) (step S403). For example, the arithmetic circuit exchanges data with communication destinations in reverse order to that of Halving. Halving performs a shift to the left once after performing final data transmission and reception. Thus, here, the arithmetic circuit performs a shift to the right first.

Next, the arithmetic circuit calculates the head address of data as a reception target (step S404). For example, in Doubling, the areas of transmission and reception target data are opposite from those of Halving. Accordingly, the arithmetic circuit obtains an exclusive disjunction of StepHist and a value that has a same number of bits as StepHist and whose least significant bit is one. Then, the arithmetic circuit multiplies the value of the obtained exclusive disjunction by BufferSize, and adds the offset to a result of the multiplication. The arithmetic circuit thereby calculates RecvAdd, which is the head address of data as a reception target.

Next, the arithmetic circuit determines the head address of data as a transmission target (step S405). For example, the arithmetic circuit calculates SendAdd as the head address of data as a transmission target by adding the offset to a value obtained by multiplying StepHist by BufferSize.

Next, the arithmetic circuit determines the process ID of an arithmetic processing circuit 20 as a transmission destination (step S406). For example, the arithmetic circuit calculates an exclusive disjunction of the cyclic ID and the process ID, and sets a result of the calculation as Peer, which is the process ID of an arithmetic processing circuit 20 as a transmission and reception destination.

Next, the arithmetic circuit calculates a data size for performing transmission and reception at a time of a next communication (step S407). For example, the arithmetic circuit sets twice a data size in a present communication as the data size for performing transmission and reception at the time of the next communication.

Thereafter, the arithmetic circuit performs data transmission and reception and processing of addition of received data (step S408). For example, the arithmetic circuit obtains SendRecv (RecvAdd, SendAdd, CyclicID, BufferSize, Peer).

Next, the arithmetic circuit shifts the value of StepHist to the right (step S409). The shift to the right in this case is not a cyclic right shift. The shift to the right causes the value of the first bit of StepHist to disappear. The arithmetic circuit thereby makes the value of StepHist change in reverse order to that of Halving.

Then, the arithmetic circuit determines whether or not i is smaller than n (step S410). When i is smaller than n (step S410: affirmative), the arithmetic processing circuit increments the value of i by one (step S411), and returns to step S403.

When i=n (step S410: negative), on the other hand, the arithmetic processing circuit ends Doubling.

As described above, the information processing system according to the present embodiment performs the processing of Allreduce by performing data transmission and reception to and from arithmetic processing circuits different for respective threads generated by dividing a process by the dimensions of a hypercube including the arithmetic processing circuits. Thus, in performing the processing of Allreduce, it is possible to suppress occurrence of a communication path not used at a time of communication, and improve processing speed.

Figure 20:
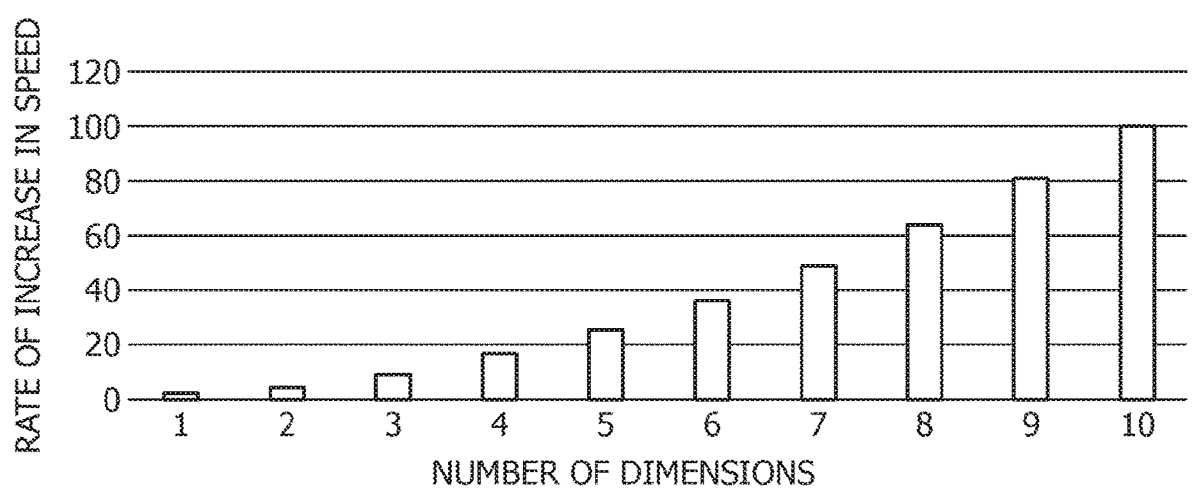
FIG. 20 is a diagram of assistance in explaining effects of processing of Allreduce according to the first embodiment.

FIG. 20 is a diagram of assistance in explaining effects of processing of Allreduce according to the first embodiment. In FIG. 20, an axis of ordinates indicates a multiplying factor of communication time with respect to existing Allreduce processing, and an axis of abscissas indicates the number of dimensions of the hypercube.

Description will be made in a case where the band of one cable is b bytes/second. In this case, a time taken to communicate data of D bytes in one path is D/b seconds. Therefore, when the communication amount of the data is halved, the communication time is D/2b. For example, in the case where arithmetic processing circuits have the configuration of a two-dimensional hypercube, the size of a thread is half of the whole, thus halving the data size for transmission and reception, and halving the communication time. Then, communication is performed in a double path at a time, so that the band is 2b bytes/second. In addition, in the case of the configuration of an n-dimensional hypercube, the band is nb bytes/second, and the data size for transmission and reception in each path is D/n bytes. Hence, as illustrated in FIG. 20, when the processing of Allreduce according to the present application is performed, processing speed is improved as compared with the existing processing of Allreduce.

In addition, when the processing of Allreduce according to the present embodiment is performed in a topology in which arithmetic processing circuits are coupled to each other by a network switch, a plurality of pieces of data are transmitted simultaneously on one network extending from each of the arithmetic processing circuits to the network switch. Therefore, a load concentrates on paths leading to the network switch, and a decrease in speed may occur. This is also true for a case where a multi-stage network switch is used. Therefore, the information processing system performing the processing of Allreduce according to the present embodiment may exert more effect in a case where arithmetic processing circuits have a direct connection network without the intervention of a switch.

Second Embodiment

Figure 21A:
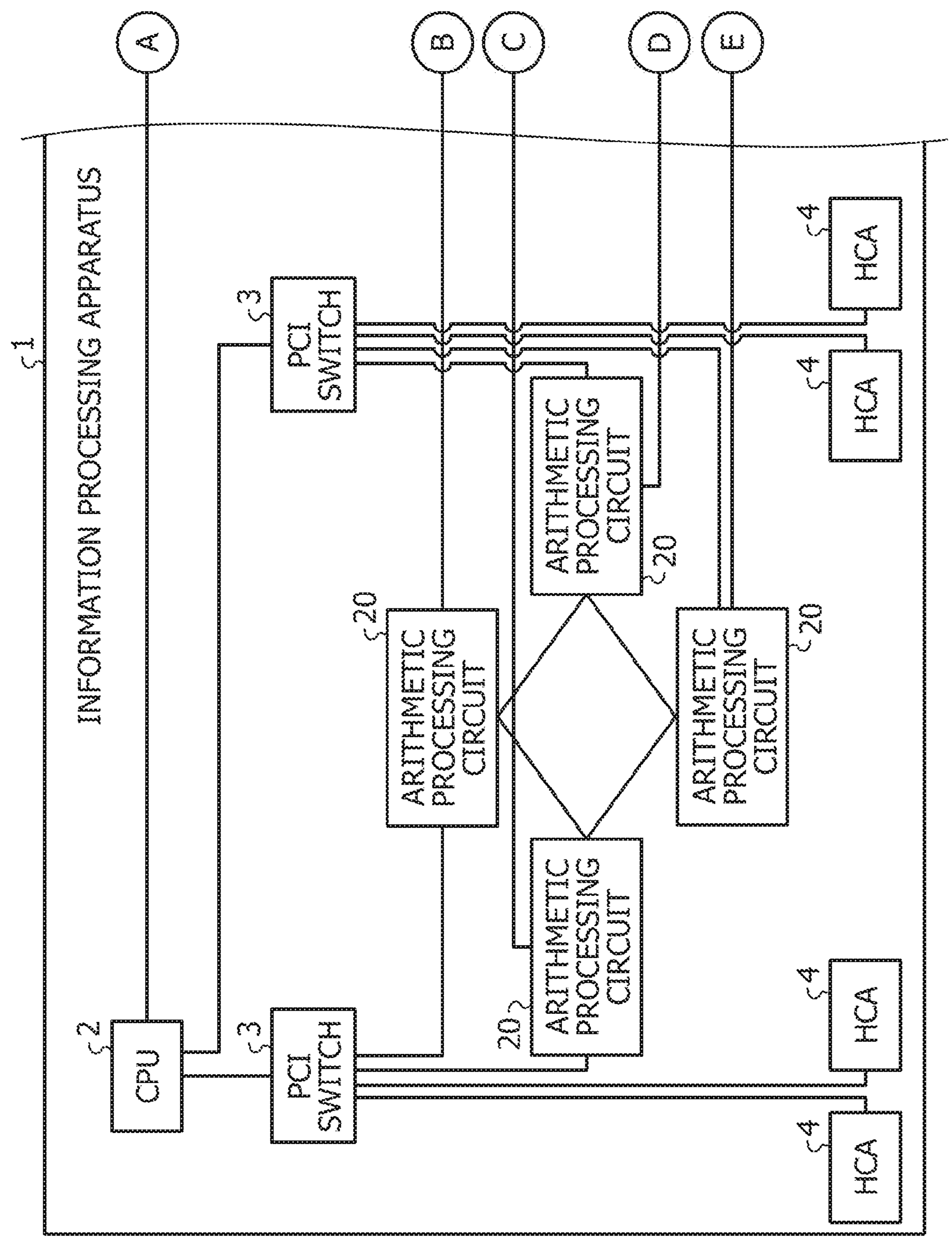
FIGS. 21A and 21B illustrate diagrams of a hardware configuration of an information processing system according to a second embodiment.
Figure 21B:
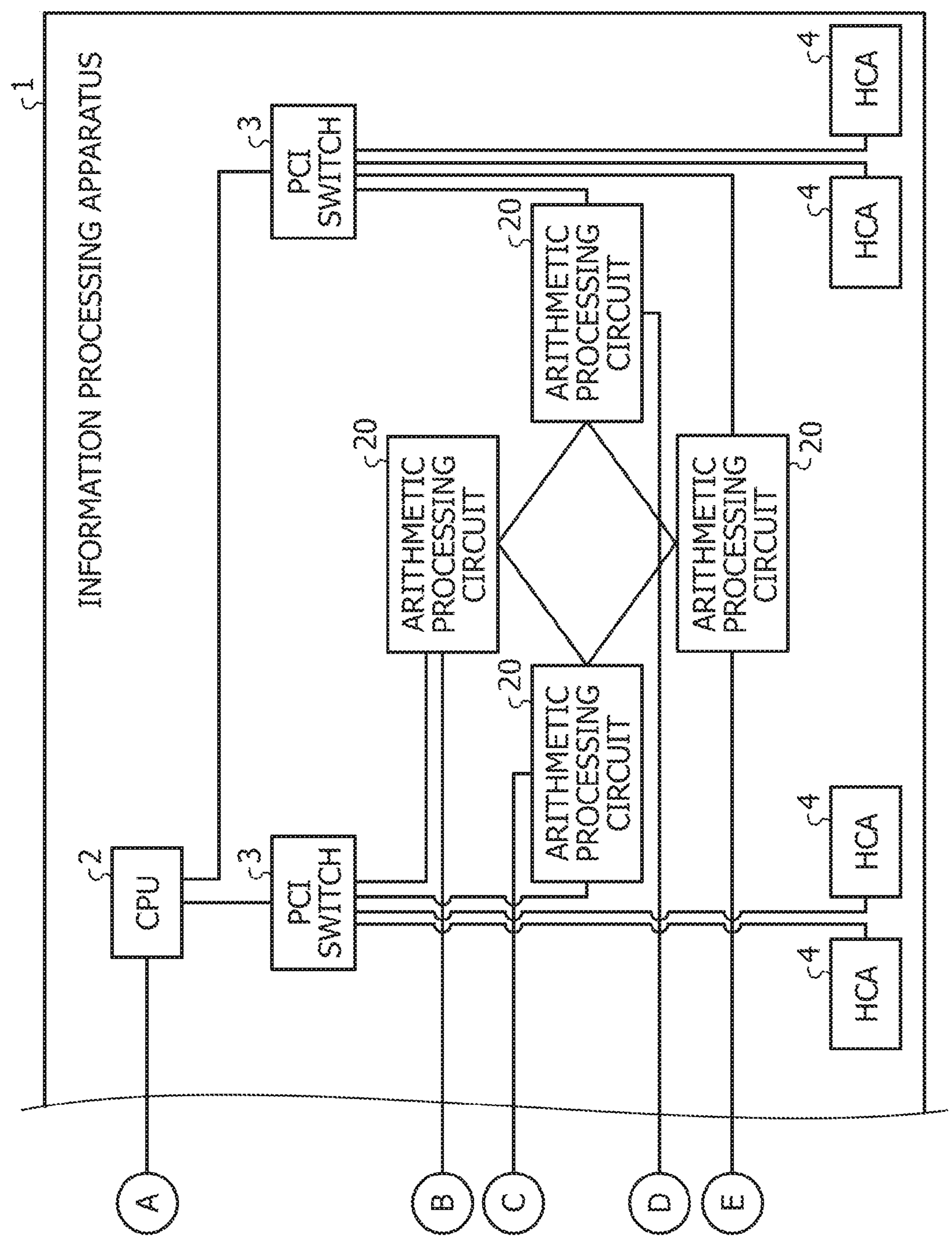

FIGS. 21A and 21B illustrate diagrams of a hardware configuration of an information processing system according to a second embodiment. The information processing system according to the present embodiment has eight arithmetic processing circuits 20 mounted on a system board 1. The arithmetic processing circuits 20 are coupled so as to form a three-dimensional hypercube.

As in the first embodiment, the arithmetic processing circuits 20 according to the present embodiment also have the hardware illustrated in FIGS. 3A and 3B. Further, a block diagram of the network control circuit 29 according to the present embodiment is illustrated in FIGS. 4A and 4B. In the following description, description of functions of parts similar to those of the first embodiment may be omitted.

Because the arithmetic processing circuits 20 are included in the three-dimensional hypercube, the thread generating circuit 202 according to the present embodiment generates three threads Th1 to Th3 for one process, as illustrated in FIG. 22. FIG. 22 is a diagram of assistance in explaining destination determination processing according to the second embodiment.

The transmission and reception data size calculating circuit 204 determines a data size for transmission and reception as in the first embodiment. The transmission and reception data size is the size of data strings stored in blocks enclosed by thick frames in FIG. 22. For example, the data size becomes half the size in each communication.

In addition, the target data determining circuit 205 assigns transmission and reception target indexes to generated target determination groups, and determines an area as a reception target and an area as a transmission target as in the first embodiment. Then, the target data determining circuit 205 sets data corresponding to the determined areas as transmission target data and reception target data.

In addition, as illustrated in FIG. 22, the destination determining circuit 206 obtains an exclusive disjunction of a process ID and a cyclic ID for each thread, and sets the value of the exclusive disjunction as the process ID of a transmission destination in the thread. FIG. 22 illustrates the determination of transmission destination process IDs in each communication by an arithmetic processing circuit 20 assigned 000 as a process ID thereof. In FIG. 22, a cyclic ID is provided to each thread in each communication. Then, a transmission destination process ID obtained from an exclusive disjunction of the process ID and the cyclic ID is provided at a head of an arrow extending from the cyclic ID.

Figure 23:
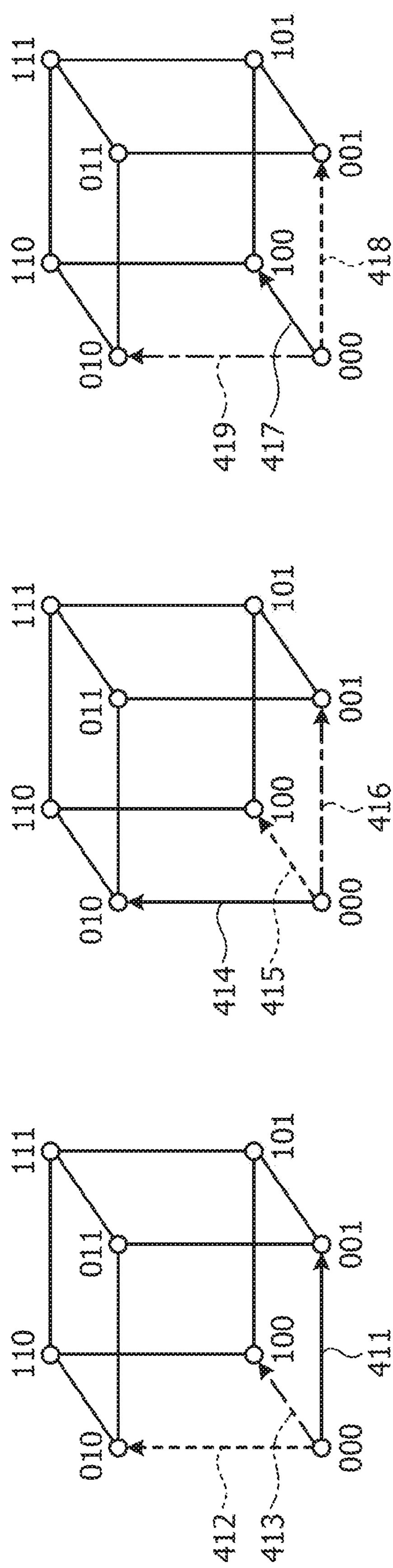
FIG. 23 is a diagram of assistance in explaining destination transitions in a three-dimensional hypercube.

In this case, as illustrated in FIG. 23, the transmission destination arithmetic processing circuits 20 change in each communication. FIG. 23 is a diagram of assistance in explaining destination transitions in a three-dimensional hypercube. Respective circles in FIG. 23 represent the arithmetic processing circuits 20, and numbers provided to the respective circles represent the process IDs of the respective arithmetic processing circuits 20.

In the first communication, as indicated by a solid line arrow 411, the arithmetic processing circuit 20 having the process ID of 000 sets an arithmetic processing circuit 20 having a process ID of 001 as the data transmission destination of the thread Th1. In addition, as indicated by a broken line arrow 412, the arithmetic processing circuit 20 having the process ID of 000 sets an arithmetic processing circuit 20 having a process ID of 010 as the data transmission destination of the thread Th2. Further, as indicated by a dash-single-dot line arrow 413, the arithmetic processing circuit 20 having the process ID of 000 sets an arithmetic processing circuit 20 having the process ID of 100 as the data transmission destination of the thread Th3.

Next, in the second communication, as indicated by a solid line arrow 414, the arithmetic processing circuit 20 having the process ID of 000 sets the arithmetic processing circuit 20 having the process ID of 010 as the data transmission destination of the thread Th1. In addition, as indicated by a broken line arrow 415, the arithmetic processing circuit 20 having the process ID of 000 sets the arithmetic processing circuit 20 having the process ID of 100 as the data transmission destination of the thread Th2. Further, as indicated by a dash-single-dot line arrow 416, the arithmetic processing circuit 20 having the process ID of 000 sets the arithmetic processing circuit 20 having the process ID of 001 as the data transmission destination of the thread Th3.

Next, in the third communication, as indicated by a solid line arrow 417, the arithmetic processing circuit 20 having the process ID of 000 sets the arithmetic processing circuit 20 having the process ID of 100 as the data transmission destination of the thread Th1. In addition, as indicated by a broken line arrow 418, the arithmetic processing circuit 20 having the process ID of 000 sets the arithmetic processing circuit 20 having the process ID of 001 as the data transmission destination of the thread Th2. Further, as indicated by a dash-single-dot line arrow 419, the arithmetic processing circuit 20 having the process ID of 000 sets the arithmetic processing circuit 20 having the process ID of 010 as the data transmission destination of the thread Th3.

Thus, the arithmetic processing circuit 20 sets different arithmetic processing circuits 20 for the respective threads as transmission destinations of data in one communication. The arithmetic processing circuit 20 may therefore transmit the data to all of adjacent arithmetic processing circuits 20 in one communication. It is thus possible to suppress occurrence of an unused path, and make full use of a band.

In summary, as illustrated in FIG. 22, the destination determining circuit 206 performs exclusive disjunction operation on the cyclic IDs as cyclic number information and the process ID as identification number information, and calculates process IDs as destination number information by the exclusive disjunction operation. Then, the destination determining circuit 206 sets the calculated process IDs as the process IDs of transmission destination arithmetic processing circuits 20 in each communication illustrated in FIG. 23.

FIG. 24 is a diagram illustrating arithmetic processing circuits performing communication in each communication in an information processing system according to the second embodiment. In FIG. 24, the arithmetic processing circuits 20 performing communication are represented by assigning symbols #00 to #07 to the eight respective arithmetic processing circuits 20 coupled so as to form a three-dimensional hypercube. In this case, the information processing system performs Allreduce processing with a data amount of 24 m.

In FIG. 24, communications to which no pattern is set represent sets of arithmetic processing circuits 20 transmitting and receiving data of the thread Th1. In addition, communications to which a hatching pattern is set represent sets of arithmetic processing circuits 20 transmitting and receiving data of the thread Th2. Further, communications to which a dot pattern is set represent sets of arithmetic processing circuits 20 transmitting and receiving data of the thread Th3.

Because Halving is performed, a communication amount is 4 m in the first communication, the communication amount is 2 m, which is half of 4 m, in the second communication, and the communication amount is 1 m in the third communication. Thereafter, because Doubling is performed, the communication amount is 2 m in a fourth communication, and the communication amount is 4 m in a fifth communication.

As illustrated in FIG. 24, the arithmetic processing circuits #00 to #07 each perform communication with adjacent arithmetic processing circuits 20 in each communication. Then, the arithmetic processing circuits #00 to #07 perform the processing of Allreduce by changing the arithmetic processing circuits 20 as communication destinations for each thread in each communication.

As described above, even when the arithmetic processing circuits are coupled so as to form a three-dimensional hypercube, it is possible to suppress occurrence of a path not used for communication, and improve processing speed.

Third Embodiment

Figure 25A:
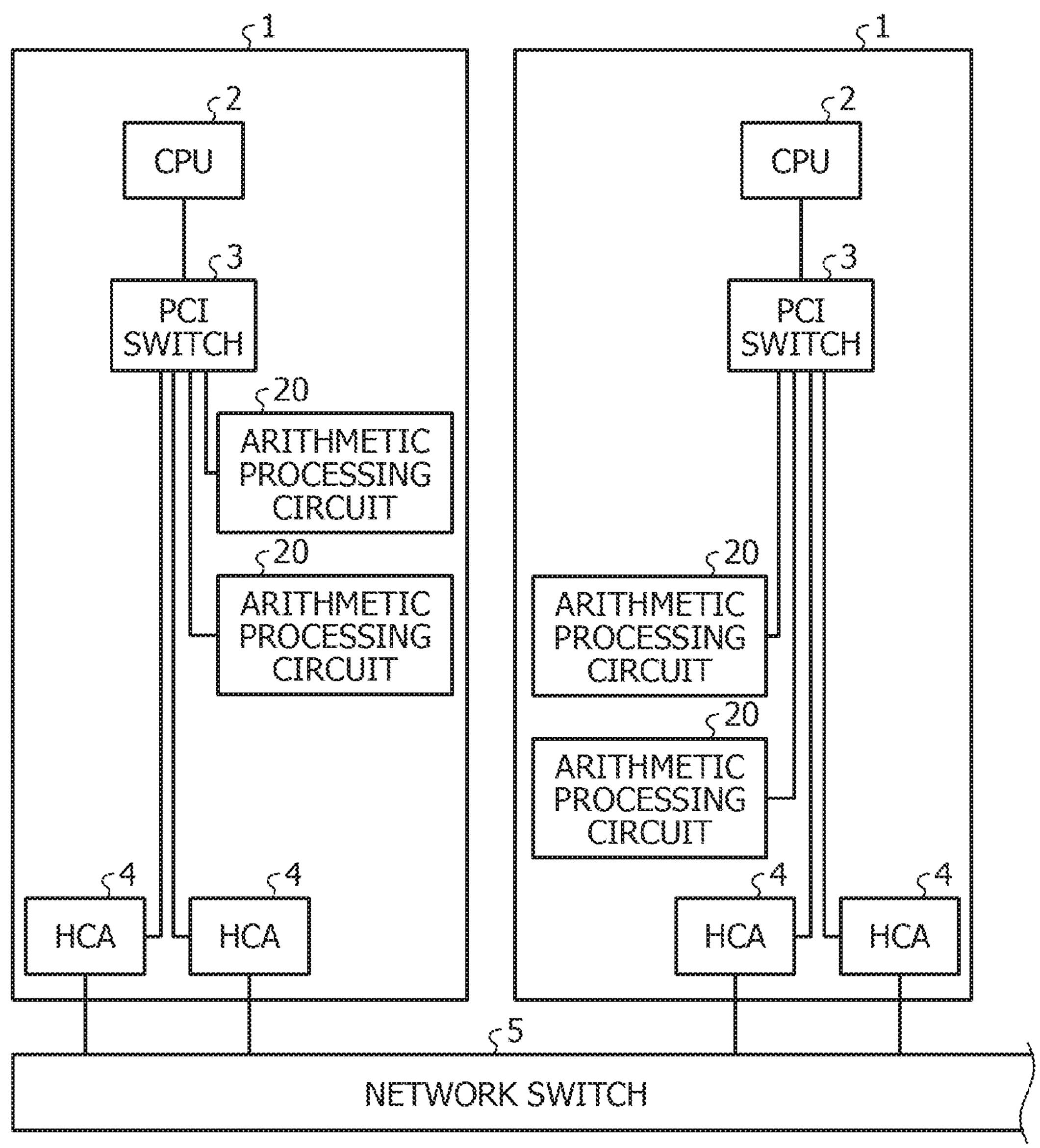
FIGS. 25A and 25B illustrate diagrams of a hardware configuration of an information processing system according to a third embodiment.
Figure 25B:
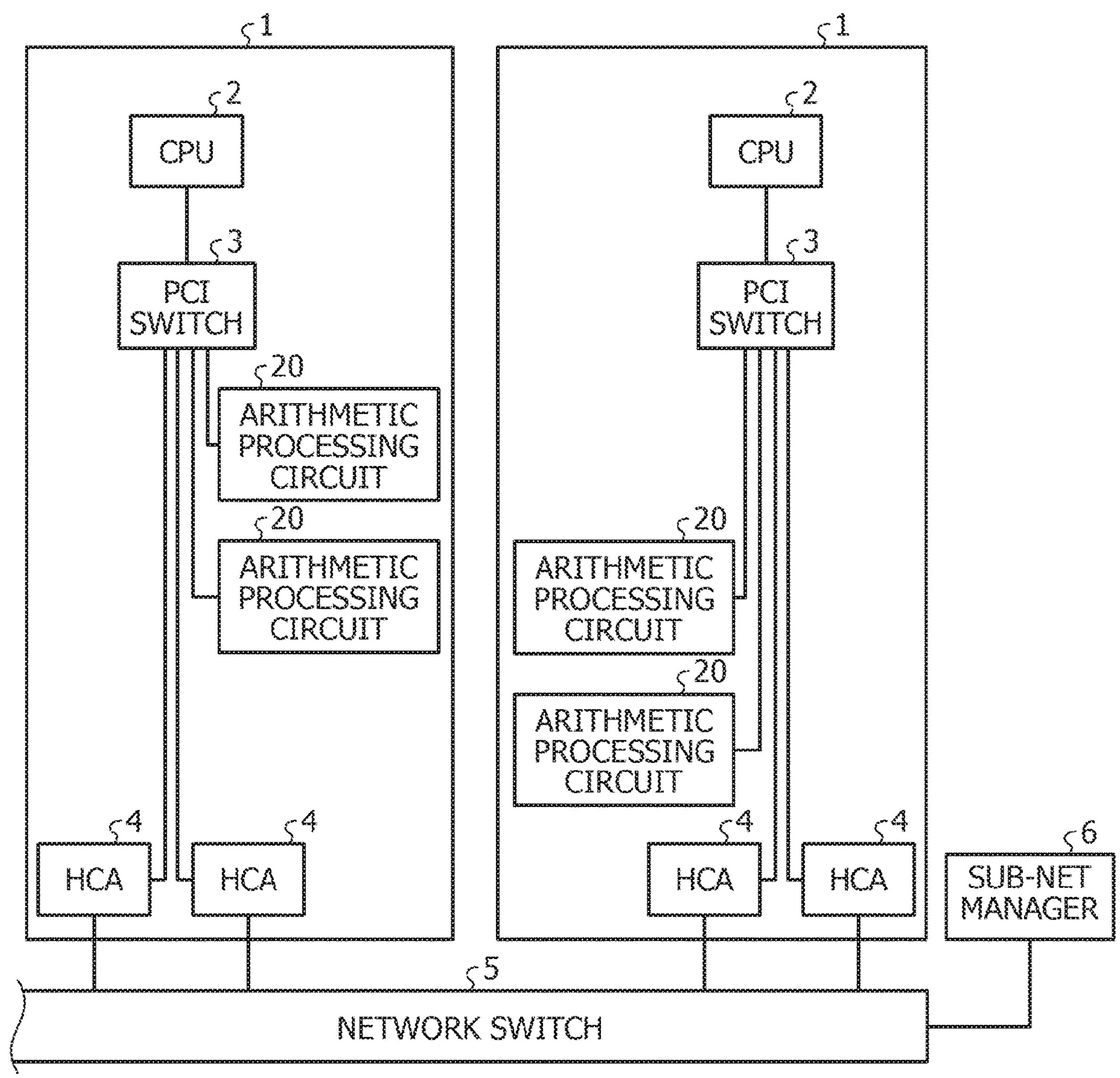

FIGS. 25A and 25B illustrate diagrams of a hardware configuration of an information processing system according to a third embodiment. The information processing system according to the present embodiment has two arithmetic processing circuits 20 mounted on one system board 1. Then, the arithmetic processing circuits 20 are coupled so as to form a one-dimensional hypercube. Then, four system boards 1 are interconnected via a network switch 5.

Also in this case, the transmission and reception data size calculating circuit 204 determines the data size of transmission and reception targets in each communication. Then, the target data determining circuit 205 determines transmission target data and reception target data according to the data size. However, in the case of a one-dimensional hypercube, Halving is ended in one communication. Similarly, Doubling is ended in one communication.

FIG. 26 is a diagram illustrating arithmetic processing circuits performing communication in each communication in an information processing system according to the third embodiment. In FIG. 26, the arithmetic processing circuits 20 performing communication are represented by assigning symbols #0 to #7 to eight respective arithmetic processing circuits 20 coupled so as to form a one-dimensional hypercube on four system boards 1. In this case, the information processing system performs Allreduce processing with a data amount of 24 m.

In this case, the Allreduce processing is performed between the system boards 1. For example, data is mutually exchanged between the four system boards 1. When the system boards 1 set as targets of Allreduce are thus increased, the processing of Allreduce via the network switch 5 is increased.

As described above, even when a coupling is made so as to form a one-dimensional hypercube, it is possible to suppress occurrence of a path not used for communication, and improve processing speed. However, an increase in system boards increases the Allreduce processing via the network switch. Thus, it is more desirable to reduce the processing of Allreduce using the network switch by increasing directly coupled arithmetic processing circuits.

Here, in the foregoing embodiments, description has been made of a case where one of arithmetic processing circuits 20 included in a hypercube performs process ID assignment. However, there is no limitation to this. For example, an arithmetic processing circuit 20 for process ID assignment may be disposed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising a plurality of information processing apparatuses, each of the plurality of information processing apparatuses incorporating a plurality of arithmetic processing circuits, each of the plurality of arithmetic processing circuits includes:

- a dividing circuit configured to divide a plurality of data blocks retained by the arithmetic processing circuit into groups of a number equal to the number of the plurality of arithmetic processing circuits included in the information processing apparatus including the own device,
- a data selecting circuit configured to select respective first data blocks from the plurality of data blocks included in the respective groups, a transmission destination selecting circuit configured to select arithmetic processing circuits different from each other as respective transmission destinations from the plurality of arithmetic processing circuits included in the information processing apparatus for the respective first data blocks selected by the data selecting circuit based on destination number information obtained by exclusive disjunction operation on identification number information assigned to each arithmetic processing circuit and cyclic number information assigned to each group, and a transmitting circuit configured to transmit the respective first data blocks selected by the data selecting circuit to the respective arithmetic processing circuits selected by the transmission destination selecting circuit.

2. The information processing system according to claim 1, wherein the transmission destination selecting circuit selects, as the transmission destinations, the arithmetic processing circuits different from each other from arithmetic processing circuits adjacent to the own device among the plurality of arithmetic processing circuits included in the information processing apparatus.

3. The information processing system according to claim 2, wherein each of the arithmetic processing circuits is assigned the identification number information represented by a number of bits, the number of bits being the number of arithmetic processing circuits adjacent to the own device, and the transmission destination selecting circuit assigns the cyclic number information represented by the number of bits to each group, performs exclusive disjunction operation on the identification number information assigned to the own device and the cyclic number information, and selects an arithmetic processing circuit assigned identification number information coinciding with destination number information obtained by the exclusive disjunction operation as the transmission destination of the group assigned the cyclic number information used in the exclusive disjunction operation.

4. The information processing system according to claim 3, wherein the arithmetic processing circuit further includes a receiving circuit configured to receive a first data block transmitted from another arithmetic processing circuit, performs operation using a given data block corresponding to the received first data block among the plurality of data blocks and the received first data block, and set a result of the operation as data of the given data block.

5. The information processing system according to claim 4, wherein the transmission destination selecting circuit shifts the cyclic number information by one after the transmitting of the first data blocks by the transmitting circuit and storing of the result of the operation by the receiving circuit are completed.

6. The information processing system according to claim 5, wherein the data selecting circuit selects second data blocks from the respective groups after the transmitting of the first data blocks by the transmitting circuit and the storing of the result of the operation by the receiving circuit are completed, by performing exclusive disjunction operation on the identification number information and the cyclic number information shifted by one, the transmission destination selecting circuit selects arithmetic processing circuits different from each other for the respective second data blocks selected by the data selecting circuit and different from the transmission destinations of the first data blocks in the groups including the respective second data blocks as transmission destinations from among the plurality of arithmetic processing circuits included in the information processing apparatus, and the transmitting circuit transmits the respective second data blocks selected by the data selecting circuit to the arithmetic processing circuits selected by the transmission destination selecting circuit.

7. The information processing system according to claim 6, wherein the transmission destination selecting circuit selects, as the transmission destinations, arithmetic processing circuits retaining third data blocks as complementing counterparts of the second data blocks.

8. The information processing system according to claim 1, wherein the data blocks are a data group obtained by dividing data retained by the arithmetic processing circuit into a value obtained by multiplying a number resulting from raising two to a power of the number of adjacent arithmetic processing circuits by the number of the adjacent arithmetic processing circuits.

9. The information processing system according to claim 1, wherein the arithmetic processing circuits are each assigned the identification number information represented by given bits, and arithmetic processing circuits different from each other in a value of one bit in the identification number information are coupled to each other.

10. An arithmetic processing circuit comprising:

a dividing circuit configured to divide a plurality of data blocks retained by the arithmetic processing circuit into groups of a number equal to the number of arithmetic processing circuits included in an information processing apparatus incorporating the own arithmetic processing circuit;

a data selecting circuit configured to select respective first data blocks from the plurality of data blocks included in the respective groups;

a transmission destination selecting circuit configured to select arithmetic processing circuits different from each other as respective transmission destinations from the plurality of arithmetic processing circuits included in the information processing apparatus for the respective first data blocks selected by the data selecting circuit based on destination number information obtained by exclusive disjunction operation on identification number information assigned to each arithmetic processing circuit and cyclic number information assigned to each group; and a transmitting circuit configured to transmit the respective first data blocks selected by the data selecting circuit to the respective arithmetic processing circuits selected by the transmission destination selecting circuit.

11. The arithmetic processing circuit according to claim 10, wherein the transmission destination selecting circuit selects, as the transmission destinations, the arithmetic processing circuits different from each other from arithmetic processing circuits adjacent to the own device among the plurality of arithmetic processing circuits included in the information processing apparatus.

12. The arithmetic processing circuit according to claim 11, wherein each of the arithmetic processing circuits is assigned the identification number information represented by a number of bits, the number of bits being the number of arithmetic processing circuits adjacent to the own device, and the transmission destination selecting circuit assigns the cyclic number information represented by the number of bits to each group, performs exclusive disjunction operation on the identification number information assigned to the own device and the cyclic number information, and selects an arithmetic processing circuit assigned identification number information coinciding with destination number information obtained by the exclusive disjunction operation as the transmission destination of the group assigned the cyclic number information used in the exclusive disjunction operation.

13. The arithmetic processing circuit according to claim 12, wherein the arithmetic processing circuit further includes a receiving circuit configured to receive a first data block transmitted from another arithmetic processing circuit, performs operation using a given data block corresponding to the received first data block among the plurality of data blocks and the received first data block, and set a result of the operation as data of the given data block.

14. The arithmetic processing circuit according to claim 13, wherein the transmission destination selecting circuit shifts the cyclic number information by one after the transmitting of the first data blocks by the transmitting circuit and storing of the result of the operation by the receiving circuit are completed.

15. The arithmetic processing circuit according to claim 14, wherein the data selecting circuit selects second data blocks from the respective groups after the transmitting of the first data blocks by the transmitting circuit and the storing of the result of the operation by the receiving circuit are completed, by performing exclusive disjunction operation on the identification number information and the cyclic number information shifted by one, the transmission destination selecting circuit selects arithmetic processing circuits different from each other for the respective second data blocks selected by the data selecting circuit and different from the transmission destinations of the first data blocks in the groups including the respective second data blocks as transmission destinations from among the plurality of arithmetic processing circuits included in the information processing apparatus, and the transmitting circuit transmits the respective second data blocks selected by the data selecting circuit to the arithmetic processing circuits selected by the transmission destination selecting circuit.

16. The arithmetic processing circuit according to claim 15, wherein the transmission destination selecting circuit selects, as the transmission destinations, arithmetic processing circuits retaining third data blocks as complementing counterparts of the second data blocks.

17. The arithmetic processing circuit according to claim 10, wherein the data blocks are a data group obtained by dividing data retained by the arithmetic processing circuit into a value obtained by multiplying a number resulting from raising two to a power of the number of adjacent arithmetic processing circuits by the number of the adjacent arithmetic processing circuits.

18. The arithmetic processing circuit according to claim 10, wherein the arithmetic processing circuits are each assigned the identification number information represented by given bits, and arithmetic processing circuits different from each other in a value of one bit in the identification number information are coupled to each other.

19. A control method for an information processing system including a plurality of information processing apparatuses, each of the plurality of information processing apparatuses incorporating a plurality of arithmetic processing circuits, each of the plurality of arithmetic processing circuits including a dividing circuit, a data selecting circuit, a transmission destination selecting circuit, and a transmitting circuit, the method comprising:

dividing, by the dividing circuit, a plurality of data blocks retained by the arithmetic processing circuit into groups of a number equal to the number of the plurality of arithmetic processing circuits included in the information processing apparatus including the own device;

selecting, by the data selecting circuit, respective first data blocks from the plurality of data blocks included in the respective groups;

selecting, by the transmission destination selecting circuit, arithmetic processing circuits different from each other as respective transmission destinations from the plurality of arithmetic processing circuits included in the information processing apparatus for the respective first data blocks selected by the data selecting circuit based on destination number information obtained by exclusive disjunction operation on identification number information assigned to each arithmetic processing circuit and cyclic number information assigned to each group; and transmitting, by the transmitting circuit, the respective first data blocks selected by the data selecting circuit to the respective arithmetic processing circuits selected by the transmission destination selecting circuit.

* * * * *